US012795265B2

(12) United States Patent
Fukuhara et al.

(10) Patent No.: US 12,795,265 B2
(45) Date of Patent: Nov. 10, 2026

(54) PHOTOELECTRIC CONVERSION APPARATUS, PHOTOELECTRIC CONVERSION SYSTEM, MOVING BODY, AND EQUIPMENT

(71) Applicant: CANON KABUSHIKI KAISHA, Tokyo (JP)

(72) Inventors: Takashi Fukuhara, Tokyo (JP); Takanori Yamashita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/198,447

(22) Filed: May 5, 2025

(65) Prior Publication Data

US 2025/0365521 A1 Nov. 27, 2025

(30) Foreign Application Priority Data

May 24, 2024 (JP) ................................. 2024-084926

(51) Int. Cl.
*H04N 25/78* (2023.01)

(52) U.S. Cl.
CPC .................................. *H04N 25/78* (2023.01)

(58) Field of Classification Search
CPC ....... H04N 25/75; H04N 25/772; H04N 25/78
See application file for complete search history.

(56) References Cited

U.S. PATENT DOCUMENTS 9,749,570 B2 8/2017 Yamashita et al.
10,051,223 B2 8/2018 Yamashita et al.
10,057,529 B2 8/2018 Saito et al.
10,841,517 B2 11/2020 Totsuka
11,070,753 B2 7/2021 Yamashita
11,082,642 B2 8/2021 Fukuhara et al.
11,284,032 B2 3/2022 Shinohara et al.
11,394,908 B2 7/2022 Akiyama et al.
11,418,745 B2 8/2022 Yamashita et al.
11,509,852 B2 11/2022 Suzuki et al.
11,523,075 B2 12/2022 Suzuki et al.
12,335,651 B2 6/2025 Ichino et al.
12,389,139 B2 8/2025 Ichino et al.
2019/0104273 A1 4/2019 Sato et al.
2019/0253067 A1* 8/2019 Sakai .................... H03M 1/182
2022/0132070 A1* 4/2022 Fukuhara ............. H04N 25/709
2024/0284066 A1 8/2024 Fukuhara et al.

(Continued)

FOREIGN PATENT DOCUMENTS

JP 2010-273385 A 12/2010
JP 2019-068318 A 4/2019

(Continued)

*Primary Examiner* — Daniel M Pasiewicz
(74) *Attorney, Agent, or Firm* — Venable LLP

(57) ABSTRACT

A photoelectric conversion apparatus includes a pixel to output a pixel signal, an AD conversion unit to acquire a digital value corresponding to the pixel signal by using a ramp signal. The AD conversion unit includes an amplification circuit, an amplification factor switching circuit, a ramp signal switching circuit, a comparison circuit, and a memory unit, and the AD conversion unit performs analog-to-digital conversion by using the voltage change rate of the ramp signal and the amplification factor of the amplification circuit that are selected using the first decision value and the second decision value.

9 Claims, 26 Drawing Sheets

(56) References Cited

U.S. PATENT DOCUMENTS

| | | | | |
|---|---|---|---|---|
| 2024/0357262 | A1* | 10/2024 | Kobayashi | H04N 25/78 |
| 2025/0324171 | A1 | 10/2025 | Arishima et al. | |
| 2025/0324176 | A1 | 10/2025 | Yamashita et al. | |
| 2025/0338035 | A1 | 10/2025 | Morishita et al. | |

FOREIGN PATENT DOCUMENTS

| | | | |
|---|---|---|---|
| JP | 2019-080360 | A | 5/2019 |
| WO | 2017/169724 | A1 | 10/2017 |

* cited by examiner

PHOTOELECTRIC CONVERSION APPARATUS, PHOTOELECTRIC CONVERSION SYSTEM, MOVING BODY, AND EQUIPMENT

BACKGROUND OF THE INVENTION

Field of the Invention

The present invention relates to a photoelectric conversion apparatus, a photoelectric conversion system, a moving body, and equipment.

Description of the Related Art

For performance of a photoelectric conversion apparatus, an increased dynamic range, high-speed reading, and the like have been requested.

Japanese Patent Application Laid-open No. 2019-68318 discloses a technology of increasing a detection dynamic range by performing image formation by performing analog-to-digital conversion (hereinafter, referred to as AD conversion) again by switching a pixel signal detection sensitivity on the basis of a result of AD conversion of a pixel signal output from a pixel.

However, conventional photoelectric conversion apparatuses require a long AD conversion period and have a problem in that it is difficult to implement high-speed reading.

SUMMARY OF THE INVENTION

An object of the present invention is to provide a photoelectric conversion apparatus achieving both a wide dynamic range and a high-speed AD conversion operation.

According to some embodiments, a photoelectric conversion apparatus includes a pixel configured to output a pixel signal; and an AD conversion unit configured to perform analog-to-digital conversion for acquiring a digital value corresponding to the pixel signal by using a ramp signal of which a signal voltage changes at a predetermined voltage change rate with respect to time, wherein the AD conversion unit includes an amplification circuit controlling an amplification factor of the pixel signal, an amplification factor switching circuit switching the amplification factor, a ramp signal switching circuit switching the voltage change rate of the ramp signal, a comparison circuit outputting a comparison result signal generated using an amplified pixel signal output from the amplification circuit and the ramp signal, and a memory unit storing a plurality of decision values corresponding to the comparison result signal, wherein a first signal is generated by comparing the amplified pixel signal with any one of first threshold voltage values selected from among $M-1$ (here $M>1$) threshold voltages, and the ramp signal switching circuit is capable of switching the voltage change rate of the ramp signal in M ways on the basis of a first decision value corresponding to the first signal, wherein a second signal is generated by comparing the amplified pixel signal with any one of second threshold voltage values selected from among $N-1$ (here $N>1$) threshold voltages generated using the ramp signal, and the amplification factor switching circuit is capable of switching the amplification factor of the amplification circuit in N ways on the basis of a second decision value corresponding to the second signal, and wherein the AD conversion unit performs analog-to-digital conversion by using the voltage change rate of the ramp signal and the amplification factor of the amplification circuit that are selected using the first decision value and the second decision value among three or more combinations, which are less than $M\times N$ combinations among the $M\times N$ combinations according to combinations of switching of the voltage change rate of the ramp signal and switching of the amplification factor of the amplification circuit.

According to some embodiments, a photoelectric conversion system includes the photoelectric conversion apparatus as described above; and a signal processing portion which generates an image by using a signal output by the photoelectric conversion apparatus.

According to some embodiments, a moving body includes the photoelectric conversion apparatus as described above; and a control portion which controls movement of the moving body by using a signal output by the photoelectric conversion apparatus.

According to some embodiments, equipment includes the photoelectric conversion apparatus as described; and at least any of: an optical apparatus corresponding to the photoelectric conversion apparatus; a control apparatus that controls the photoelectric conversion apparatus; a processing apparatus that processes a signal output from the photoelectric conversion apparatus; a display apparatus that displays information obtained by the photoelectric conversion apparatus; a storage apparatus that stores information obtained by the photoelectric conversion apparatus; and a mechanical apparatus that operates on a basis of information obtained by the photoelectric conversion apparatus.

Further features of the present invention will become apparent from the following description of exemplary embodiments with reference to the attached drawings.

DESCRIPTION OF THE EMBODIMENTS

Hereinafter, an overview of each embodiment will be described. In a photoelectric conversion apparatus according to the present invention, pixel signal detection sensitivity is adjusted on the basis of an operation of selecting an amplification factor of a column amplifier and an operation of selecting a ramp signal in a decision period. The first embodiment is an example in which an operation of selecting a ramp signal is performed first in a decision period. A second embodiment and a third embodiment are examples in which an operation of selecting an amplification factor of a column amplifier is performed first in a decision period. A fourth embodiment is an example in which AD conversion sensitivity switched in accordance with a selection operation is configured in multiple stages with respect to other embodiments. AD conversion sensitivity will be discussed below.

First Embodiment

Figure 1:
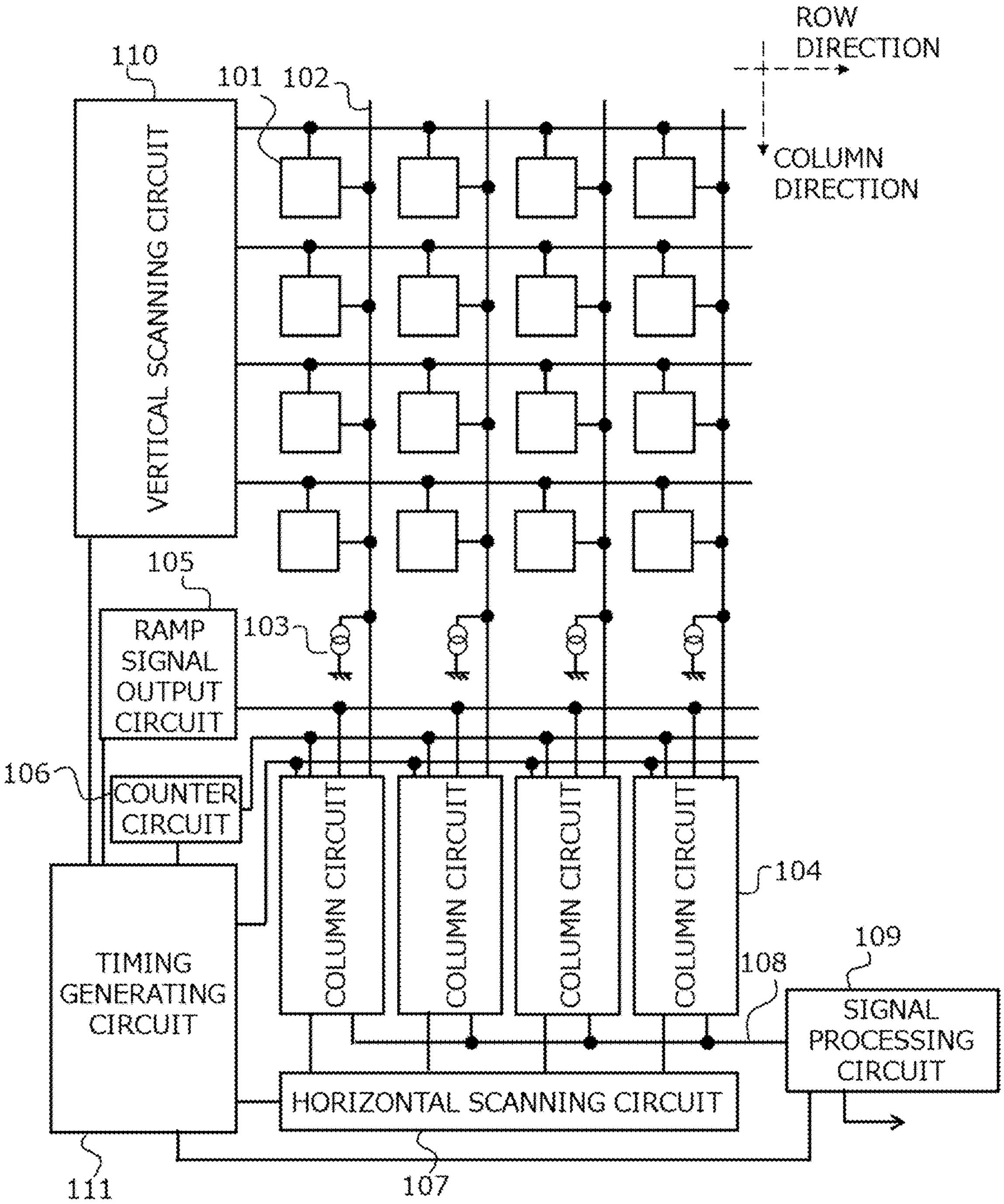
FIG. 1 is a block diagram of a photoelectric conversion apparatus according to a first embodiment.

Hereinafter, each embodiment will be described with reference to the drawings. A photoelectric conversion apparatus according to a first embodiment of the present invention will be described with reference to FIGS. 1 to 8. First, the configuration of the photoelectric conversion apparatus according to this embodiment will be described. FIG. 1 is a block diagram of the photoelectric conversion apparatus. As illustrated in FIG. 1, a plurality of pixels 101 arranged in a matrix pattern are disposed in the photoelectric conversion apparatus. In an actual photoelectric conversion apparatus, while tens of millions of pixels 101 are arranged in an array, FIG. 1 is an example in which 16 pixels 101, which are selected therefrom, are arranged in four rows and four columns. This photoelectric conversion apparatus is a so-called CMOS image sensor.

The pixel 101 generates a pixel signal corresponding to the amount of light received through photoelectric conversion. The pixel signal is output to a vertical output line 102. A current source 103 that supplies a current is connected to the vertical output line 102. A pixel signal is input to a column circuit 104, which is disposed separately for each vertical output line 102, through the vertical output line 102.

The column circuit 104 functions as an AD conversion unit that amplifies pixel signals and performs analog-to-digital conversion (hereinafter referred to as AD conversion). In addition to the pixel signals, a ramp signal used for AD conversion and a count signal are input to the column circuit 104. The ramp signal is generated by a ramp signal output circuit 105. The ramp signal is a signal voltage of which an output voltage changes at a predetermined rate of change with respect to time. The ramp signal output circuit 105 inputs a plurality of ramp signals of which rates of change are different from each other to the column circuit 104.

The count signal is generated by a counter circuit 106. The counter circuit 106 starts measuring the number of pulses supplied from a clock pulse supplying unit, which is not illustrated in the drawing, in synchronization with an output change of the ramp signal. The count signal is a signal that indicates a count value measured by the counter circuit 106.

The column circuit 104 performs AD conversion of pixel signals in a row direction altogether within the same period. The signals that have been converted from analog to digital by the column circuit 104 are sequentially output by a horizontal scanning circuit 107 to the outside of the photoelectric conversion apparatus through a horizontal output line 108 and a signal processing circuit 109.

The vertical scanning circuit 110 repeats an operation of outputting a result of AD conversion acquired sequentially by switching the pixel row to be converted from analog to digital by the column circuit 104 to the signal processing circuit 109, whereby AD conversion of all the pixels is performed.

The timing generating unit 111 supplies drive signals to the vertical scanning circuit 110, the horizontal scanning circuit 107, the column circuit 104, the ramp signal output circuit 105, and the counter circuit 106. The configuration of the photoelectric conversion apparatus according to this embodiment has been described above.

Figure 2:
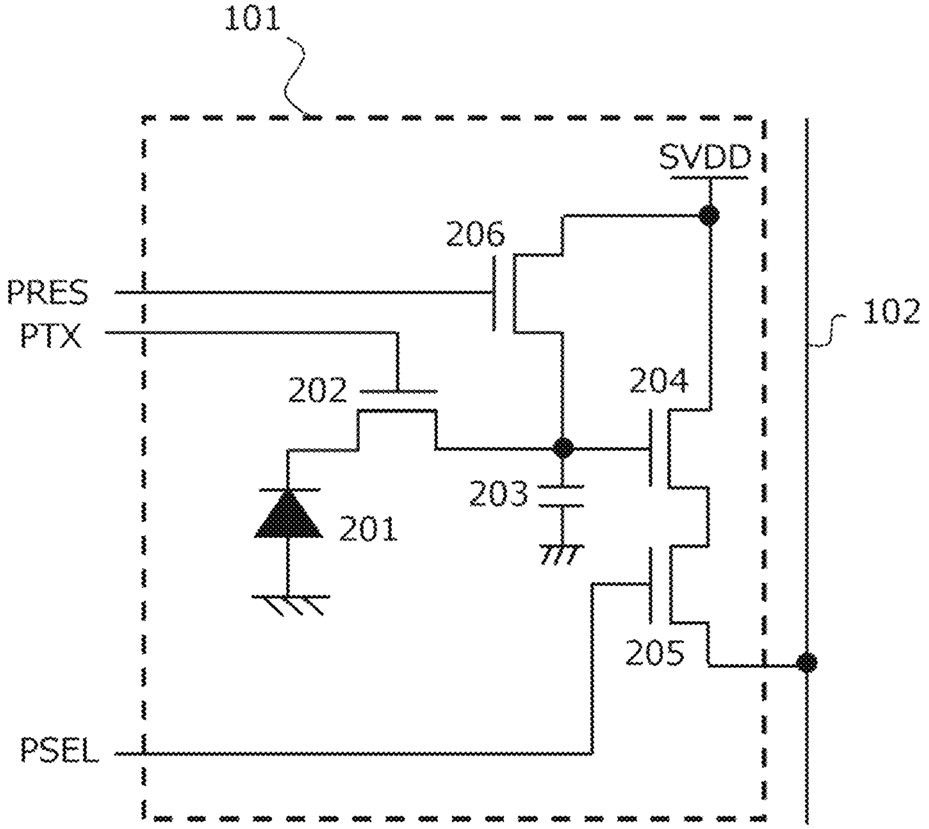
FIG. 2 is a diagram illustrating a circuit operation of a pixel according to the first embodiment.

Next, an operation of the pixel 101 will be described with reference to a circuit diagram of the pixel 101 illustrated in FIG. 2. The photoelectric conversion unit 201 converts incident light into electric charge. The electric charge generated by the photoelectric conversion unit 201 is transferred to a floating diffusion (hereafter referred to as an FD) 203 through a transfer MOS transistor 202. The FD 203 functions as an electric charge voltage converting unit that temporarily holds transferred electric charge and converts the held electric charge into a voltage signal.

When a selection MOS transistor 205 is turned on, an amplification MOS transistor 204 outputs a voltage signal generated in the FD 203 to the vertical output line 102. Thereafter, a reset MOS transistor 206 resets the voltage of the FD 203 and the voltage of the photoelectric conversion unit (photodiode) 201 to a pixel voltage SVDD.

The transfer MOS transistor 202, the reset MOS transistor 206, and the select MOS transistor 205 are respectively controlled by a transfer pulse PTX, a reset pulse PRES, and a select pulse PSEL transmitted from the vertical scanning circuit 110. The operation of the pixel has been described as above.

Figure 3:
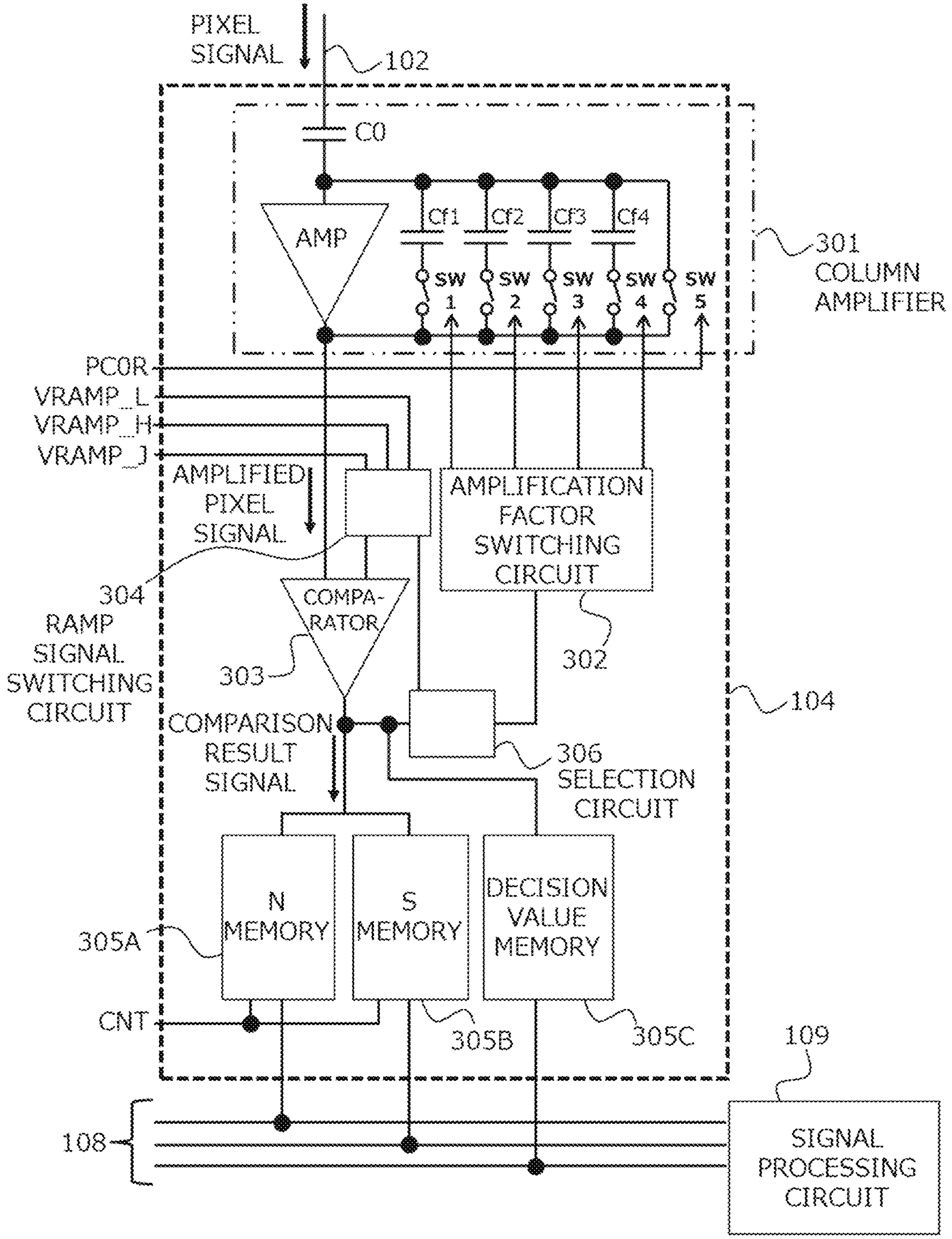
FIG. 3 is a block diagram of a column circuit according to the first embodiment.

Next, the column circuit 104, which performs AD conversion, will be described. FIG. 3 is a block diagram of the column circuit 104 according to this embodiment. Pixel signals are input to the column amplifier 301 through the vertical output line 102. The column amplifier 301 functions as an amplifier circuit and has an input capacitor C0, an amplifier AMP, feedback capacitors Cf1, Cf2, Cf3, and Cf4, and switches SW1, SW2, SW3, SW4, and SW5.

An amplification factor of the column amplifier 301 is determined using a ratio of composite capacitance values of the active feedback capacitors Cf1, Cf2, Cf3, and Cf4 disposed on a feedback path of the amplifier AMP to a capacitance value of the input capacitor C0. In accordance with a control signal from an amplification factor switching circuit 302, a composite capacitance of the feedback path is changed by performing switching of the switches SW1, SW2, SW3, and SW4. The switch SW5 is controlled using a C0 reset pulse PC0R supplied from the timing generating unit 111. The amplification factor of the column amplifier 301 may be an amplification factor of either amplification or attenuation.

An amplified pixel signal that is amplified with a predetermined amplification factor and is output by the column amplifier 301 is input to one input terminal of a comparator 303. A ramp signal is input to the other input terminal of comparator 303 from a ramp signal switching circuit 304. The ramp signal switching circuit 304 selects a ramp signal to be input to the comparator 303 from among a plurality of ramp signals input from the ramp signal output circuit 105. The comparator 303 functions as a comparison circuit.

The ramp signal output circuit 105 inputs ramp signals VRAMP_H, VRAMP_L, and VRAMP_J to the ramp signal switching circuit 304. In this embodiment, the ramp signal VRAMP_L is a signal of which a voltage change rate is ¼ of (AD conversion sensitivity at the time of AD conversion is four times) that of the ramp signal VRAMP_H. The ramp signal VRAMP_J is a signal used for a decision period to be described below.

In this way, the comparator 303 compares the amplified pixel signal input from the column amplifier 301 with the ramp signal supplied from the ramp signal switching circuit 304 and outputs a comparison result signal. The comparator 303 outputs a low level as a comparison result signal when the ramp signal is smaller than the amplified pixel signal and outputs a high level when the magnitude relation is inverted. The comparison result signal is output to an output node. An N memory 305A, an S memory 305B, a decision value memory 305C, and a selection circuit 306 are connected to this node.

Next, the N memory 305A, the S memory 305B, and the decision value memory 305C will be described. A count signal CNT supplied from the counter circuit 106 is connected to the N memory 305A and the S memory 305B. The N memory 305A and the S memory 305B maintain the values of the count signal CNT at the time of the polarity change of the comparison result signal in respective operating periods thereof. The value maintained by the N memory 305A is set as an N signal, and the signal maintained by the S memory 305B is set as an S signal. The decision value memory 305C maintains a decision value that is a decision result of the comparator 303.

The selection circuit 306 outputs control signals to the amplification factor switching circuit 302 and the ramp signal switching circuit 304 on the basis of the decision value stored in the decision value memory 305C. The amplification factor switching circuit 302 switches the amplification factor of the column amplifier 301 on the basis of the control signal. The ramp signal switching circuit 304 switches the ramp signal input to the comparator 303 on the basis of the control signal. The S signal, the N signal, and the decision value are output to the signal processing circuit 109 through the horizontal output line 108 in accordance with control signals supplied from the horizontal scanning circuit 107. The operation of the column circuit 104 has been described as above.

Figure 4:
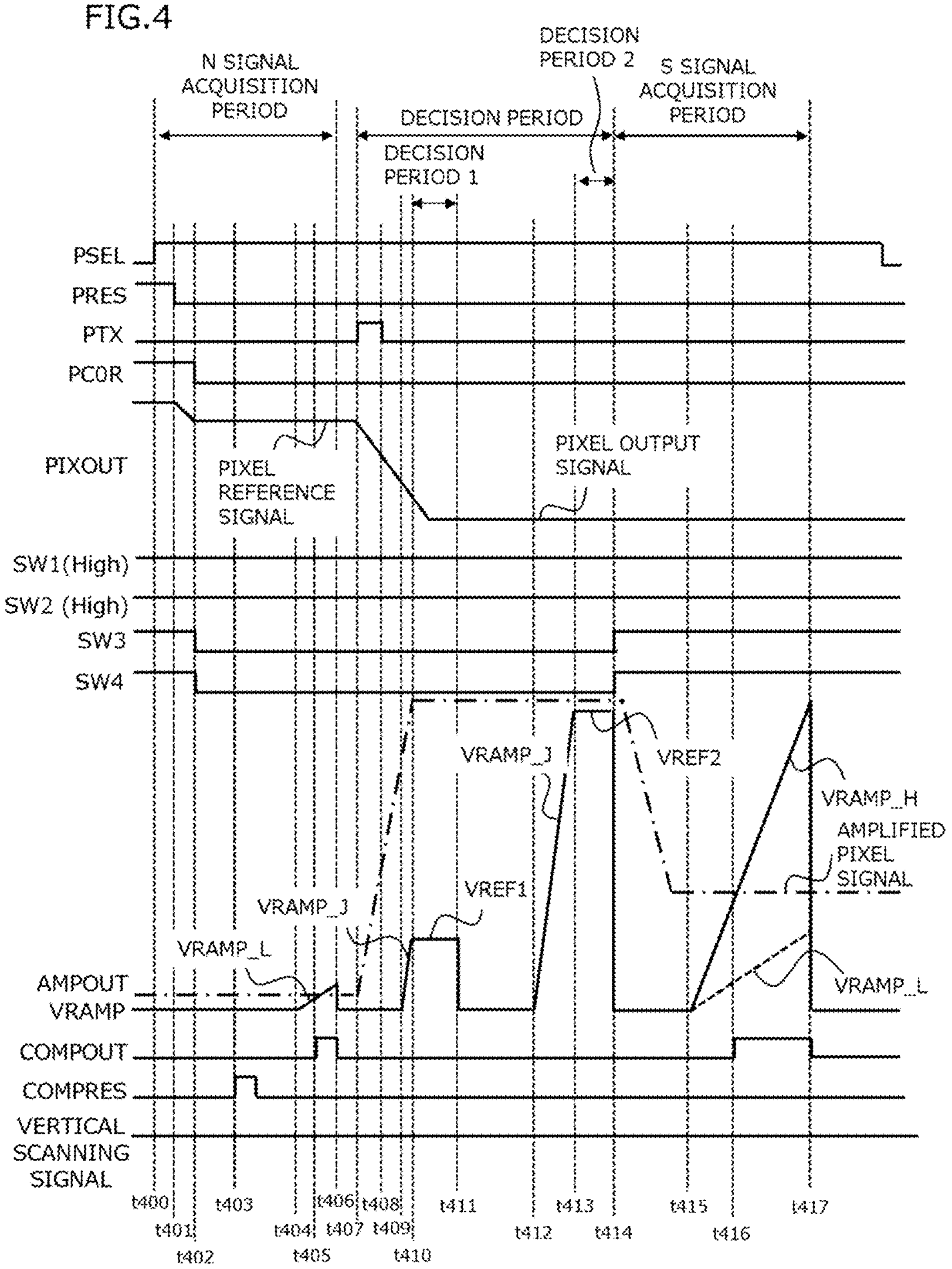
FIG. 4 is a timing chart illustrating AD conversion according to the first embodiment.

Next, the method of acquiring the N signal, the decision value, and the S signal through AD conversion will be described. FIG. 4 is a timing chart illustrating AD conversion. A period from time t400 to time t406 becomes an N signal acquisition period. At time t400, the vertical scanning circuit 110 sets the selection pulse PSEL to a high level and selects the pixel 101 to output a pixel signal PIXOUT. At the same time, the reset pulse PRES is at a high level, and the voltage of the FD 203 is reset.

At time t401, the vertical scanning circuit 110 sets the reset pulse PRES to a low level. At this time, the pixel signal PIXOUT output to the vertical output line 102 is set as a pixel reference signal. The pixel reference signal is a signal that includes a noise component included in the pixel 101.

At time t402, the horizontal scanning circuit 107 sets the C0 reset pulse PC0R to the low level to release the reset state of the amplifier AMP and the input capacitor C0 of the column amplifier 301. Electric charge based on the voltage of the pixel reference signal at the time of setting the C0 reset pulse PC0R to the low level is maintained in the input capacitor C0, and the column amplifier 301 outputs an amplified pixel signal AMPOUT Here, the description of amplification factor of the column amplifier 301 according to this embodiment will be additionally provided. As described above, the amplification factor of the column amplifier 301 is determined as the ratio of the composite capacitance of the feedback path of the amplifier AMP to the input capacitance. In this embodiment, capacitance values of the feedback capacitors Cf1, Cf2, Cf3, and Cf4 are respectively ⅛ times, ⅛ times, ¼ times, and ½ times the capacitance value of the input capacitor C0. The amplification factor of the column amplifier 301 at the time of only using the feedback capacitors Cf1 and Cf2 is 1/(⅛+⅛)=4 times, and this will be set as a first amplification factor. The amplification factor of the column amplifier 301 at the time of using all the feedback capacitors Cf1, Cf2, Cf3, and Cf4 is 1/(⅛+⅛+¼+½)=1, and this will be set as a second amplification factor.

At time t402, the switches SW3 and SW4 are turned off, the feedback capacitors Cf1 and Cf2 are used, and the amplification factor of the column amplifier 301 becomes four times which is the first amplification factor.

At time t403, the horizontal scanning circuit 107 sets the comparator reset pulse COMPRES to the high level for a predetermined period to initialize the comparator 303.

In a period from time t404 to time t406, AD conversion of the pixel reference signal is performed. A signal acquired from the pixel reference signal is output as an amplified image signal as the output from the column amplifier 301. At this time, a ramp signal VRAMP_L is input to comparator 303 by the ramp signal switching circuit 304. In synchronization with the output change of the ramp signal VRAMP_L, the counter circuit 106 starts counting.

At time t405, when the ramp signal VRAMP_L is above the amplified pixel signal AMPOUT, the signal polarity of the comparison result signal COMPOUT changes. At time t405, the N memory 305A maintains the count value indicated by the count signal CNT input to the N memory 305A as the N signal.

After time t406, the ramp signal VRAMP and the count signal CNT are reset and initialized.

A period from time t407 to time t414 is a decision period and is a period in which a decision value is acquired. In this embodiment, the decision value is 2-bits information. First, in a period from time t407 to time t411, a first decision value J1 is obtained.

Over time t407 to time t408, the transfer pulse PTX is set to the high level. The electric charge that has been input to the photoelectric conversion unit 201 and photoelectrically converted is transferred to the FD 203 and is output as a pixel signal PIXOUT. The pixel signal PIXOUT at this time will be set as a pixel output signal. The pixel output signal passes through the vertical output line 102 and the column amplifier 301 of the column circuit 104 to become an amplified pixel signal and is input to the comparator 303. At this time, the amplified pixel signal from the column amplifier 301 becomes an output acquired by inverting and amplifying a voltage difference between the pixel reference signal and the pixel output signal.

At time t409, the ramp signal switching circuit 304 inputs a ramp signal VRAMP_J to the comparator 303. The ramp signal VRAMP_J performs an operation of increasing the voltage value in a period from time t409 to time t410 and maintaining the voltage value for a predetermined period from time t410 to time t411. At this time, the voltage value of the ramp signal VRAMP_J maintained from time t410 to time t411 is set as a first threshold voltage value VREF1, and the same period is set as a decision period 1.

In the decision period 1, the comparator 303 compares the first threshold voltage value VREF1 with the amplified pixel signal AMPOUT and outputs a comparison result signal. The comparison result signal at this time is set as a first comparison result signal to become the first decision value J1. In a case in which the amplified pixel signal AMPOUT is lower than the first threshold voltage value VREF1 (AMPOUT<VREF1), the comparator output COMPOUT changes in polarity from the low level to the high level. Accordingly, the first decision value J1 becomes "1".

On the other hand, in a case in which the voltage value of the amplified pixel signal AMPOUT is equal to or greater than the first threshold voltage value VREF1 (AMPOUT≥VREF1), the comparator output COMPOUT maintains the low level. At this time, the first decision value J1 becomes "0".

The first decision value J1 is input to a first bit of the decision value memory 305C and is stored therein. After time t411, the ramp signal VRAMP is reset. In the case of FIG. 4, since the amplified pixel signal AMPOUT is greater than the first threshold voltage value VREF1, the first decision value J1 becomes "0", and "0" is stored in the first bit of the decision value memory 305C.

In a period from time t412 to time t414, a second decision value J2 is acquired. At time t412, the ramp signal switching circuit 304 inputs the ramp signal VRAMP_J to the comparator 303 again. The ramp signal VRAMP_J performs an operation of increasing the voltage value in a period from time t412 to time t413 and maintaining the voltage value at the time of stopping the increase for a predetermined period. The voltage value of the ramp signal VRAMP_J over time t413 to time t414 is set as a second threshold voltage value VREF2, and the same period is set as a decision period 2.

In the decision period 2, the comparator 303 compares the second threshold voltage value VREF2 with the amplified pixel signal AMPOUT and outputs a comparison result signal. The comparison result signal at this time is set as a second comparison result signal and becomes the second decision value J2. In a case in which the amplified pixel signal AMPOUT is lower than the second threshold voltage value VREF2 (AMPOUT<VREF2), the comparator output COMPOUT changes in polarity from the low level to the high level. At this time, the second decision value J2 becomes "1".

On the other hand, in a case in which the amplified pixel signal AMPOUT is higher than the second threshold voltage value VREF2 (AMPOUT≥VREF2), the comparator output COMPOUT maintains the low level. At this time, the second decision value J2 becomes "0". The second decision value J2 is held in the second bit of the decision value memory 305C. After time t414, the ramp signal VRAMP is reset. In the case of FIG. 4, since the amplified pixel signal AMPOUT is greater than the second threshold voltage value VREF2, the first decision value J1 becomes "0", and "0" is maintained in the second bit of the decision value memory 305C.

A period from time t414 to time t417 becomes an S signal acquisition period. In a period from time t414 to time t415, the selection circuit 306 sends a control signal to the amplification factor switching circuit 302 on the basis of the second decision value J2. During the same period, the amplification factor switching circuit 302 switches the switches SW1, SW2, SW3, and SW4 included in the column amplifier 301 on the basis of the control signal.

In the case of FIG. 4, the selection circuit 306 has the second decision value J2 to be "0" and sends a control signal to the amplification factor switching circuit 302 such that the amplification factor of the column amplifier 301 changes from 4 times (the first amplification factor) to one time (the second amplification factor). The amplification factor switching circuit 302 turns on the switches SW3 and SW4 on the basis of the control signal. The amplification factor of the column amplifier 301 changes from 4 times to one time, and the signal level of the amplified pixel signal AMPOUT decreases.

On the other hand, in a case in which the second decision value stored in the decision value memory 305C is "1", the selection circuit 306 does not output a control signal to the amplification factor switching circuit 302 for the column amplifier 301. Subsequently, during the same period, the selection circuit 306 sends a control signal to the ramp signal switching circuit 304 on the basis of the first decision value J1 stored in the decision value memory 305C. On the basis of the control signal, the ramp signal switching circuit 304 selects a ramp signal to be input to the comparator 303 at time t415.

In the case of FIG. 4, the first decision value J1 stored in the decision value memory 305C is "0". Accordingly, the selection circuit 306 sends a control signal to the ramp signal switching circuit 304 such that the ramp signal VRAMP_H is input to the comparator 303. On the other hand, in a case in which the first decision value J1 stored in the decision value memory 305C is "1", the selection circuit 306 inputs the ramp signal VRAMP_L to the comparator 303.

At time t415, the ramp signal starts an output change with a constant change rate. The counter circuit 106 starts counting clock pulse signals in synchronization with the output change of the ramp signal.

In this embodiment, the ramp signal VRAMP_H is input to comparator 303 at time t415. At time t416, when the voltage of the ramp signal VRAMP_H is above the amplified pixel signal AMPOUT, the signal polarity of the comparison result signal COMPOUT output by the comparator 303 changes. The S memory 305B maintains the value of a count signal CNT at time t416 as an S signal.

After time t417, the ramp signal VRAMP and the count signal CNT are reset and initialized. In the case of FIG. 4, as the amplified pixel signal AMPOUT, although in a case in which a target for which a pixel has high luminance is perceived, and the output of the amplified pixel signal is large, by switching the amplification factor of the column amplifier 301 and the voltage change rate of the ramp signal, S-conversion sensitivity that is defined using a product value thereof is reduced to enable appropriate AD conversion.

On the other hand, in contrast to this embodiment, in a case in which the output of the amplified pixel signal is too small, the S-conversion sensitivity is raised by raising the amplification factor of the column amplifier 301 to reduce the voltage change rate of the ramp signal, whereby signal detection capable of acquiring high resolution can be performed even for a weak amount of light. In this way, a wide detection dynamic range is realized.

Here, description of the AD conversion sensitivity will be additionally provided. In this embodiment, in an AD conversion period of the S signal from time t415 to time t417, the voltage change rate of VRAMP_H becomes four times higher that of the ramp signal VRAMP_L. As described above, an AD conversion value becomes the value of the count signal CNT output by the counter circuit 106 at the time of the inversion of the magnitude relation between the ramp signal and the amplified pixel signal. The earlier the inversion of the magnitude relation between the ramp signal and the amplified pixel signal, the smaller the value of the count signal CNT becomes, resulting in a smaller AD conversion value.

As illustrated in the period from time t415 to time t417 in FIG. 4, the ramp signal VRAMP_H of which the voltage change rate is high has earlier inversion of the magnitude relation described above than the ramp signal VRAMP_L of which the voltage change rate is low. In other words, the ramp signal VRAMP_H has a small value as the AD conversion value and thus has low AD conversion sensitivity. On the other hand, the ramp signal VRAML_L of which the voltage change rate is low has delayed inversion of the magnitude relation described above and has a large value as the AD conversion value, and thus the AD conversion sensitivity is high. The ratio of the voltage change rate of the ramp signal causes a difference in the counter value in accordance with a reciprocal thereof.

Here, the description of the relation between the first threshold voltage value VREF1 and the second threshold voltage value VREF2 according to this embodiment will be additionally provided. In a case in which the amplified pixel signal input to comparator 303 is constantly greater than the ramp signal in the S signal acquisition period, polarity inversion of the comparison signal COMPOUT does not occur, and a correct count signal CNT is not acquired. Therefore, in the S-signal acquisition period, an inversion period in which the amplified pixel signal becomes smaller than the ramp signal needs to be present all the time.

The first threshold voltage value VREF1 is a threshold voltage for switching the ramp signal input to the comparator 303 at the time of acquisition of the S-signal. In a case in which the first threshold voltage value VREF1 is smaller than the ramp signal VRAMP_L at time t417, an inversion period is present in S signal acquisition using the ramp signal VRAMP_L. Therefore, it is preferable that the first threshold voltage value VREF1 should be set equal to or less than the signal level of VRAMP_L at time t417 as represented in the following (Equation 1).

$$VREF1 \leq \text{VRAMP\_L}\,(t417) \qquad \text{(Equation 1)}$$

In a case in which the amplified pixel signal is greater than VREF1, the signal is switched to the ramp signal VRAMP_H at the time of acquisition of the S signal.

The second threshold voltage value VREF2 is a threshold voltage for switching the amplification factor of the column amplifier 301 at the time of acquiring the S signal. In a case in which the amplified pixel signal becomes larger than the ramp signal VRAMP_H at time t417, the second threshold voltage value VREF2 becomes a reference signal for decreasing the amplification factor of the column amplifier 301 to generate an inversion period. Therefore, it is preferable that the second threshold voltage value VREF2 should be set equal to or lower than the ramp signal VRAMP_H at time t417 as represented in the following (Equation 2).

$$VREF2 \leq \text{VRAMP\_H}\,(t417) \qquad \text{(Equation 2)}$$

The following Equation 3 is formed from the ratio of voltage change rates of the ramp signal VRAMP_L and the ramp signal VRAMP_H.

$$VREF1 < VREF2 \qquad \text{(Equation 3)}$$

Here, a maximum threshold voltage value included in the first threshold voltage value is smaller than a minimum threshold voltage value included in the second threshold voltage value. The reason for excluding the equal sign in the relation between the first threshold voltage value VREF1 and the second threshold voltage value VREF2 is for the purpose of S-signal correction, which will be described below.

Next, in this embodiment, a method of selecting the amplification factor of the column amplifier 301 at the time of acquiring an S signal and the ramp signal to be input to the comparator 303 in accordance with the signal level of the amplified pixel signal AMPOUT input to the comparator 303 in a decision period will be described.

Figure 5:
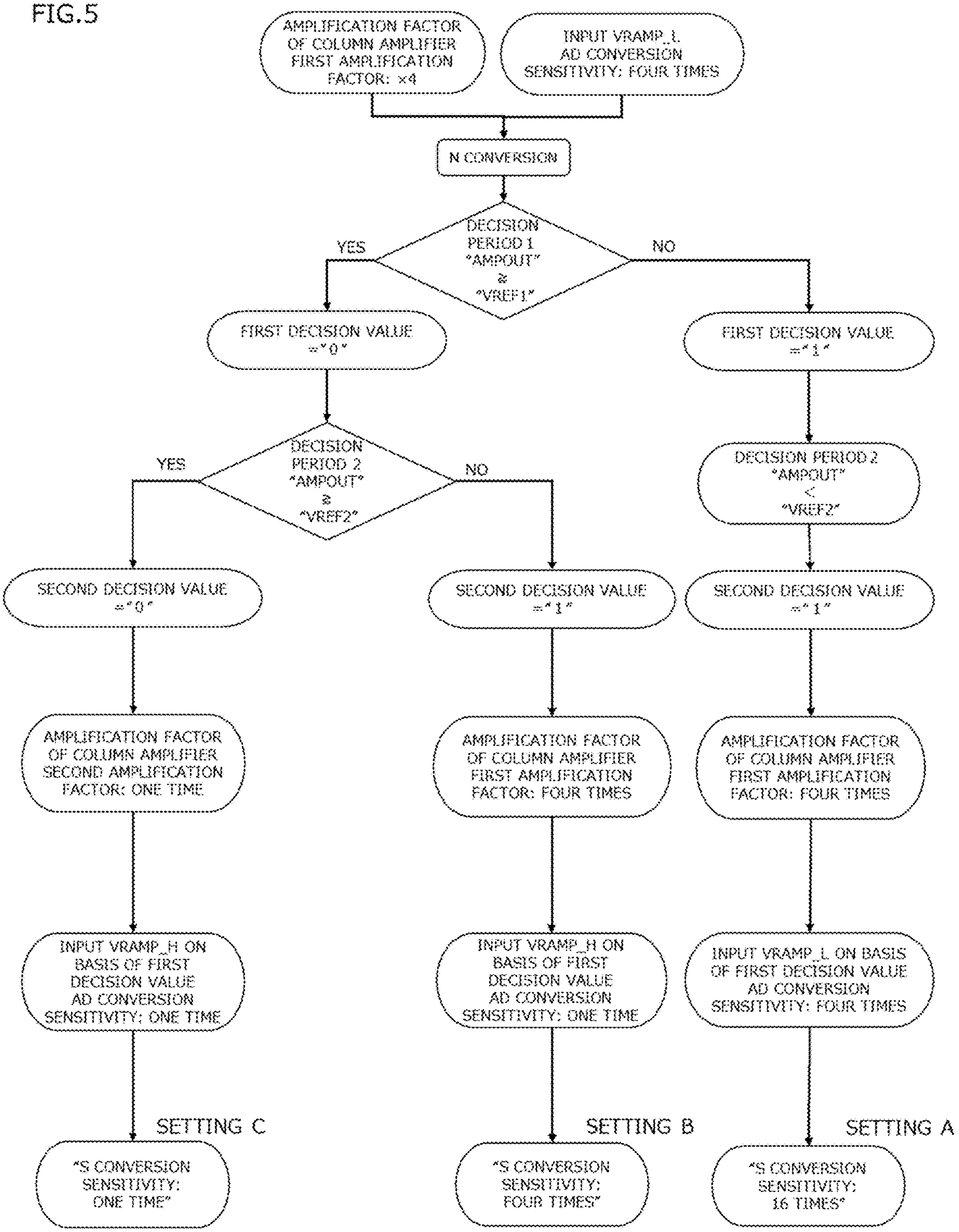
FIG. 5 is a flowchart illustrating S-conversion sensitivity setting according to the first embodiment.

FIG. 5 is a flowchart illustrating a method of selecting the amplification factor of the column amplifier 301 and the ramp signal to be input to the comparator 303 at the time of acquiring a S signal in the photoelectric conversion apparatus according to this embodiment. As combinations of the amplification factor of the column amplifier 301 and the ramp signal input to the comparator 303 according to this embodiment, there are three patterns including "Setting A", "Setting B", and "Setting C", which will be described. Initially, the amplification factor of the column amplifier 301 is set to 4 times that is a first amplification factor. The ramp signal VRAMP_L is input to the comparator 303 from the ramp signal switching circuit 304. Under this condition, an N signal is acquired. The description presented above is common to each setting.

Hereinafter, each of these settings will be described. First, "Setting A" will be described. "Setting A" represents an example in which light of low-luminance is emitted to the pixel of which the signal level of the amplified pixel signal AMPOUT is low. In the decision period 1, the amplified pixel signal AMPOUT is compared with the first threshold voltage value VREF1. In "Setting A", AMPOUT<VREF1, and the first decision value J1 becomes "1". "1" is stored in the first bit of the decision value memory 305C.

In the decision period 2, the amplified pixel signal AMPOUT is compared with the second threshold voltage value VREF2, and AMPOUT<VREF2 according to the relation of VREF1<VREF2. Accordingly, the second decision value J2 becomes "1", and "1" is stored in the second bit of the decision value memory 305C.

As the amplification factor of the column amplifiers, four times that is the second amplification factor is maintained. At time t415, on the basis of the first decision value J1=1 stored in the decision value memory 305C, the selection circuit 306 sends a control signal to the ramp signal switching circuit 304. The ramp signal switching circuit 304 inputs the ramp signal VRAMP_L to the comparator 303, and the AD conversion sensitivity becomes four times. In this way, in "Setting A", the ramp signal VRAMP_L, in which the amplification factor of the column amplifier 301 is 4 times that is the first amplification factor, and the AD conversion sensitivity also becomes 4 times, is input to the comparator 303. At this time, an S signal is acquired in a state in which the S-conversion sensitivity, which is defined as the product value of the amplification factor of the column amplifier 301 described above and the AD conversion sensitivity according to the voltage change rate of the ramp signal, is 4×4=16 times.

Subsequently, "Setting B" will be described. "Setting B" represents an example in which light of intermediate luminance is emitted to the pixel of which the signal level of the amplified pixel signal AMPOUT is an about an intermediate level. In the decision period 1, the amplified pixel signal AMPOUT is compared with the first threshold voltage value VREF1. In "Setting B", "AMPOUT≥VREF1" is satisfied, and the first decision value J1 becomes "0". "0" is stored in the first bit of the decision value memory 305C.

Next, in the decision period 2, the amplified pixel signal AMPOUT is compared with the second threshold voltage value VREF2. In "Setting B", "AMPOUT<VREF2" is satisfied, and the second decision value J2 becomes "1". "1" is stored in the second bit of the decision value memory 305C. In accordance with this, the amplification factor of the column amplifiers is switched to the second amplification factor to be one time from four times. At time t415, on the basis of the first decision value J1=0 stored in the decision value memory 305C, the selection circuit 306 sends a control signal to the ramp signal switching circuit 304.

The ramp signal switching circuit 304 inputs the ramp signal VRAMP_H to the comparator 303, and the AD conversion sensitivity becomes 1 time. In this way, in "Setting B", the ramp signal VRAMP_L, in which the amplification factor of the column amplifier 301 becomes four times that is the first amplification factor, and the AD conversion sensitivity becomes one time, is input to the comparator 303. At that time, the S signal of which the S conversion sensitivity is 4×1=4 times is acquired.

Finally, "Setting C" will be described. "Setting C" represents an example in which light of high luminance is emitted to the pixel of which the signal level of the amplified pixel signal AMPOUT is high. In the decision period 1, the amplified pixel signal AMPOUT including an image signal is compared with the first threshold voltage value VREF1. In "Setting C", "AMPOUT≥VREF1" is satisfied, and the first decision value J1 becomes "0". "0" is stored in the first bit of the decision value memory 305C.

Next, in the decision period 2, the amplified pixel signal AMPOUT including an image signal is compared with the second threshold voltage value VREF2. In "Setting C", "AMPOUT≥VREF2" is satisfied, and the second decision value J2 becomes "0". "0" is stored in the second bit of the decision value memory 305C. In accordance with this, the amplification factor of the column amplifiers is switched to the second amplification factor to become one time from four times. At time t415, on the basis of the first decision value "0" stored in the decision value memory 305C, the selection circuit 306 sends a control signal to the ramp signal switching circuit 304. The ramp signal switching circuit 304 inputs the ramp signal VRAMP_H to the comparator 303, and the AD conversion sensitivity becomes one time. In this way, in "Setting C", the ramp signal VRAMP_L of which the AD conversion sensitivity is one time is input to comparator 303 with the first amplification factor for which the amplification factor of the column amplifier 301 becomes one time. At this time, the S signal is acquired with the S conversion sensitivity being 1×1=1 time.

As described above, on the basis of the result of judging the amplified image signal AMPOUT from the column amplifier 301 in the decision period, an S signal value of which the S conversion sensitivity is switched to 16 times, four times, or one time can be acquired.

Regarding the setting, settings of two ways of the amplification factor of the column amplifier to be four times and one time can be performed, two ways of four times and one time of the AD conversion sensitivity of the ramp signal can be selected, as combinations thereof, there are 2×2=4 ways, and S-signal conversion is performed using three ways of settings among the four ways in this embodiment. In this way, when switching is performed from "Setting A" to "Setting B" and from "Setting B" to "Setting C", an operation in which only one of the amplification factor of the column amplifier 301 and the voltage change rate of the ramp signal is changed is performed. Here, although an example of the combinations of 2×2=4 ways is illustrated, this embodiment is not limited thereto. For example, in a case in which the amplification factor can be selected in N ways, and the AD conversion sensitivity of the ramp signal can be set in M ways, there can be M×N ways of combinations of settings of the AD conversion sensitivity and the amplification factor of the column amplifier. In this case, the S-signal conversion is performed through switching of less than M×N ways. At this time, the first threshold voltage value is formed from M−1 (M>1) threshold voltages, and the second threshold voltage value is formed from N−1 (N>1) threshold voltages.

Although the switching of settings requires a correction process for the S signal to be described below, if only one thereof is to be changed, by preventing the generation of correction errors due to the complication of the correction process, good signal characteristics can be acquired. As represented in (Equation 3), the reason for VREF1/VREF2 as the relation between the first threshold voltage value VREF1 and the second threshold voltage value VREF2 is similar. In a case in which these are equal to each other, also in switching of patterns, it is determined that the switching of the amplification factor of the column amplifier 301 and the switching of the ramp signal have occurred simultaneously.

Next, a magnification correction process for the S signal in the signal processing circuit 109 according to this embodiment will be described with reference to FIGS. 6A and 6B. The horizontal axis is the signal level (the unit is voltage value V) of the pixel signal PIXOUT that correlates with the amount of light incident in the pixel 101. The vertical axis is an output value (the unit is LSB) acquired by performing a correction process in the signal processing circuit 109.

First, a difference in the correction magnification of the S signal according to a difference in the second decision value J2, which is stored in the decision value memory 305C at the time of acquiring an S signal, will be described with reference to FIG. 6A. It is assumed that the pixel signal PIXOUT changes in amplitude up to a maximum voltage value of VA2 [V] in accordance with the amount of light incident in the pixel 101. When the amplification factor of the column amplifier 301 is four times, an AD conversion value DA1 [LSB] is acquired when the pixel signal PIXOUT has a voltage value VA1 [V] that is ¼ times a voltage value VA2 [V]. In addition, when the amplification factor of the column amplifier 301 is one time, the AD conversion value DA1 [LSB] is acquired also when the pixel signal PIXOUT has the voltage value VA2 [V].

The N signal, the S signal, and the decision value are sent to the signal processing circuit 109, and from which one of Settings A/B/C the S signal acquired through AD conversion is acquired can be detected from the decision value. In other words, the magnification correction of the S signal is performed on the basis of the decision value. The amplification factor of the column amplifier 301 at the time of acquiring an S signal is stored in the decision value memory 305C as a second decision value J2. In a case in which the second decision value J2 is J2=0, the S signal input to the signal processing circuit 109 is not corrected. On the other hand, in a case in which the second decision value J2 is J2=1, the S signal becomes four times through the magnification correction process.

The voltage value VA1 [V] is a voltage value that serves as a boundary for switching the amplification factor of the column amplifier 301 at the time of acquiring an S signal. When the column amplifier 301 converts the voltage value VA1 [V] into the amplified pixel signal AMPOUT at the first amplification factor (×4 times), it corresponds to the second threshold voltage value VREF2. When the pixel signal PIXOUT is in a range (a thick line) of a voltage value of 0 [V] to the voltage value VA1 [V], the amplification factor of the column amplifier 301 at the time of acquiring an S signal becomes the first amplification factor (×4 times). At this time, the magnification correction processing is not performed for the S signal by the signal processing circuit 109.

On the other hand, when the pixel signal PIXOUT is in a range (a one-dot chain line) of the voltage value VA1 [V] to the voltage value VA2 [V], the amplification factor of the column amplifier 301 at the time of acquiring an S signal becomes the second amplification factor (×1 time). At this time, the magnification correction process that multiplies the value by four is performed for the S signal by the signal processing circuit (a thick one-dot chain line). Although the magnification-corrected S signal has a rougher output resolution by the correction magnification, the output bits are extended. In this way, the S signal is corrected by the signal processing circuit 109 to expand the dynamic range by having high resolution at low luminance and reducing resolution at high luminance to widen the light detection range.

Next, the correction magnification with the difference in the voltage change rate of the ramp signal also taken into account in addition to the difference in the amplification factor of the column amplifier 301 at the time of acquiring an S signal will be described with reference to FIG. 6B.

Figure 6A:
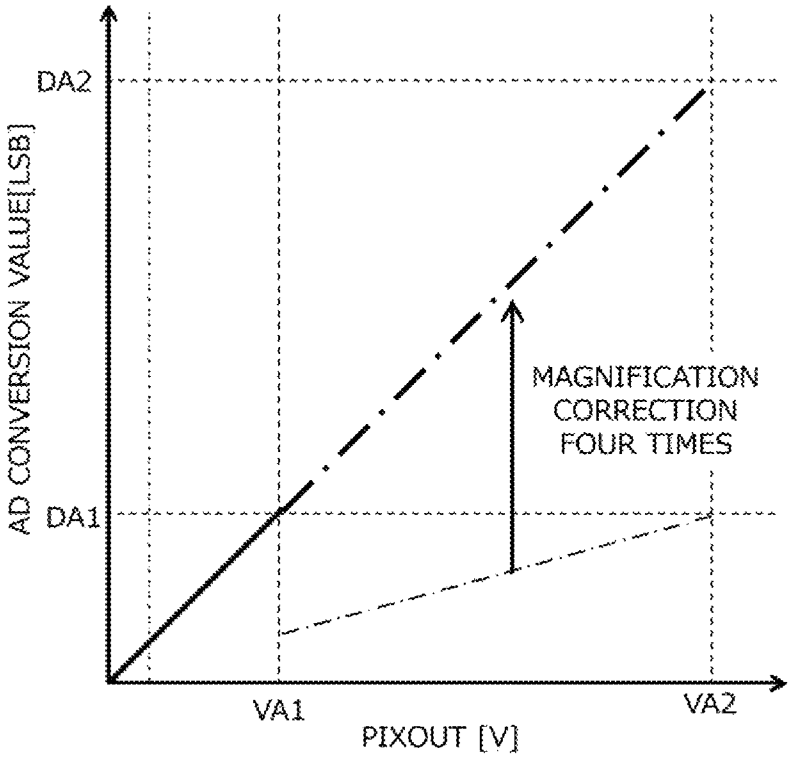
FIGS. 6A and 6B are diagrams illustrating magnification correction of a signal processing circuit according to the first embodiment.
Figure 6B:
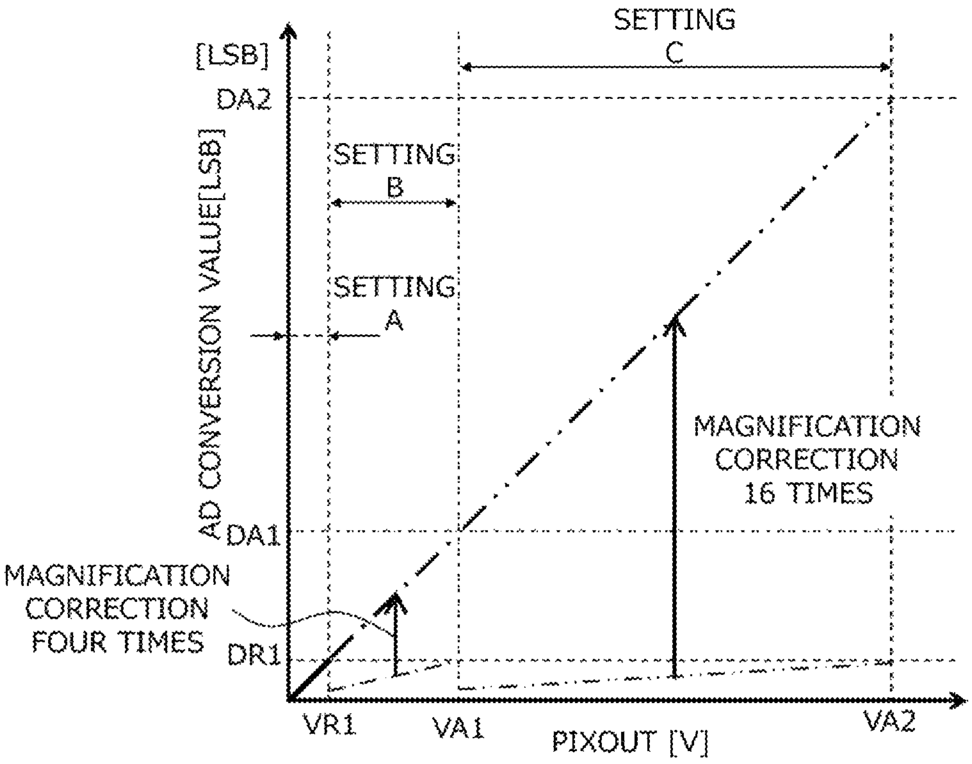

In this embodiment, in a range up to a voltage value VR1 [V] corresponding to ¼ times a range from the voltage value of 0 [V] to VA1 [V] in which AD conversion is performed with the amplification factor of the column amplifier 301 being four times illustrated in FIG. 6A, the ramp signal VRAMP_L is input to comparator 303. In case of the voltage value being above the range, the ramp signal VRAMP_H is input to comparator 303.

The pixel signal PIXOUT has the voltage value VR1 [V] and, in the condition of Setting A, the AD conversion value DR1 [LSB] is acquired. The AD conversion value DR1 [LSB] is set to a maximum value of the count value that the counter circuit 106 counts in a period from time t415 to time t417. On the other hand, when the pixel signal PIXOUT has a voltage value VA1 [V] that is four times the voltage value VR1 [V], and also in the condition of Setting B, the AD conversion value DR1 [LSB] is acquired. When the pixel signal PIXOUT has a voltage value VA2 [V] that is 4×4=16 times the voltage value VR1 [V], and, also in the condition of Setting C, the AD conversion value DR1 [LSB] is acquired. Magnification correction is performed for the AD conversion values that are S signals acquired in these different settings on the basis of the first decision value J1 and the second decision value J2 stored in the decision value memory 305C.

In a case in which the first decision value J1 and the second decision value J2 stored in the decision value memory 305C are respectively J1="1" and J2="1", the S signal is not corrected. A range of the pixel signal PIXOUT from the voltage value of 0 [V] to the voltage value VR1 [V] corresponds to this (a thick line). In a case in which the first decision value J1 and the second decision value J2 stored in the decision value memory 305C are respectively J1="0" and J2="1", magnification correction of four times is performed for the S signal. A range of the pixel signal PIXOUT from the voltage value VR1 [V] to the voltage value VA1 [V] corresponds to this, and the magnification of the S signal before correction (a one-dot chain line) is corrected and becomes an S signal multiplied by four (a thick one-dot chain line). Here, the pixel signal PIXOUT switches between "Setting A" and "Setting B" using the voltage value VR1 [V] as its boundary.

When the voltage value VR1 [V] is converted into the amplified pixel signal AMPOUT at the first amplification factor, it corresponds to the first threshold voltage value VREF1. In addition, the pixel signal PIXOUT switches between "Setting B" and "Setting C" using the voltage value VA1 [V] as its boundary. When an output at which the pixel signal PIXOUT becomes the voltage value VA1 [V] is converted into the amplified pixel signal AMPOUT at the first amplification factor, it corresponds to the second threshold voltage value VREF2. In a case in which the first decision value J1 and the second decision value J2 stored in the decision value memory 305C are respectively J1="0" and J2="0", magnification correction of 16 times is performed for the S signal. A range of the pixel signal PIXOUT from the voltage value VA1 [V] to the voltage value VA2 [V] corresponds to this, and an S signal (a thick two-dot chain line) acquired by multiplying the S signal before correction (a two-dot chain line) by 16 is acquired.

In this way, a magnification correction process is performed for a combination of the amplification factor of the column amplifier 301 at the time of acquiring an S signal and the ramp signal on the basis of a decision value. In this way, both a dynamic range exceeding the number of output bits that can be acquired as an S signal and high resolution at low luminance can be achieved with one-time AD conversion. However, actually, there may be a ratio error in the amplification factor of the column amplifier 301 that can be set and a ratio error in the voltage change rates between ramp signals to be selected. These ratio errors may produce offsets in a digital signal at a boundary point at which switching between the settings described above is performed. When there is a difference in the linearity of signals output in "Setting A", "Setting B", and "Setting C", an offset at the boundary point may occur as well.

Figure 7:
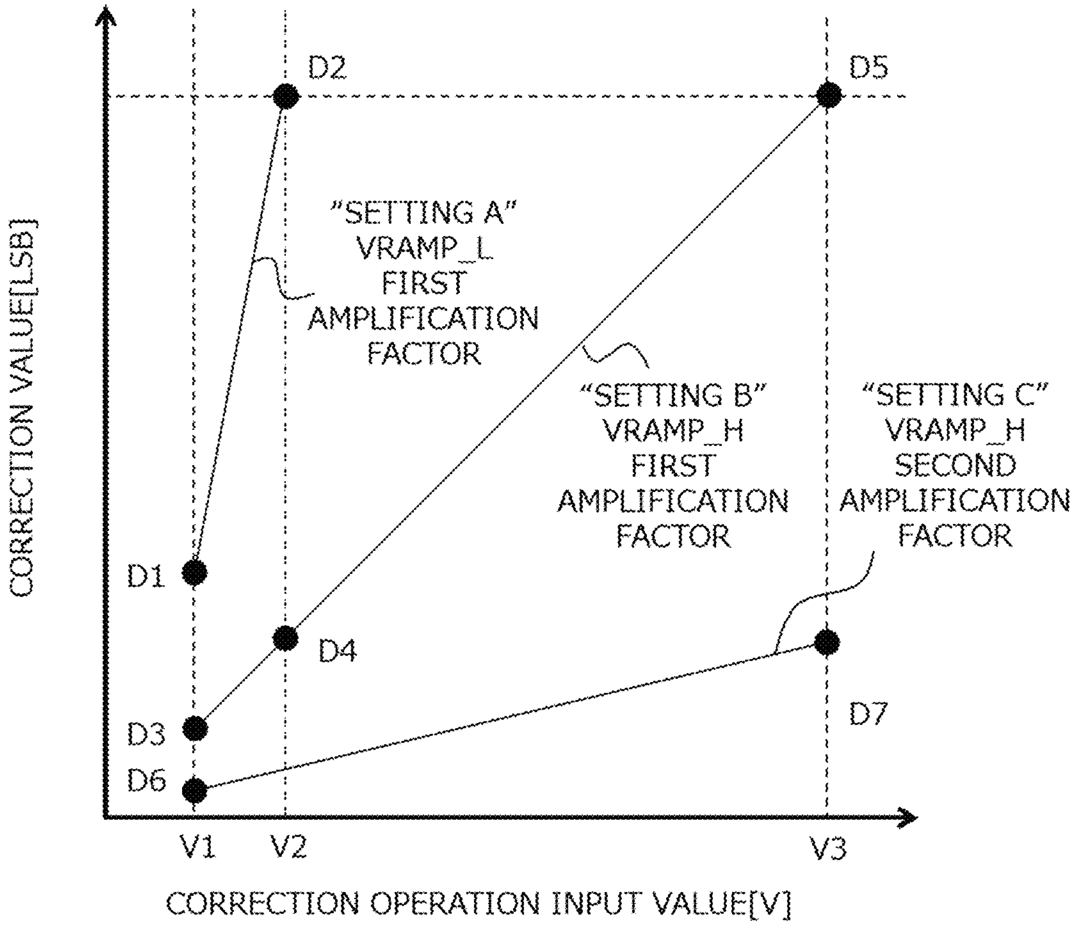
FIG. 7 is a diagram illustrating S-signal error correction according to the first embodiment.

Hereinafter, an error correction processing method for reducing such offsets and errors in the linearly will be described. FIG. 7 is a diagram illustrating S-signal error correction according to this embodiment. In the error correction process, a correction value used for the error correction process is acquired in a dedicated correction value acquiring operation. In the correction value acquiring operation, signals input to the column circuit 104 are not the pixel signals from the pixels but correction operation input values V1, V2, and V3 from a reference voltage source, which is not illustrated in the drawing, connected to the vertical output line 102. At each of the settings "Setting A", "Setting B", and "Setting C" used in the S-signal acquisition period, the correction value is acquired by performing AD conversion of this correction operation input value.

A correction value acquired by inputting a correction operation input value V1 to the column circuit 104 will be described. A value acquired by performing AD conversion in "Setting A" is set as a correction value D1. A value acquired by performing AD conversion in "Setting B" is set as a correction value D3. A value acquired by performing AD conversion in "Setting C" is set as a correction value D6. Next, a correction value acquired by inputting a correction operation input value V2 to the column circuit 104 will be described.

A value acquired by performing AD conversion in "Setting A" is set as a correction value D2. A value acquired by performing AD conversion in "Setting B" is set as a correction value D4. Subsequently, a correction value acquired by inputting a correction operation input value V3 to the column circuit 104 will be described. A value acquired by performing AD conversion in "Setting B" is set as a correction value D5. A value acquired by performing AD conversion in "Setting C" is set as a correction value D7.

Hereinafter, a method for calculating a ratio error of the amplification factor of the column amplifier 301 and a ratio error of the voltage change rate of the ramp signal using the acquired correction values will be described. First, the ratio error of the voltage change rate of the ramp signal is acquired from a ratio of slopes (or differential values) of straight lines acquired by joining the correction value D2 and the correction value D1 acquired in "Setting A" and the correction value D4 and the correction value D3 acquired in "Setting B". This is set as a linearity correction value α1.

$$\alpha 1 = \{(D2 - D1)/(D4 - D3)\}/4 \quad \text{(Equation 4)}$$

The S signal acquired in "Setting B" is multiplied by the linearity correction value α1, and the linearity of the S signal acquired in "Setting B" is corrected to match the linearity of the signal acquired in "Setting A". In other words, the standard of the linearity is the linearity of the signal acquired in "Setting A". Similarly, the ratio error of the amplification factor of the column amplifier 301 is acquired from a ratio of slopes (or differential values) of straight lines acquired by joining the correction value D5 and the correction value D3 acquired in "Setting B" and the correction value D7 and the correction value D6 acquired in "Setting C". This is set as a linearity correction value α2.

$$\alpha 2 = \{(D5 - D3)/(D7 - D6)\}/4 \quad \text{(Equation 5)}$$

The linearity correction value α2 is used for correcting the linearity of the S signal acquired in the state of "Setting C" to match the linearity of the S signal acquired in the state of "Setting B". However, the S signal acquired in "Setting B" is multiplied by the linearity correction value α1 to match the linearity of "Setting A". For this reason, in correction for a signal acquired in the state of "Setting C", the signal is multiplied by α1 in addition to α2. In accordance with this, the linearity of the signal acquired in the state of "Setting C" is corrected to match the linearity of the signal acquired in "Setting A".

Next, a method of calculating the amount of offset between patterns that can occur at a boundary point at which setting is switched and an output value output from the signal processing circuit 109, of which the linearity and the offset have been corrected, will be described.

First, the calculation of an offset correction value β1 for an offset that occurs at the time of switching from "Setting A" to "Setting B" will be described. A correction value D4 acquired in "Setting B" in a correction value acquiring operation becomes a post-correction output 4×α1×D4 in accordance with magnification correction and linearity correction. When this post-correction output is equal to the correction value D2, no offset occurs. In other words, a differential value between this D2 and 4×α1×D4 becomes the offset correction value β1.

$$\beta 1 = D2 - 4 \times \alpha 1 \times D4 \quad \text{(Equation 6)}$$

Therefore, the S signal acquired in "Setting B" is corrected by the signal processing circuit 109, and the output signal SB is as below.

$$SB = 4 \times \alpha 1 \times S + \beta 1 - N \quad \text{(Equation 7)}$$

Here, Nis an N signal.

Next, the calculation of the offset correction value β2 that occurs at the time of switching from "Setting B" to "Setting C" will be described. The correction value D7 acquired in "Setting C" in the correction value acquiring operation becomes a post-correction output 16×α1×α2×D7 in accordance with magnification correction and linearity correction. When this post-correction output is equal to the post-correction output 4×α1×D5 acquired by performing magnification correction and linearity correction for the correction value D5, no offset occurs. In other words, a differential value between post-correction outputs becomes an offset correction value β2.

$$\beta 2 = 4 \times \alpha 1 \times D5 - 16 \times \alpha 1 \times \alpha 2 \times D7 \quad \text{(Equation 8)}$$

Thus, a signal SC that is acquired by correcting and outputting the S signal acquired in "Setting C" using the signal processing circuit 109 is as follows through subtraction of the N signal.

$$SC = 16 \times \alpha 1 \times \alpha 2 \times S + \beta 2 - N \quad \text{(Equation 9)}$$

The correction process of the signal processing circuit 109 is not performed for the S signal acquired in "Setting A", and the output from the signal processing circuit 109 is as follows.

$$SA = S - N \tag{Equation 10}$$

In this way, by correcting the S signal using the linearity correction values α1 and α2 and the offset correction values β1 and β2 acquired by the correction operation, a signal that represents good linearity characteristics for the amount of incident light can be acquired. In this embodiment, by defining the relation between the first threshold voltage value VREF1 and the second threshold voltage value VREF2 as (Equation 3), in switching of the setting, only one of the voltage change rate of the ramp signal and the amplification factor of the column amplifier is changed. The correction is simplified in accordance with this, and the occurrence of a correction error according to complications of the correction process is suppressed. Here, it is preferable that the correction operation input values V2 and V3 should have values similar to the pixel signal PIXOUT at the time of switching of the pattern. In a case in which nonlinearity is included in the output characteristics, the offset error can be reduced.

Figure 8:
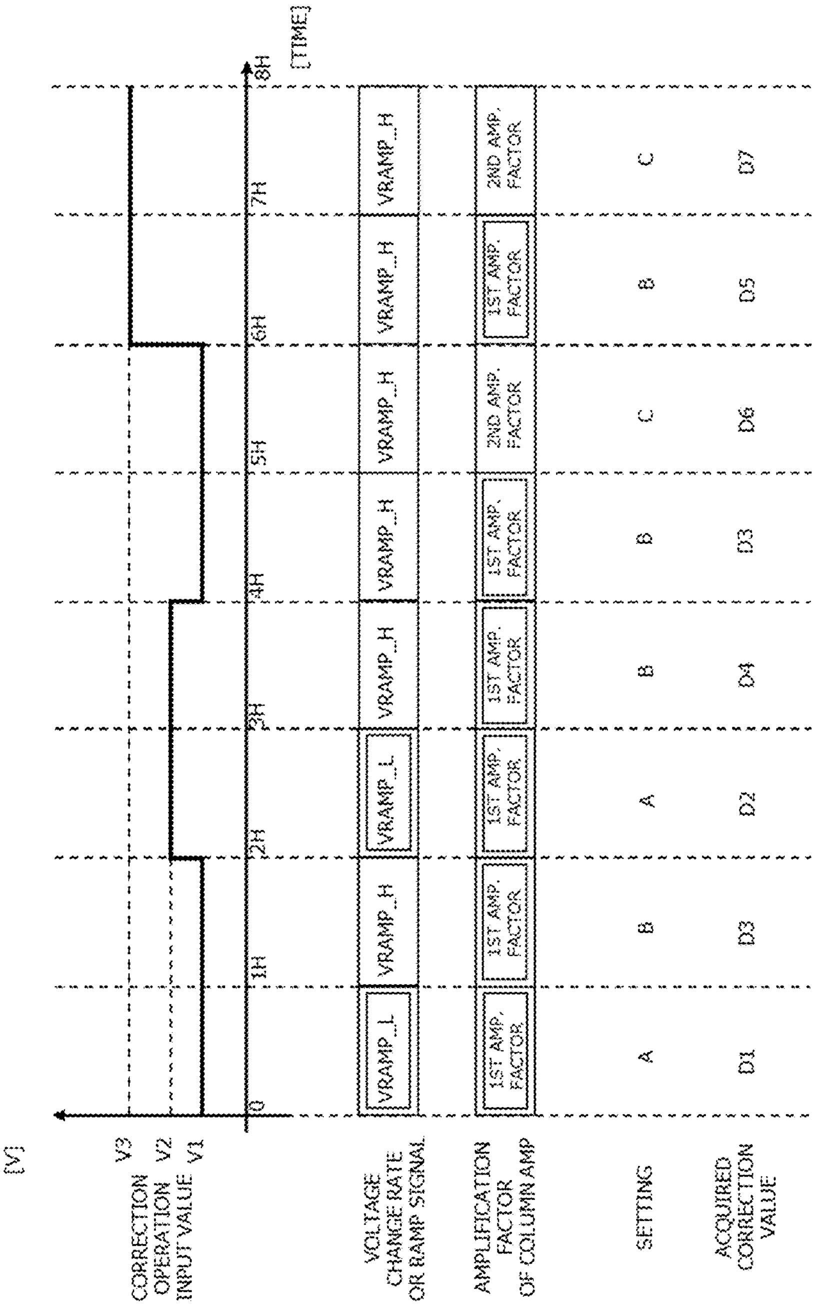
FIG. 8 is a diagram illustrating a method of outputting correction values according to the first embodiment.

Next, a method of acquiring correction values during an imaging operation will be described. FIG. 8 is a diagram illustrating a method of outputting correction values in the photoelectric conversion apparatus according to this embodiment. Here, a time required for reading pixels 101 corresponding one row among pixels 101 arranged in a matrix pattern is assumed to be 1H. FIG. 8 illustrates a setting state of a correction operation input value, a voltage change rate of the ramp signal, and an amplification factor of the column amplifier input to the column circuit 104 in a time series in unit of 1H times. As correction values, correction values D1, D2, D3, D4, D5, D6, and D7 are output for each row by sequentially switching the correction operation input value, the amplification factor of the column amplifier, and the voltage change rate of the ramp signal using a read time corresponding to 8 rows 1H to 8H. This operation may be performed using rows, which are formed from pixels not used for imaging, representing non-sensitivity, for example, such as optical black rows or the like.

In the correction value acquiring operation, in a period from time 0 to time 1H, the correction value D1 is acquired. In this period, the correction operation input value V1 is input, and the column circuit 104 performs AD conversion in "Setting A". Then, the S signal of a row output in this period becomes the correction value D1.

In a period from time 1H to time 2H, the correction value D3 is acquired. In this period, the correction operation input value V1 is input, and the column circuit 104 performs AD conversion in "Setting B". Then, the S signal of the row output in this period becomes the correction value D3.

In a period from time 2H to time 3H, the correction value D2 is acquired. In this period, the correction operation input value V2 is input, and the column circuit 104 performs AD conversion in "Setting A". Then, the S signal of the row output in this period becomes the correction value D2.

In a period from time 3H to time 4H, the correction value D4 is acquired. In this period, the correction operation input value V2 is input, and the column circuit 104 performs AD conversion in "Setting B". Then, the S signal of the row output in this period becomes the correction value D4.

A period from time 4H to time 5H is in the same state as that of the period of time 2H from time 1H, and the correction value D3 is output. Measurement is performed in consideration of symmetry in a time series.

In a period from time 5H to time 6H, the correction value D6 is acquired. In this period, the correction operation input value V1 is input, and the column circuit 104 performs AD conversion in "Setting C". Then, the S signal of the row output in this period becomes the correction value D6.

In a period from time 6H to time 7H, the correction value D5 is acquired. In this period, the correction operation input value V3 is input, and the column circuit 104 performs AD conversion in "Setting B". Then, the S signal of the row output in this period becomes the correction value D5.

In a period from time 7H to time 8H, the correction value D7 is acquired. In this period, the correction operation input value V3 is input, and the column circuit 104 performs AD conversion in "Setting C". Then, the S signal of the row output in this period becomes the correction value D7. The correction values D1, D2, D3, D4, D5, D6, and D7 acquired for time 8H in this way are input to the signal processing circuit 109 and are used for a correction process.

As above, by setting the first threshold voltage used for judging the voltage change rate of the ramp signal to be smaller than the second threshold voltage used for judging the amplification factor of the column amplifier, expansion of the dynamic range and implementation of a high speed are realized by S-signal conversion of one time without performing a complex correction process. In the description presented above, although an example in which comparison result signals are generated in order of the first comparison result signal and the second comparison result signal is illustrated, they may be generated in order of the first comparison result signal and the second comparison result signal. In that case, it is preferable that a maximum threshold voltage value included in the second threshold voltage value described above should be smaller than a minimum threshold voltage value included in the first threshold voltage value described above.

Although the amplification factor of the column amplifier 301 and the voltage change rate of the ramp signal are set to 4 times in this embodiment, the configuration is not limited thereto. In addition, the method of acquiring correction values, the magnification correction and the correction of the linearity error and the offset error are not limited to those of this description, and the standard settings for correction may be arbitrarily changed. The combination of input capacitors and feedback capacitors of the column amplifier and the number of mounted column amplifiers are also examples. The signal amplification factors of the ramp signal are also examples, and these can be changed arbitrarily. Although the decision value is 2-bits information in this embodiment, the configuration is not limited thereto, and it may be two bits or more.

Second Embodiment

A photoelectric conversion apparatus according to a second embodiment will be described with reference to FIGS. 9 and 10. In the second embodiment, an operation of selecting the amplification factor of a column amplifier in an S-signal acquisition period is performed first in a decision period. The configuration of a photoelectric conversion apparatus and the configurations of a pixel circuit and a column circuit are the same as those according to the first embodiment, and thus description thereof will be omitted.

Figure 9:
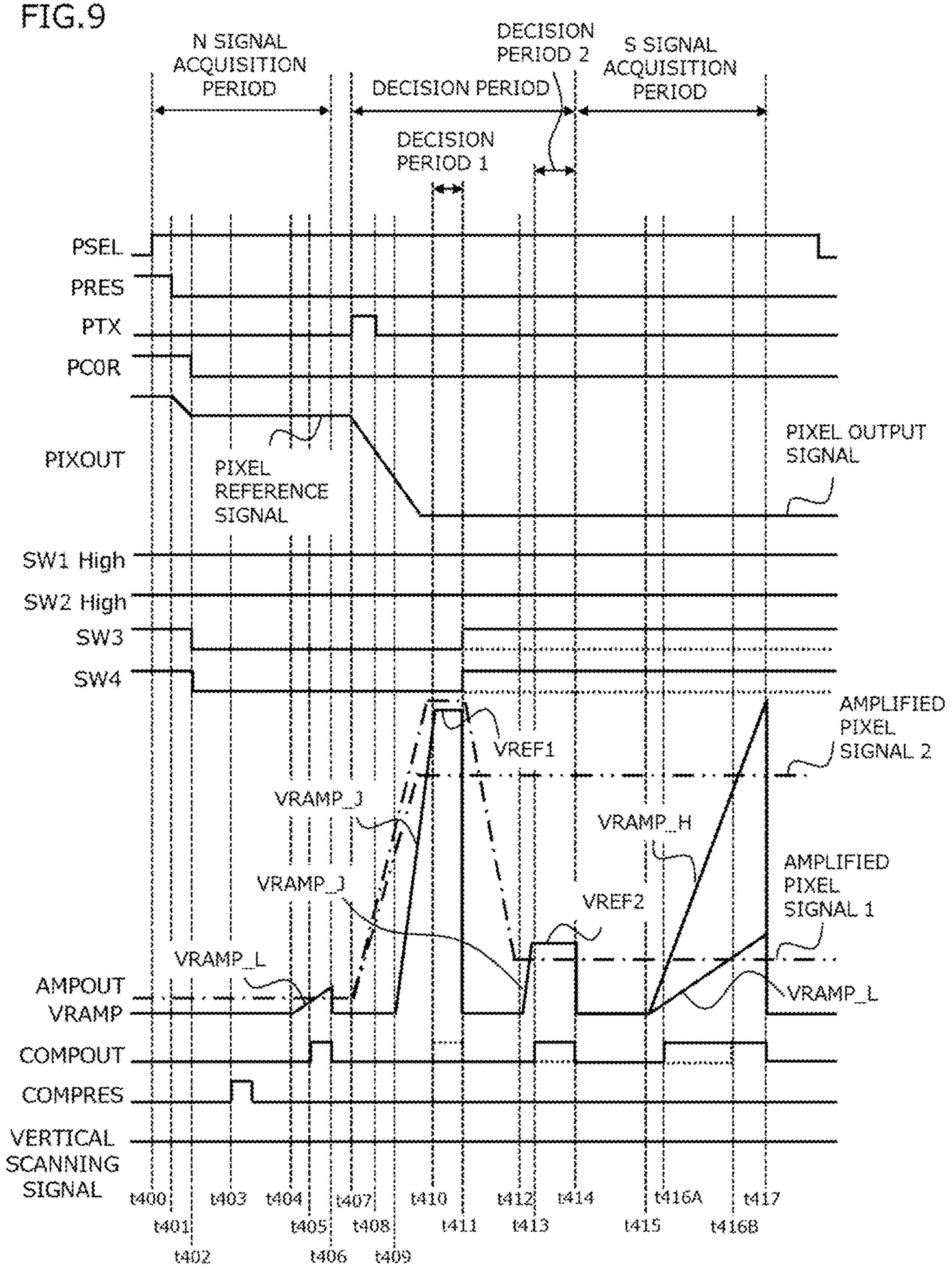
FIG. 9 is a timing chart illustrating AD conversion according to a second embodiment.
Figure 10:
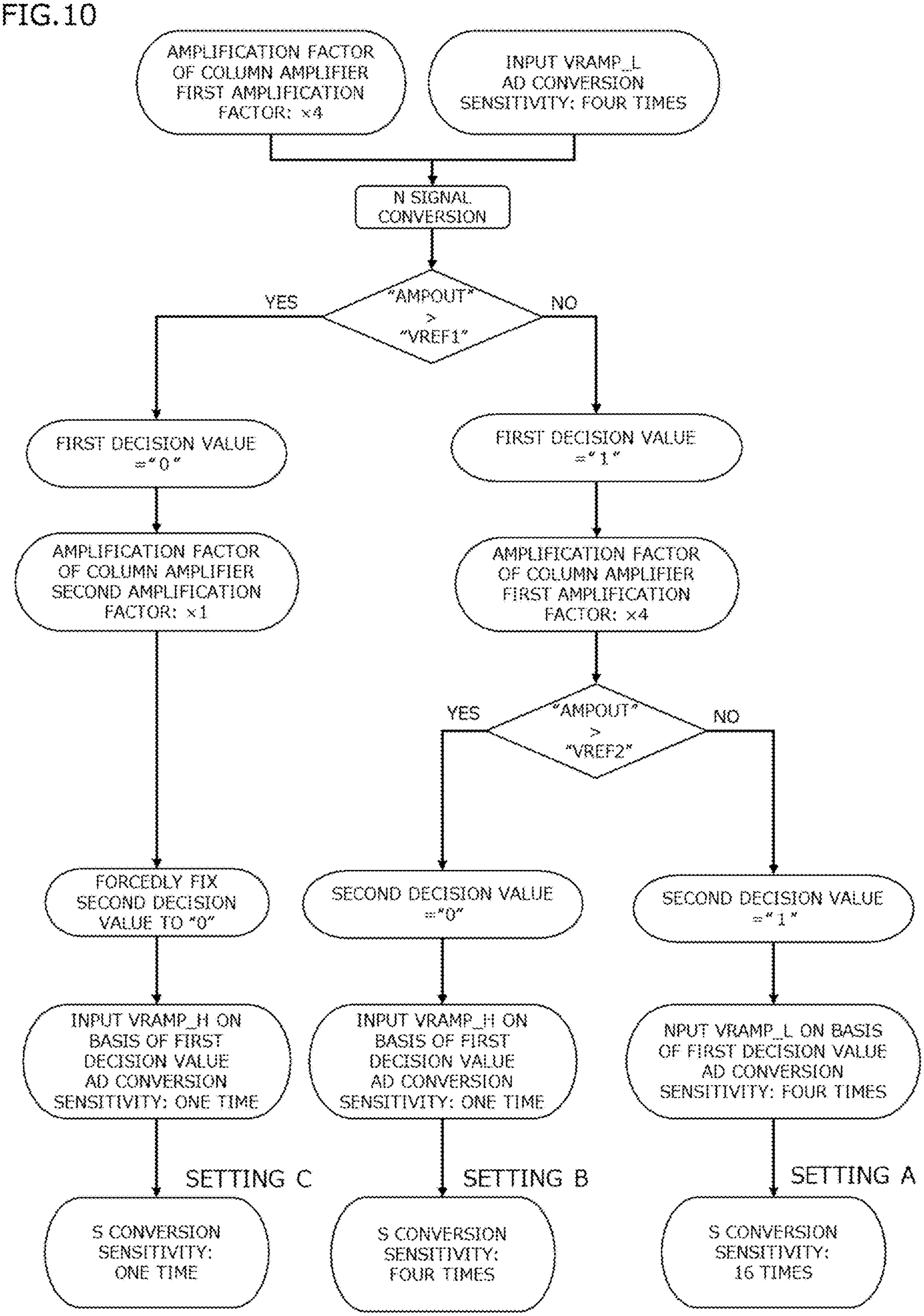
FIG. 10 is a flowchart illustrating the setting of S-conversion sensitivity according to the second embodiment.

FIG. 9 illustrates a timing chart of AD conversion according to this embodiment. Here, an operation performed in a decision period, which is a characteristic part of this embodiment, will be described.

In decision period 1, a comparator 303 compares a first threshold voltage value VREF1 with an amplified pixel signal, and an output comparison result signal becomes a first decision value J1. The first decision value J1 is input to a first bit of a decision value memory 305C and is stored therein. At time t411, a selection circuit 306 sends a control signal to an amplification factor switching circuit 302 on the basis of the first decision value J1. The amplification factor switching circuit 302 switches the switch of the amplification factor switching circuit 302 on the basis of the control signal.

In the case of an amplified pixel signal 1 (a one-dot chain line) illustrated in FIG. 9, the signal level thereof is larger than a first threshold voltage value VREF1 in a decision period 1, and thus, switches SW3 and SW4 are set to a high level (a solid line). The amplification factor of a column amplifier 301 decreases, and, in a decision period 2, the signal level of the amplified pixel signal 1 becomes smaller than VREF2, and a comparator output COMPOUT becomes the high level (a solid line). On the other hand, in the case of an amplified pixel signal 2 (a two-dot chain line) illustrated in FIG. 9, the signal level thereof is smaller than the first threshold voltage value VREF1 in the decision period 1, and thus the comparator output COMPOUT becomes the high level (a broken line). The switches SW3 and SW4 are not switched (a broken line), and the amplification factor of the column amplifier remains unchanged. The signal level of the amplified pixel signal remains unchanged and is larger than VREF2 in the decision period 2.

Next, a method of acquiring a second decision value J2 will be described. The comparator 303 compares a second threshold voltage value VREF2 and the amplified pixel signal with each other in the decision period 2. A comparison result signal supplied from the comparator 303 is set as the second decision value J2. The second decision value J2 is stored in the second bit of the decision value memory 305C.

In the example of the amplified pixel signal 1 (a one-dot chain line) illustrated in FIG. 9, since this signal is smaller than the second threshold voltage value VREF2, the second decision value J2 becomes J2=1 and "1" is stored in the second bit of the decision value memory 305C. The comparator output COMPOUT becomes the high level (a solid line). On the other hand, in the example of the amplified pixel signal 2 (a two-dot chain line) illustrated in FIG. 9, since this signal is larger than the second threshold voltage value VREF2, the first decision value J1 becomes J1=0, and "0" is stored in the second bit of the decision value memory 305C. The comparator output COMPOUT remains the low level (a broken line).

A ramp signal input to comparator 303 at time t415 in an S signal acquisition period is set on the basis of the second decision value J2 stored in the decision value memory 305C. The selection circuit 306 sends a control signal to the ramp signal switching circuit 304 on the basis of the value of the second decision value J2. When the second decision value J2 is "1", the ramp signal switching circuit 304 inputs a ramp signal VRAMP_L to the comparator 303 from time t415. When the second decision value J2 is "0", the ramp signal switching circuit 304 inputs a ramp signal VRAMP_H to the comparator 303 from time t415. Since the process in the S signal acquisition period performed thereafter is the same as that of the first embodiment, description thereof will be omitted.

For the amplified pixel signal 1 illustrated in FIG. 9, in the S signal acquisition period, an amplification factor of the column amplifier 301 is 1, and the ramp signal VRAMP_L is input to the comparator 303. This combination is defined as "Setting D". At time t416A at which the polarity of a comparator output COMPOUT (a solid line) changes, the value of a count signal CNT is stored in the S memory as an S signal. On the other hand, for the amplified pixel signal 2, in the S signal acquisition period, the amplification factor of the column amplifier 301 is 4, and the ramp signal VRAMP_H is input to the comparator 303. This combination corresponds to "Setting B" defined in the first embodiment. At time t416B at which the polarity of the comparator output COMPOUT (a broken line) changes, the value of the count signal CNT is stored in the S memory as the S signal. To add, in a case in which the amplified pixel signal is smaller than each of the first threshold voltage value VREF1 and the second threshold voltage value VREF2, the S signal is acquired in "Setting A" defined in the first embodiment. Furthermore, in a case in which the amplified pixel signal is larger than the first threshold voltage value VREF1 and the second threshold voltage value VREF2, the S signal is acquired in "Setting C" defined in the first embodiment.

In other words, in this embodiment, in accordance with an increase in the signal level of the amplified pixel signal, the setting at the time of acquiring the S signal is switched in order of "Setting A"→"Setting B"→"Setting D"→"Setting C". At this time, in switching between "Setting B" and "Setting D", both the amplification factor of the column amplifier 301 and the ramp signal input to the comparator 303 are switched. As described in the first embodiment, in a case in which these two are simultaneously switched, simultaneously, a correction error of the output value offset may easily occur at a boundary point thereof. Thus, in this embodiment, the amplification factor of the column amplifier 301 in the S signal acquisition period and the selection of the ramp signal to be input to the comparator 303 are controlled on the basis of a result of the decision value, and here an operation for not generating "Setting D" is performed, whereby a signal output similar to that of the first embodiment is realized.

Next, the operation of "Setting C" like skipping "Setting D" on the basis of the decision value stored in the decision value memory 305C will be described. FIG. 10 is a flowchart describing the amplification factor of the column amplifier 301 at the time of acquisition of an S signal and selection of a ramp signal to be input to the comparator 303. Also in this embodiment, a method of performing control to form three settings including "Setting A", "Setting B", and "Setting C" will be described.

Initially, the amplification factor of the column amplifier 301 is set to four times that is the first amplification factor. The ramp signal VRAMP_L is input to the comparator 303 from the ramp signal switching circuit 304. In this condition, an N signal is acquired.

Hereinafter, differences between the three "Settings" will be described. First, "Setting A" will be described. "Setting A" illustrates an example in which the signal level of the amplified pixel signal AMPOUT is low, that is, light of low luminance is emitted to the pixel. In the decision period 1, the amplified pixel signal AMPOUT is compared with a first threshold voltage value VREF1. In "Setting A", "AMPOUT<VREF1" is satisfied, and the first decision value J1 is stored in the first bit of the decision value memory 305C as "1".

Next, in the decision period 2, the amplified pixel signal AMPOUT, which includes an image signal, is compared with the second threshold voltage value VREF2. In "Setting A", "AMPOUT<VREF2" is satisfied, and the second decision value J2 is stored in the first bit of the decision value memory 305C as "1". The amplification factor of the column amplifier 301 remains to be the first amplification factor, which is four times. Then, at time t415 in the S signal acquisition period, the selection circuit 306 sends a control signal to the ramp signal switching circuit 304 on the basis of the second decision value J2=1 stored in the second bit of the decision value memory 305C. The ramp signal switching circuit 304 inputs the ramp signal VRAMP_L to the comparator 303, and the AD conversion sensitivity becomes four times.

In this way, in "Setting A", with the amplification factor of the column amplifier 301 being the first amplification factor that is four times, the ramp signal VRAMP_L of which the AD conversion sensitivity is four times is input to the comparator 303. In other words, the S signal is acquired with the S conversion sensitivity being 4×4=16 times.

Subsequently, "Setting B" will be described. "Setting B" illustrates an example in which the signal level of the amplified pixel signal AMPOUT is an intermediate level, in other words, light of intermediate luminance is emitted to the pixel.

In the decision period 1, the amplified pixel signal AMPOUT is compared with the first threshold voltage value VREF1. In "Setting B", "AMPOUT<VREF1" is satisfied, and the first decision value J1 is stored in the first bit of the decision value memory 305C as "1".

Next, in the decision period 2, the amplified pixel signal AMPOUT, which includes an image signal, is compared with the second threshold voltage value VREF2. In "Setting B", "AMPOUT≥VREF2" is satisfied, and the second decision value J2 is stored in the second bit of the decision value J of the decision value memory 305C as "0". At time t415 in the S signal acquisition period, the selection circuit 306 sends a control signal to the ramp signal switching circuit 304 on the basis of the first decision value "0" stored in the second bit of the decision value J of the decision value memory 305C. The ramp signal switching circuit 304 inputs the ramp signal VRAMP_H to the comparator 303, and the AD conversion sensitivity becomes one time.

In this way, in "Setting B", with the amplification factor of the column amplifier 301 being the first amplification factor that is four times, the ramp signal VRAMP_H, of which the AD conversion sensitivity becomes one time is input to the comparator 303. In other words, the S signal is acquired with the AD conversion sensitivity defined using a product value being 4×1=4 times.

Finally, "Setting C" will be described. "Setting C" illustrates an example in which the signal level of the amplified pixel signal AMPOUT is high, and light of high luminance is emitted to the pixel.

The amplified pixel signal AMPOUT, which includes an image signal, is compared with the first threshold voltage value VREF1. In "Setting C", "AMPOUT≥VREF1" is satisfied, and "0" is stored in the second bit of the decision value memory 305C as the first decision value J1. Next, in a case in which the first decision value J1 becomes "0" in the decision period 2, the second decision value J2 is forced to be also "0" in the logic.

For example, as illustrated in the following equation, the second decision value is a product value of the first decision value and the decision value acquired in the decision period 2.

$$(\text{First Decision Value } J1) = (\text{Decision Result of Decision Period 1}) \quad \text{(Equation 11)}$$

$$(\text{Second Decision Value } J2) = (\text{First Decision Value } J1) \times (\text{Decision Result of Decision Period 2}) \quad \text{(Equation 12)}$$

In accordance with this, an operation in which, when the first decision value is 1, the decision value of the decision period 2 becomes valid, and, when the first decision value is 0, the second decision value is set to 0 regardless of the decision result can be performed. In other words, the second decision value J2 is determined in combination with the first decision value. In accordance with this, even when the first decision value J1 becomes J1=0, the amplification factor of the column amplifier 301 is decreased, and the amplified pixel signal is below the second threshold voltage value VREF2, the state of "Setting D" does not occur. Therefore, by using the same technique as that of the first embodiment, the AD conversion to the correction process of the S signal can be performed. The methods for the magnification correction of the S signal and the correction of the ratio error of the amplification factor that are performed thereafter are common, and thus description thereof will be omitted.

As above, as illustrated in the second embodiment, in the decision period, also in a case in which the amplification factor of the column amplifier 301 is judged first, the process can be performed similarly to the first embodiment.

In this embodiment, although the second decision value J2 is calculated as product with the first decision value J1, the calculation is not limited thereto.

Third Embodiment

A photoelectric conversion apparatus according to a third embodiment of the present invention will be described with reference to FIGS. 11 to 14. In the third embodiment, similar to the second embodiment, in a decision period, an operation of selecting an amplification factor of a column amplifier in an S signal acquisition period is performed first.

In this embodiment, in accordance with provision of a relation between a first threshold voltage value VREF1 and a second threshold voltage value VREF2, transitions to unnecessary settings are suppressed. The transitions of these settings are suppressed by setting the relation between the first threshold voltage value VREF1 and the second threshold voltage value VREF2 as below.

$$VREF1 \leq VREF2 \quad \text{(Equation 13)}$$

In this embodiment, for the convenience of description, a ramp signal VRAMP_M, of which the change rate is twice that (½ times the AD conversion sensitivity) of a ramp signal VRAMP_L is used instead of the ramp signal VRAMP_L. In description, the configuration of the photoelectric conversion apparatus and configurations of a pixel circuit and a column circuit are the same as those of the first embodiment, and description thereof will be omitted.

Figure 11:
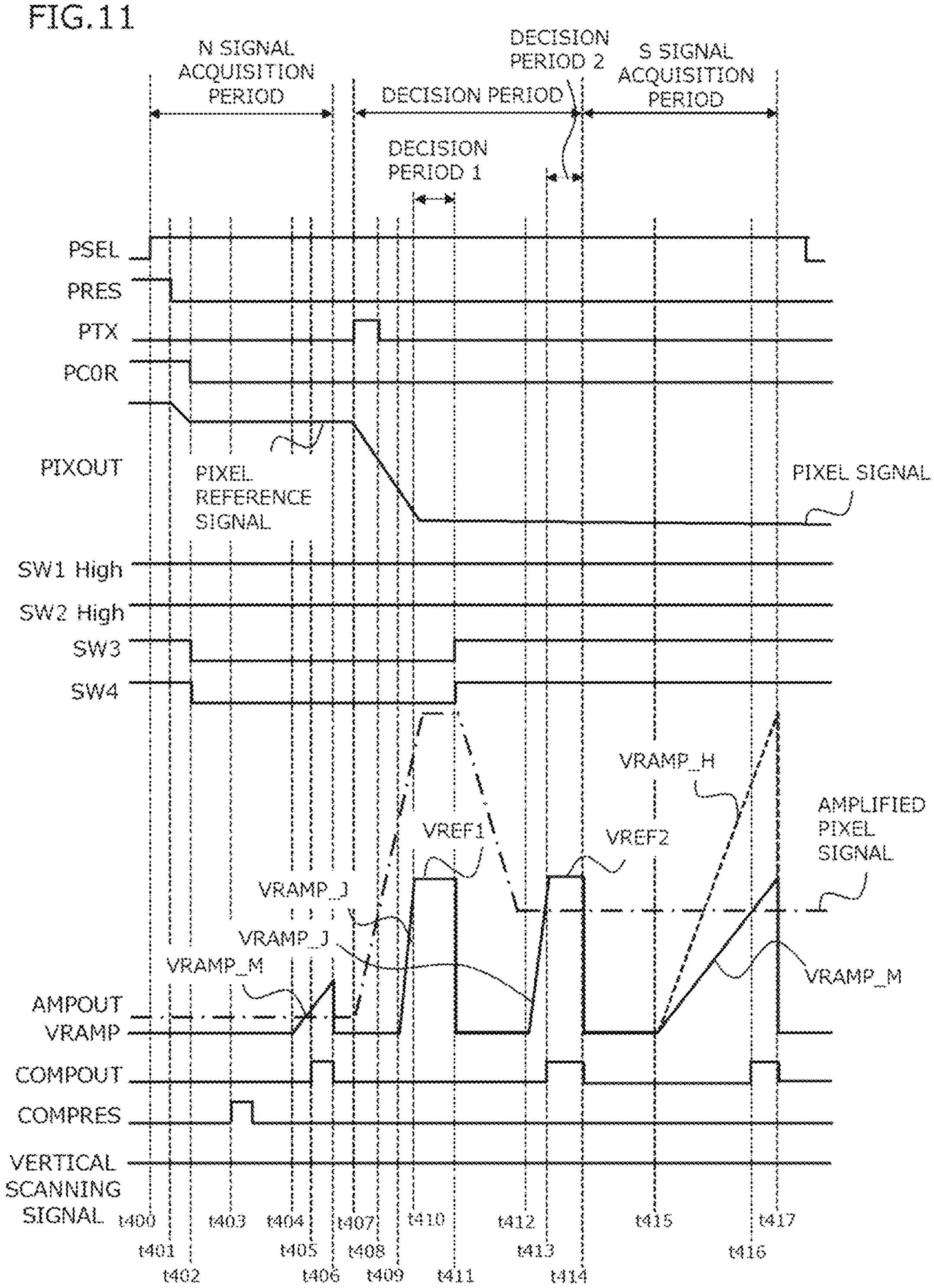
FIG. 11 is a timing chart illustrating AD conversion according to a third embodiment.

FIG. 11 is a timing chart illustrating an AD conversion operation according to this embodiment. As represented in a decision period illustrated in FIG. 11, the magnitude relation between the first threshold voltage value VREF1 and the second threshold voltage value VREF2 is set to satisfy the relation represented in (Equation 8), here VREF1=VREF2. A method of acquiring an N signal, a decision value, and an S signal is similar to that of the second embodiment, and thus description thereof will be omitted.

Figure 12:
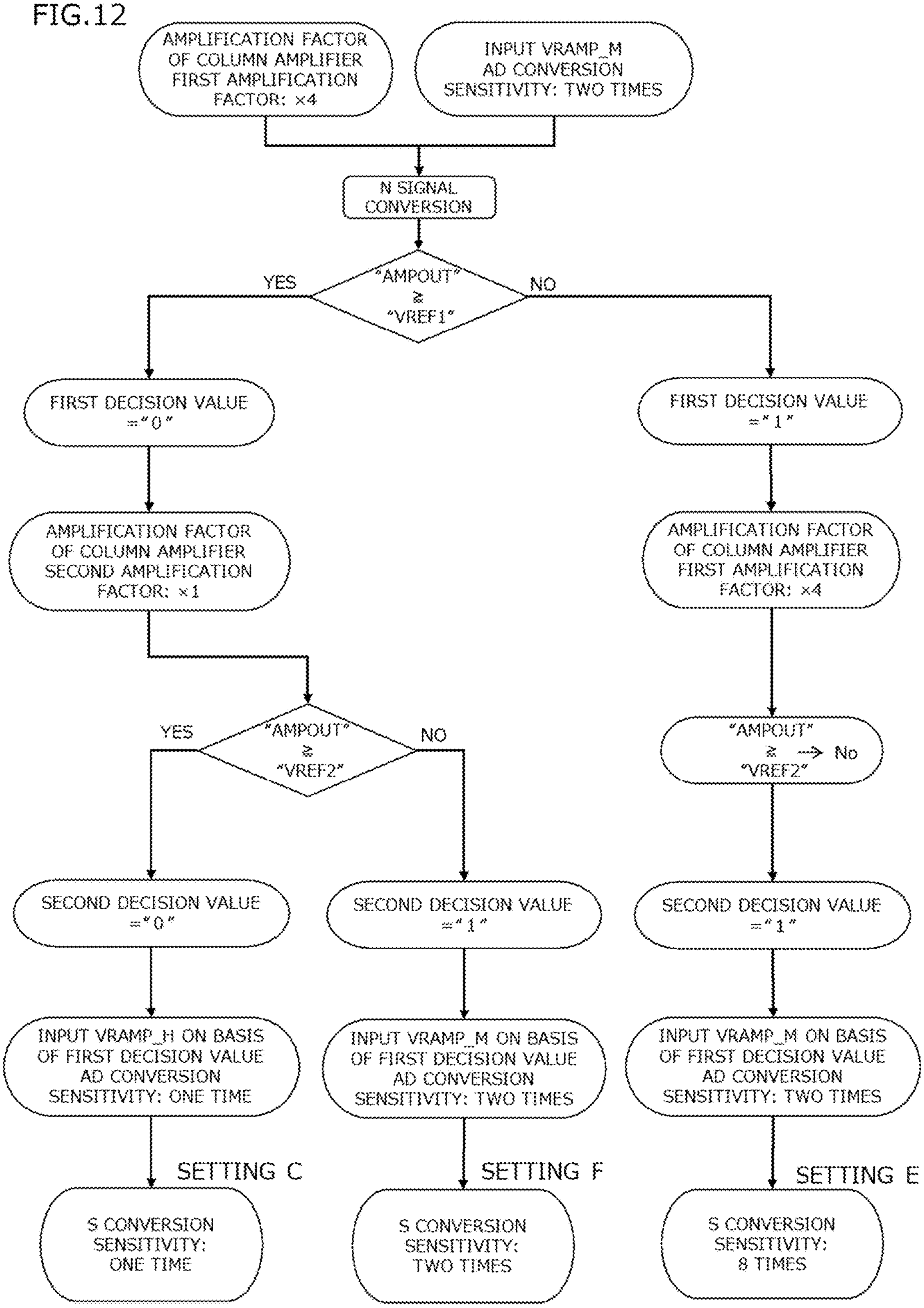
FIG. 12 is a flowchart explaining S-conversion sensitivity setting according to the third embodiment.

Settings of combinations of the amplification factor of the column amplifier 301 and the ramp signal to be input to the comparator 303 according to this embodiment will be described. FIG. 12 is a flowchart illustrating the setting of S conversion sensitivity according to this embodiment.

The following is common to all the three settings. Initially, the amplification factor of the column amplifier 301 is set to four times that is a first amplification factor. The ramp signal VRAMP_M is input to the comparator 303 from the ramp signal switching circuit 304. Under this condition, an N signal is acquired.

Hereinafter, differences between the three "settings" will be described. First, "Setting E" will be described. "Setting E" illustrates an example in which the signal level of the amplified pixel signal AMPOUT is low, that is, light of low luminance is emitted to the pixel.

In the decision period 1, the amplified pixel signal AMPOUT is compared with the first threshold voltage value VREF1. In "Setting E", "AMPOUT<VREF1" is satisfied, and the first decision value J1 is stored in the first bit of the decision value memory 305C as "1". The amplification factor of the column amplifier 301 remains the same as the first amplification factor that is four times.

Next, in the decision period 2, although the amplified pixel signal AMPOUT, which includes an image signal, is compared with the second threshold voltage value VREF2, as described above, the relation between the first voltage value and the second voltage value is VREF1<VREF2, and thus inevitably, AMPOUT<VREF2. The second decision value J2 is stored in the first bit of the decision value memory 305C as "1".

At time t415 in the S signal acquisition period, the selection circuit 306 sends a control signal to the ramp signal switching circuit 304 on the basis of the second decision value J2=1 stored in the second bit of the decision value memory 305C. The ramp signal switching circuit 304 inputs the ramp signal VRAMP_M to the comparator 303, and the AD conversion sensitivity becomes two times.

In this way, in "Setting E", the ramp signal VRAMP_M of which the AD conversion sensitivity is two times is input to comparator 303 with the amplification factor of the column amplifier 301 being the first amplification factor that is four times. In other words, the S signal is acquired with the S conversion sensitivity being 4×2=8 times.

Subsequently, "Setting F" will be described. "Setting F" illustrates an example in which the signal level of the amplified pixel signal AMPOUT is an intermediate level, in other words, light of intermediate luminance of emitted to the pixel. In the decision period 1, the amplified pixel signal AMPOUT is compared with the first threshold voltage value VREF1. In "Setting F", "AMPOUT>VREF1" is satisfied, and the first decision value J1 is stored in the first bit of the decision value memory 305C as "0". The amplification factor of the column amplifier 301 is switched to the second amplification factor that is one time.

Next, in the decision period 2, the amplified pixel signal AMPOUT, which includes an image signal, is compared with the second threshold voltage value VREF2.

In "Setting F", "AMPOUT<VREF2" is satisfied, and the second decision value J2 is stored in the second bit of the decision value J in the decision value memory 305C as "1". Then, at time t415 in the S signal acquisition period, the selection circuit 306 sends a control signal to the ramp signal switching circuit 304 on the basis of the first decision value "1" stored in the second bit of the decision value J in the decision value memory 305C. The ramp signal switching circuit 304 inputs the ramp signal VRAMP_M to the comparator 303, and the AD conversion sensitivity becomes two times.

In this way, in "Setting F", the ramp signal VRAMP_H of which the AD conversion sensitivity becomes two times is input to the comparator 303 with the amplification factor of the column amplifier 301 being the first amplification factor that is one time. In other words, the S signal is acquired with the S conversion sensitivity being 1×2=2 times.

Finally, "Setting C" is the same as "Setting C" described in the first embodiment, and thus description thereof will be omitted here.

Figure 13:
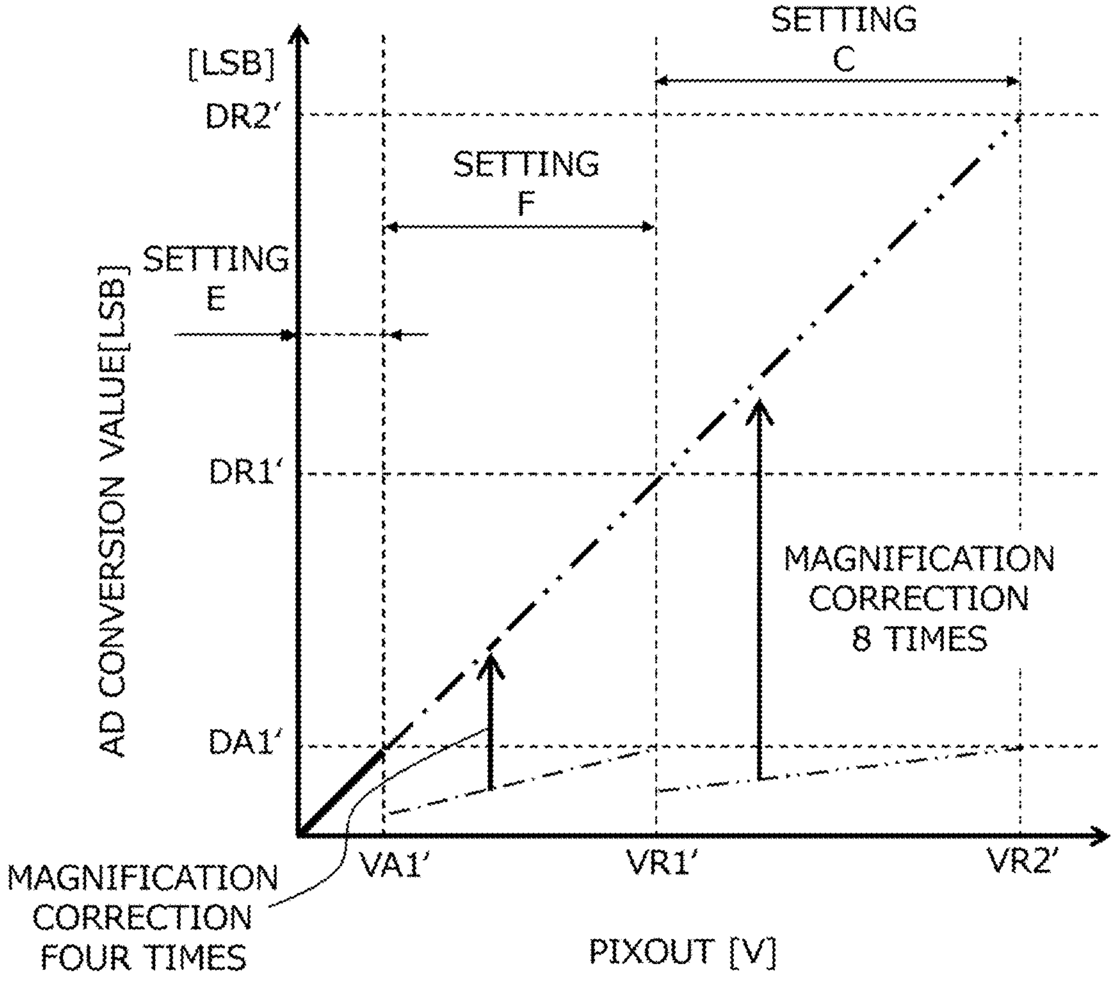
FIG. 13 is a diagram illustrating magnification correction of a signal processing circuit according to the third embodiment.

Next, the magnification correction of an S signal according to this embodiment will be described with reference to FIG. 13. It is assumed that the pixel signal PIXOUT causes a change in amplitude up to a voltage value VR2' [V] as a maximum in accordance with the amount of light incident in pixel 101. In the S signal acquisition period, AD conversion is performed with the ramp signal VRAMP_M up to a voltage value VR1' [V] for which the pixel signal PIXOUT becomes ½ of a voltage value VR2' [V], and, for voltage values not less than that, AD conversion is performed with the ramp signal VRAMP_H. In addition, AD conversion is performed with the amplification factor of the column amplifier 301 being a first amplification factor up to a voltage value VA1' [V] for which the pixel signal PIXOUT becomes ¼ of the voltage value VR1' [V], and, for pixel signal levels not less than that, AD conversion is performed with a second amplification factor.

The pixel signal PIXOUT has the voltage value VA1' [V], and an AD conversion value DA1' [LSB] is acquired in "Setting E". The AD conversion value DA1' [LSB] is assumed to be a maximum value of the count value counted by the counter circuit 106 in a period from time t415 to time t417. On the other hand, when the pixel signal PIXOUT has a voltage value VR1' [V] that is four times the voltage value VR1 [V], also in "Setting F", the AD conversion value DA1' [LSB] is acquired. In addition, when the pixel signal PIXOUT has a voltage value VR2' [V] that is 4×2=8 times the voltage value VA1' [V], also in "Setting C", the AD conversion value DA1' [LSB] is acquired. Magnification correction is performed for the S signals acquired in these different settings on the basis of the first decision value J1 and the second decision value J2 stored in the decision value memory 305C.

In a case in which the first decision value J1 and the second decision value J2 stored in the decision value memory 305C are respectively J1="1" and J2="1", the S signal is not corrected. A range of the voltage value of 0 [V] to the voltage value VA1' [V] of the pixel signal PIXOUT corresponds to this case (a thick line).

In a case in which the first decision value J1 and the second decision value J2 stored in the decision value memory 305C are respectively J1="0", and J2="1", magnification correction of four times is performed for the S signal. A range of the voltage value VA1' [V] to the voltage value VR1' [V] of the pixel signal PIXOUT corresponds to this case, and the S signal before correction (a one-dot chain line) is corrected in magnification to be a four-times S signal (a thick one-dot chain line). Here, switching between "Setting E" and "Setting F" is performed at the voltage value VA1' [V] of the pixel signal PIXOUT as a boundary. When converted into the amplified pixel signal AMPOUT from the column amplifier 301 with the first amplification factor (four times), the voltage value VA1' [V] corresponds to the first threshold voltage value VREF1. In addition, switching between "Setting F" and "Setting C" is performed at the voltage value VR1' [V] of the pixel signal PIXOUT as a boundary. When converted into the amplified pixel signal AMPOUT with the second amplification factor (one time), an output for which the pixel signal PIXOUT becomes the voltage value VR1' [V] corresponds to the second threshold voltage value VREF2.

In a case in which the first decision value J1 and the second decision value J2 stored in the decision value memory 305C are respectively J1="0" and J2="0", magnification correction of 8 times is performed for the S signal. A range of the voltage value VR1' [V] to the voltage value VR2' [V] of the pixel signal PIXOUT corresponds to this case, and the S signal before correction (a two-dot chain line) becomes an S signal (a thick two-dot chain line) that is multiplied by 8. In this way, a magnification correction process is performed for the S signal acquired for each setting on the basis of the decision value. The calculation of the amplification factor of the column amplifier 301 and the ratio error of the voltage change rate of the ramp signal and the method of acquiring correction values are similar to those of the other embodiments, and description thereof will be omitted.

As above, in the decision period, even in a case in which the operation of selecting the amplification factor of the column amplifier is performed first in the S signal acquisition period, by setting the first threshold voltage value VREF1 to be equal to or lower than the second threshold voltage value VREF2, transition to unnecessary settings can be suppressed. Thus, expansion of the dynamic range and implementation of a high speed are realized, and good signal characteristics can be acquired.

Fourth Embodiment

A photoelectric conversion apparatus according to a fourth embodiment will be described with reference to FIGS. 14 to 19A and 19B. In this embodiment, four ramp signals are input to a ramp signal switching circuit 304, and three ramp signals among them are used for setting the amplification factor of AD conversion.

There are three ways of ramp signal setting at the time of acquiring an S signal, there are two ways of setting the amplification factor of a column amplifier, and thus there are settings of 3×2=6 ways as combinations. However, as described in the other embodiments, in this example, AD conversion of an amplified pixel signal is performed using four settings such that these two settings are not simultaneously switched in switching of the settings. In this way, output errors at the switching point of the setting is suppressed, and good output characteristics are realized.

Figure 14:
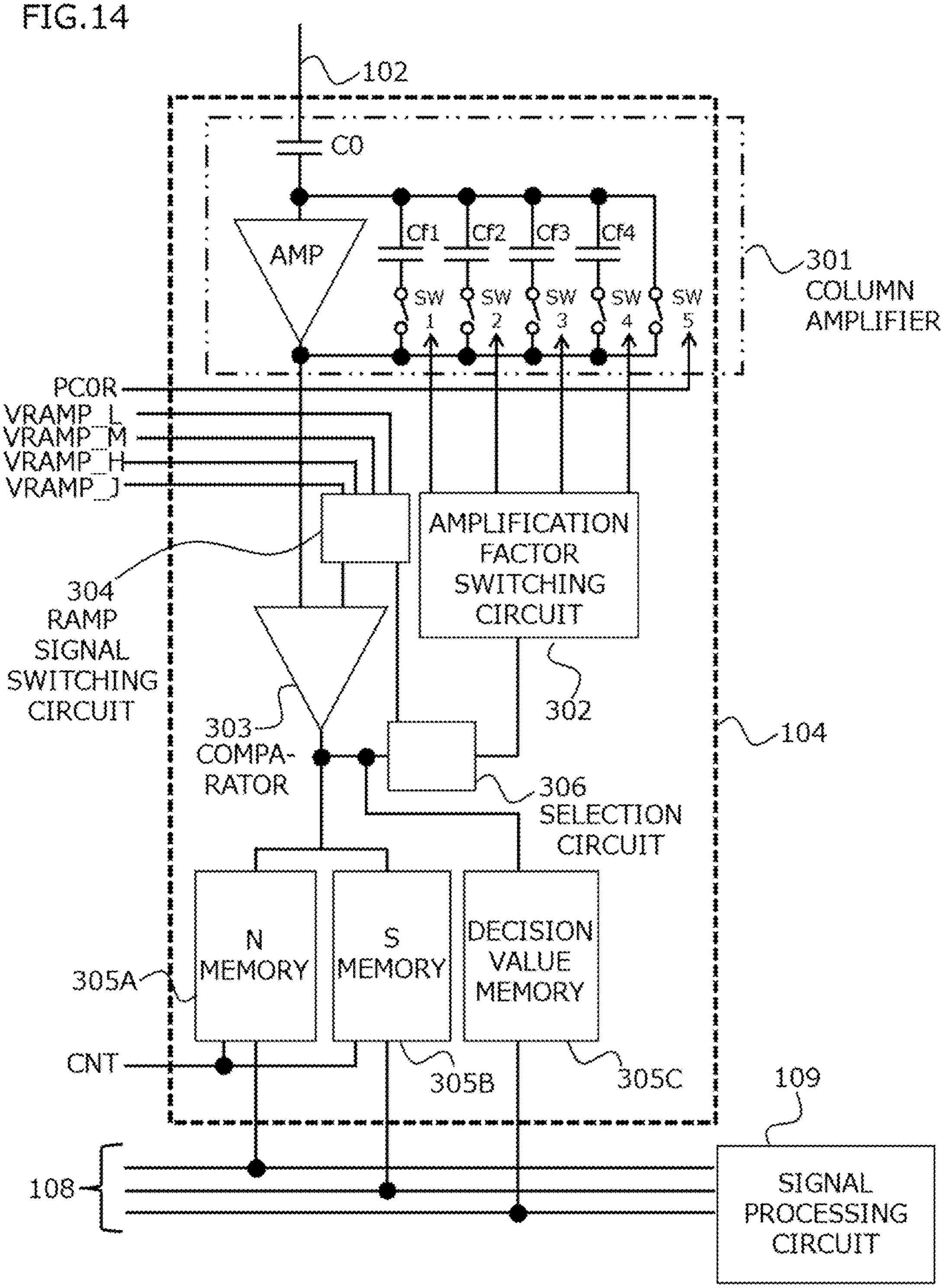
FIG. 14 is a block diagram of a column circuit according to a fourth embodiment.

First, the configuration of the photoelectric conversion apparatus according to this embodiment will be described. FIG. 14 is a block diagram of a column circuit 104 of the photoelectric conversion apparatus according to this embodiment. As illustrated in FIG. 14, four ramp signals including ramp signals VRAMP_L, VRAMP_M, VRAMP_H, and VRAMP_J are input to the ramp signal switching circuit 304. A voltage change rate of each ramp signal is the same as that of the ramp signal with the same name described in the first to third embodiments. In other words, the ramp signal VRAMP_M has a voltage change rate that is twice that of the ramp signal VRAMP_L, and the ramp signal VRAMP_H has a voltage change rate that is four times that of the ramp signal VRAMP_L. A decision value memory 305C is 3 bits and can store three decision result values. The other constituent elements are similar to those of the first embodiment, and thus description thereof will be omitted.

Figure 15:
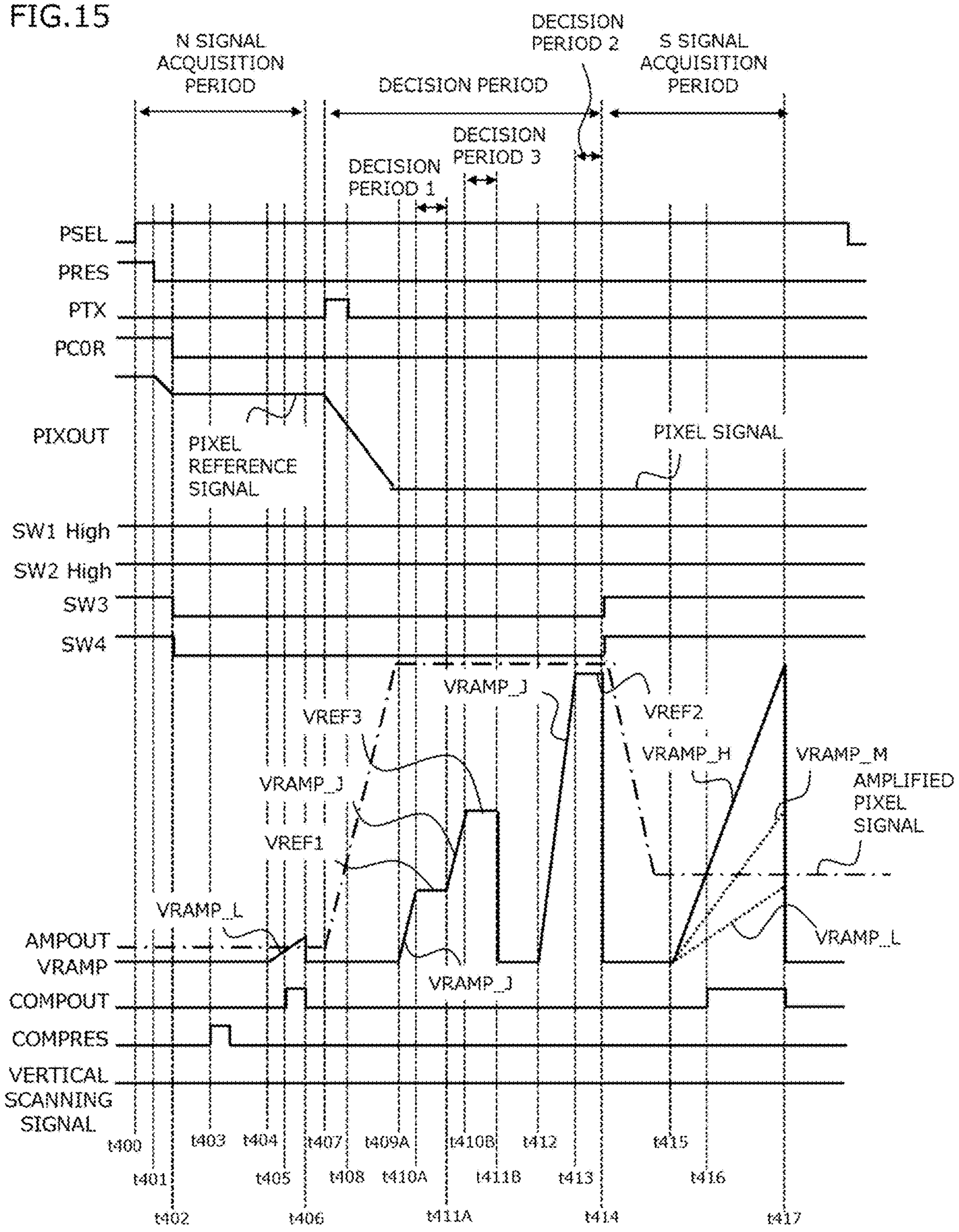
FIG. 15 is a timing chart illustrating AD conversion according to the fourth embodiment.

Next, the method of acquiring an N signal, a decision value, and an S signal through AD conversion in the column circuit 104 will be described. FIG. 15 is a timing chart illustrating an AD conversion operation in a column amplifier. The operation in an N signal acquisition period is similar to that according to the other embodiments, and thus description thereof will be omitted.

A method of acquiring decision values in a decision period will be described. A period from time t407 to time t414 is a decision period and is a period in which decision values are acquired.

First, in a period from time t407 to time t411A, a first decision value J1 is acquired using a method similar to that of the first embodiment, and thus description thereof will be omitted. The first decision value J1 is set to J1=0, and "0" is stored in the first bit of the decision value memory 305C.

In addition, in a period from time t412 to time t414, a second decision value J2 is acquired using a method similar to that of the first embodiment, and thus description thereof will be omitted. The second decision value J2 is set to "0", and "0" is stored in the second bit of the decision value memory 305C.

A method of acquiring a third decision value J3, which is a characteristic part of this embodiment, will be described. In a period from time t411A to time t411B, the third decision value J3 is acquired.

The ramp signal VRAMP_J causes an operation of further increasing the voltage value in the period from time t411A to time t410B and maintaining the voltage value for a predetermined period from time t410B to time t411B. At this time, the voltage value maintained from time t410B to time t411B is set as a third threshold voltage value VREF3, and this period is set as a decision period 3. At this time, the first threshold voltage value VREF1 and the third threshold voltage value VREF3 satisfy the following relation.

$$VREF1 < VREF3 \quad \text{(Equation 14)}$$

For the purpose of securing a comparison signal COMPRES inversion period for acquiring correct AD conversion values in the S signal acquisition period described in the first embodiment, the third threshold voltage value VREF3 and the second voltage value satisfy the following relation.

$$VREF3 < VREF2 \quad \text{(Equation 15)}$$

A threshold voltage value for judging the amplification factor of the column amplifier 301 is larger than a maximum value of a plurality of threshold voltages for judging the voltage change rate of the ramp signal. In the decision period 3, a comparator 303 compares the third threshold voltage value VREF3 with an amplified pixel signal AMPOUT, and an output comparison result signal is set as a third decision value J3. The third decision value J3 is input to the third bit of the decision value memory 305C and is stored therein. After time t411B, the ramp signal VRAMP is reset. In the case illustrated in FIG. 15, the amplified pixel signal AMPOUT is larger than the third threshold voltage value VREF3, and thus, the third decision value J3 becomes "0", and "O" is stored in the third bit of the decision value memory 305C.

A period from time t414 to time t417 is the S signal acquisition period. The setting of the amplification factor of the column amplifier is the same as that of the first embodiment, and thus description thereof will be omitted. The selection of a ramp signal to be input to the comparator 303 will be described. A selection circuit 306 sends a control signal to the ramp signal switching circuit 304 on the basis of the first decision value J1 and the third decision value J3 stored in the decision value memory 305C. On the basis of the control signal, the ramp signal switching circuit 304 selects a ramp signal to be input to the comparator 303 at time t415.

In the case illustrated in FIG. 15, the first decision value J1 stored in the decision value memory 305C is "0" and the third decision value J3 is "0". At this time, the selection circuit 306 sends a control signal to the ramp signal switching circuit 304 such that the ramp signal VRAMP_H is input to the comparator 303. On the other hand, in a case in which the first decision value J1 stored in the decision value memory 305C is "0" and the third decision value J3 is "1", the selection circuit 306 inputs the ramp signal VRAMP_M to the comparator 303. In a case in which the first decision value J1 stored in the decision value memory 305C is "1", and the third decision value J3 is "1", the selection circuit 306 inputs the ramp signal VRAMP_L to the comparator 303. Since a state in which the first decision value J1 is "0", and the third decision value J3 is "1" cannot occur, the state is not taken into account.

At time t415, the ramp signal input to the comparator 303 starts output change at a constant change rate. A counter circuit 106 starts counting clock pulse signals in synchronization with the output change of the ramp signal. In the example in illustrated in FIG. 15, the ramp signal VRAMP_H is input to the comparator 303 at time t415. At time t416, when the voltage of the ramp signal VRAMP_H becomes above the amplified pixel signal AMPOUT, the signal polarity of the comparison result signal COMPOUT output by the comparator 303 is changed. An S memory 305B maintains the value of the count signal CNT at time t416 as an S signal. After time t417, the ramp signal VRAMP and the count signal CNT are reset and initialized.

Figure 16:
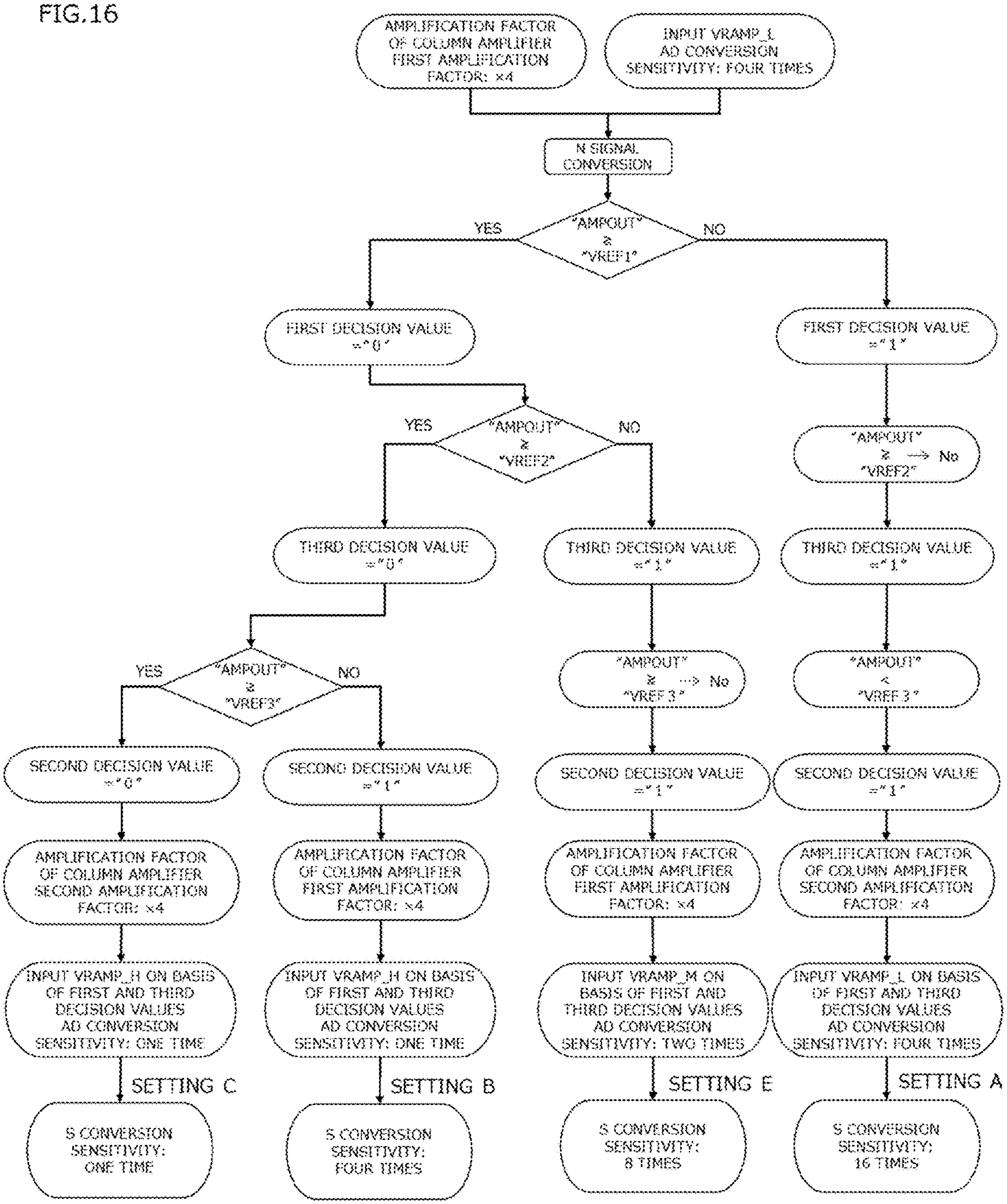
FIG. 16 is a flowchart explaining S-conversion sensitivity setting according to the fourth embodiment.
Figure 17:
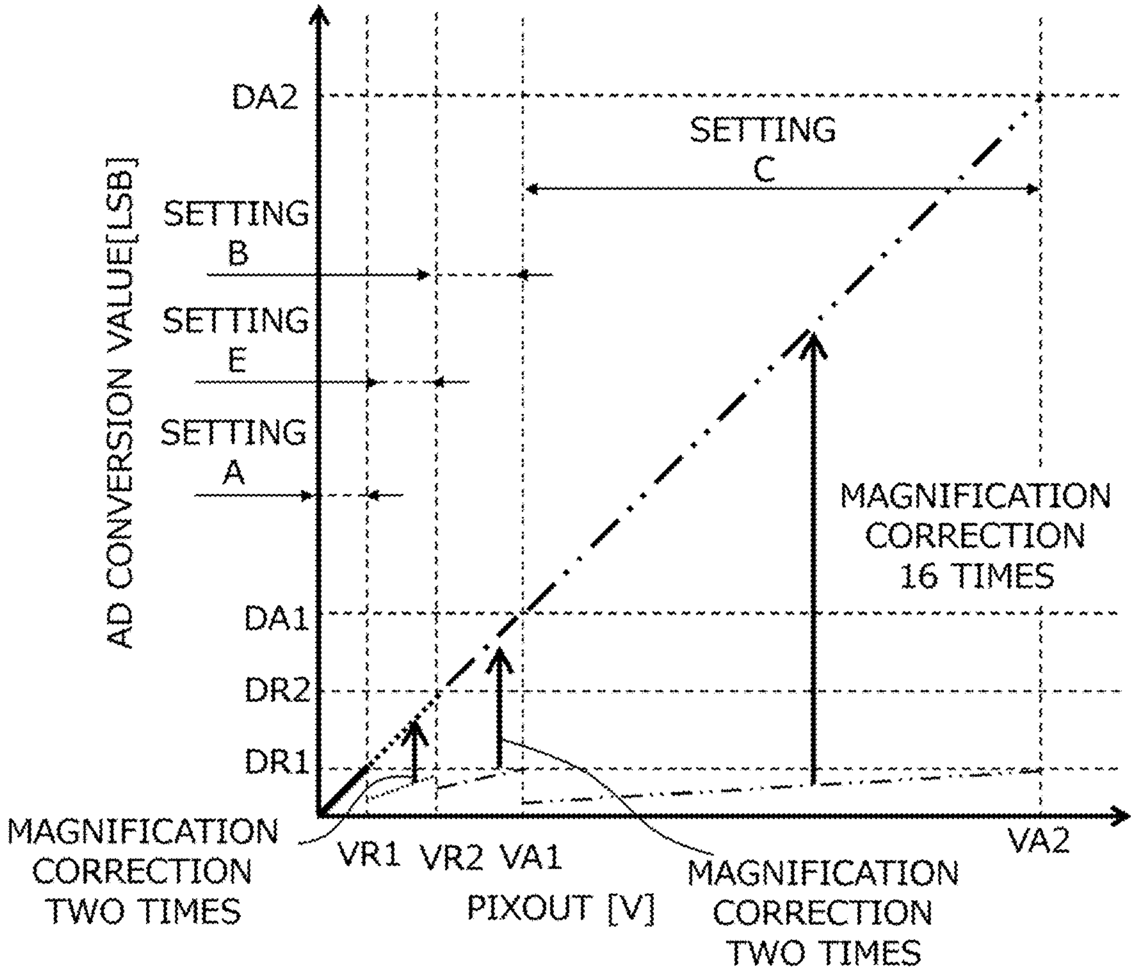
FIG. 17 is a diagram illustrating a correction process for a photoelectric conversion apparatus according to the fourth embodiment.

The AD conversion in the column circuit 104 according to this embodiment has been described above. Subsequently, settings of combinations of the amplification factor of the column amplifier and the signal change rate of the ramp signal according to this embodiment will be described. FIG. 16 is a flowchart illustrating the S-conversion sensitivity according to this embodiment.

There are three ways of ramp signal setting, there are two ways of setting the amplification factor of the column amplifier, and thus there are settings of 3×2=6 ways as combinations. However, as described in the other embodiments, in this example, AD conversion of an amplified pixel signal is performed using four settings such that these two settings are not simultaneously switched in switching of the settings.

The following is common to the four settings that can be set. Initially, the amplification factor of the column amplifier 301 is set to four times that is the first amplification factor. The ramp signal VRAMP_L is input to the comparator 303 from the ramp signal switching circuit 304. Under this condition, the N signal is acquired. Hereinafter, differences between the four settings will be described.

First, "Setting A" will be described. "Setting A" illustrates an example in which the signal level of the amplified pixel signal AMPOUT is low, that is, light of low luminance is emitted to the pixel. In the decision period 1, the amplified pixel signal AMPOUT is compared with a first threshold voltage value VREF1. In "Setting A", "AMPOUT<VREF1" is satisfied, and the first decision value J1 is stored in the first bit of the decision value memory 305C as "1". Next, in a decision period 3, the amplified pixel signal AMPOUT, which includes an image signal, is compared with the third threshold voltage value VREF3. Since the relation between the first threshold voltage value VREF1 and the third threshold voltage value VREF3 is VREF1<VREF3 at that time, inevitably, AMPOUT<VREF3. The third decision value J3 is stored in the third bit of the decision value memory 305C as "1". Also for the second decision value, similarly, "1" is stored. The amplification factor of the column amplifier 301 is not changed.

At time t415 in the S signal acquisition period, the selection circuit 306 sends a control signal to the ramp signal switching circuit 304 on the basis of the first decision value J1 (=1) and the third decision value J3 (=1) stored in the decision value memory 305C. The ramp signal switching circuit 304 inputs the ramp signal VRAMP_L to the comparator 303, and the AD conversion sensitivity becomes four times. In this way, in "Setting A", with the amplification factor of the column amplifier 301 being the first amplification factor that is four times, the ramp signal VRAMP_M of which the AD conversion sensitivity is four times is input to the comparator 303. In other words, the S signal is acquired with the S conversion sensitivity being 4×4=16 times.

Subsequently, "Setting E" will be described. "Setting E" illustrates an example in which the signal level of the amplified pixel signal AMPOUT is a low intermediate level, in other words, light of an intermediate level of a low luminance side is emitted to the pixel. In the decision period 1, the amplified pixel signal AMPOUT is compared with the first threshold voltage value VREF1. In "Setting E", "AMPOUT≥VREF1" is satisfied, and the first decision value J1 is stored in the first bit of the decision value memory 305C as "0".

Next, in the decision period 3, in "Setting E", "AMPOUT<VREF3" is satisfied. The third decision value J3 is stored in the third bit of the decision value memory 305C as "1". Similarly, the second decision value is stored as "1". The amplification factor of the column amplifier 301 is not changed. At time t415 in the S signal acquisition period, on the basis of the first decision value J1 (=0) and the third decision value J3 (=1) in the decision value memory 305C, the selection circuit 306 sends a control signal to the ramp signal switching circuit 304. The ramp signal switching circuit 304 inputs the ramp signal VRAMP_M to the comparator 303, and the AD conversion sensitivity becomes two times. In this way, in "Setting E", with the amplification factor of the column amplifier 301 being the first amplification factor that becomes four times, the ramp signal VRAMP_M, of which the AD conversion sensitivity becomes twice, is input to comparator 303. In other words, the S signal is acquired with the S conversion sensitivity being 4×2=8 times.

Subsequently, "Setting B" will be described. "Setting B" illustrates an example in which the signal level of the amplified pixel signal AMPOUT is in a high-intermediate level, in other words, light of an intermediate level of the high luminance side is emitted to the pixel.

In the decision period 1, the amplified pixel signal AMPOUT is compared with the first threshold voltage value VREF1. In "Setting B", "AMPOUT≥VREF1" is satisfied, and the first decision value J1 is stored in the first bit of the decision value memory 305C as "0".

Next, in the decision period 3, in "Setting B", "AMPOUT≥VREF3" is satisfied. The third decision value J3 is stored in the third bit of the decision value memory 305C as "0".

Next, in the decision period 2, in "Setting B", "AMPOUT<VREF2" is satisfied. "1" is stored in the second decision value. The amplification factor of the column amplifier 301 is not changed. At time t415 in the S signal acquisition period, on the basis of the first decision value J1 (=0) and the third decision value J3 (=0) stored in the decision value memory 305C, the selection circuit 306 sends a control signal to the ramp signal switching circuit 304. The ramp signal switching circuit 304 inputs the ramp signal VRAMP_H to the comparator 303, and the AD conversion sensitivity becomes one time. In this way, in "Setting B", with the amplification factor of the column amplifier 301 being the first amplification factor that is four times, the ramp signal VRAMP_H, of which the AD conversion sensitivity becomes one time, is input to the comparator 303. In other words, the S signal is acquired with the S conversion sensitivity being 4×1=4 times.

Finally, "Setting C" will be described. "Setting C" illustrates an example in which the signal level of the amplified pixel signal AMPOUT is high, that is, light of high luminance is emitted to the pixel.

In the decision period 1, the amplified pixel signal AMPOUT is compared with the first threshold voltage value VREF1. In "Setting C", "AMPOUT≥VREF1" is satisfied, and the first decision value J1 is stored in the first bit of the decision value memory 305C as "0".

Next, in the decision period 3, in "Setting C", "AMPOUT≥VREF3" is satisfied. The third decision value J3 is stored in the third bit of the decision value memory 305C as "0".

Next, in the decision period 2, in "Setting C", "AMPOUT≥VREF2" is satisfied. "0" is stored in the second decision value. The amplification factor of the column amplifier 301 is switched from the first amplification factor to the second amplification factor to become one time. At time t415 in the S signal acquisition period, on the basis of the first decision value J1 (=0) and the third decision value J3 (=0) stored in the decision value memory 305C, the selection circuit 306 sends a control signal to the ramp signal switching circuit 304. The ramp signal switching circuit 304 inputs the ramp signal VRAMP_H to the comparator 303, and the AD conversion sensitivity becomes one time. In this way, in "Setting C", with the amplification factor of the column amplifier 301 being the second amplification factor that becomes one time, the ramp signal VRAMP_H, of which the AD conversion sensitivity becomes one time is input to the comparator 303. In other words, the S signal is acquired with the S conversion sensitivity being 1×1=4 times.

The states set in the S signal acquisition period according to this embodiment have been described as above. Next, the correction magnification of the S signal will be described with reference to FIG. 17. In this embodiment, a form in which Setting E is added to the first embodiment is formed. When the pixel signal PIXOUT is in the range of the voltage value VR1 [V] to the voltage value VR2 [V], magnification correction of the two times is performed therefor. In addition, presence of a boundary between "Setting A" and "Setting E" at a point at which the pixel signal PIXOUT has the voltage value VR1 [V] and a boundary between "Setting E" and "Setting B" at a point at which the pixel signal PIXOUT has the voltage value VR2 [V] is added to the first embodiment. The magnification correction of other S signals acquired in the pattern represented in the first embodiment is a similar process, and thus description thereof will be omitted.

Figure 18:
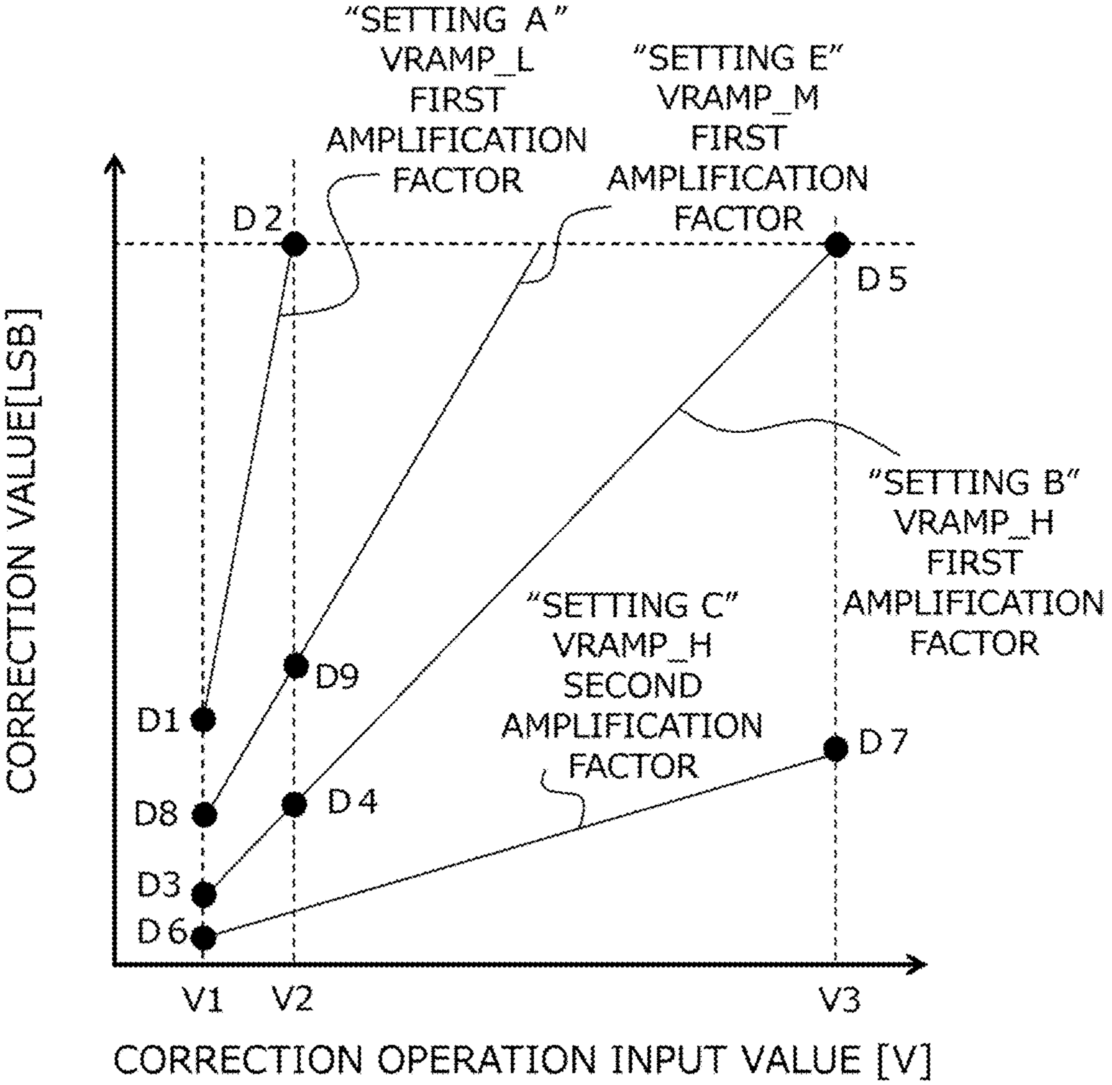
FIG. 18 is a diagram illustrating a correction process for the photoelectric conversion apparatus according to the fourth embodiment.

FIG. 18 is a diagram illustrating correction values acquired in a correction value acquiring operation of the photoelectric conversion apparatus according to this embodiment. Except for the acquisition of correction values in "Setting E", the operation is similar to that according to the first embodiment, and thus duplicate description thereof will be omitted. Correction values acquired by inputting a correction operation input value V1 to the column circuit 104 will be described. A value acquired through AD conversion in "Setting E" is set as a correction value D8. Next, a correction value acquired by inputting the correction operation input value V2 to the column circuit 104 will be described. A value acquired through AD conversion in "Setting E" is set as a correction value D9.

Hereinafter, a method of calculating a ratio error of the amplification factor of the column amplifier 301 and a ratio error of the voltage change rate of the ramp signal according to this embodiment using correction values D1, D2, D3, D4, D5, D6, D7, D8, and D9 will be described.

First, the ratio error of the voltage change rates of the ramp signals VRAMP_L and VRAMP_M is acquired from a ratio between slopes (or differential values) of straight lines acquired by joining the correction value D2 and the correction value D1 acquired in "Setting A" and joining the correction value D9 and the correction value D8 acquired in "Setting E". This is set as a linearity correction value a1.

$$\alpha 1 = \{(D2 - D1)/(D9 - D8)\}/2 \quad \text{(Equation 16)}$$

The linearity of the S signal acquired in "Setting E" is corrected to match the linearity of the signal acquired in "Setting A". In other words, the reference of the linearity is the linearity of the signal acquired in "Setting A".

Subsequently, the ratio error of the voltage change rates of the ramp signals VRAMP_M and VRAMP_H is acquired from a ratio between slopes (or differential values) of straight lines acquired by joining the correction value D9 and the correction value D8 acquired in "Setting E" and joining the correction value D4 and the correction value D3 acquired in "Setting B". This is set as a linearity correction value α2.

$$\alpha 2 = \{(D9 - D8)/(D4 - D3)\}/2 \quad \text{(Equation 17)}$$

The S signal acquired in "Setting B" is multiplied by the linearity correction value α2, and the linearity of the S signal acquired in "Setting B" is corrected to match the linearity of the signal acquired in "Setting E". In addition, the S signal is additionally multiplied by α2 such that this matches the linearity of "Setting A".

Similarly, the ratio error of the amplification factor of the column amplifier 301 is acquired from a ratio between slopes (or differential values) of straight lines acquired by joining the correction value D5 and the correction value D3 acquired in "Setting B" and joining the correction value D7 and the correction value D6 acquired in "Setting C". This is set as a linearity correction value α3.

$$\alpha3=\{(D5-D3)/(D7-D6)\}/4 \quad \text{(Equation 18)}$$

The linearity correction value α3 corrects the linearity of the S signal acquired in the state of "Setting C" to match the linearity of the S signal acquired in the state of "Setting B". However, since it is necessary to match the linearity of "Setting A", the S signal of "Setting C" needs to be multiplied also by the linearity correction values α1 and α2.

Next, a method of calculating the amount of offset occurring due to a setting difference that may occur at a boundary point at which the setting is switched and an output value output from the signal processing circuit 109 of which the linearity and the offset have been corrected will be described.

First, calculation of an offset correction value B1 occurring at the time of switching from "Setting A" to "Setting E" will be described. The correction value D9 acquired in "Setting E" in a correction value acquiring operation becomes a post-correction output 2×α1×D9 through magnification correction and linearity correction. When this post-correction output is equal to the correction value D2, offset does not occur. In other words, a differential value between this D2 and 2×α1×D9 becomes the offset correction value β1.

$$\beta1=D2-2\times\alpha1\times D9 \quad \text{(Equation 19)}$$

Accordingly, a signal SB that is acquired by correcting the S signal acquired in "Setting E" using the signal processing circuit 109 and is output from the signal processing circuit 109 is as below.

$$SB=2\times\alpha1\times S+\beta1-N \quad \text{(Equation 20)}$$

N is a digital value of the N signal. Next, the calculation of the offset correction value β2 that occurs at the time of switching from "Setting E" to "Setting B" will be described. The correction value D9 acquired in "Setting C" in the correction value acquiring operation becomes a post-correction output 4×α1×α2×D4 through the magnification correction and the linearity correction. In a case in which this post-correction output is equal to the post-correction output 2×α1×D9 acquired by performing the magnification correction and the linearity correction for the correction value D9, no offset occurs. In other words, a differential value between post-correction outputs is the offset correction value β2.

$$\beta2=2\times\alpha1\times D9-4\times\alpha1\times\alpha2\times D4 \quad \text{(Equation 21)}$$

Thus, the N signal is subtracted from a signal SC that is acquired by correcting the S signal acquired in "Setting B" using the signal processing circuit 109 and is output from the signal processing circuit 109 and becomes as below.

$$SC=4\times\alpha1\times\alpha2\times S+\beta2N \quad \text{(Equation 22)}$$

Finally, the calculation of an offset correction value B3 that occurs at the time of switching from "Setting B" to "Setting C" will be described. The correction value D7 acquired in "Setting C" in the correction value acquiring operation becomes a post-correction output 16×α1×α2×α3×D7 through magnification correction and linearity correction. When this post-correction output is equal to the post-correction output 4×α1×α2×D5 acquired by performing the magnification correction and the linearity correction for the correction value D5, no offset occurs. That is, the differential value between the post-correction outputs is the offset correction value β2.

$$\beta2=4\times\alpha1\times\alpha2\times D5-16\times\alpha1\times\alpha2\times\alpha3\times D7 \quad \text{(Equation 23)}$$

Accordingly, the N signal is subtracted from the signal SD that is acquired by correcting the S signal acquired in "Setting C" using the signal processing circuit 109 and is output from the signal processing circuit 109 and becomes as below.

$$SD=16\times\alpha1\times\alpha2\times\alpha3\times S+\beta2N \quad \text{(Equation 24)}$$

A correction process is not performed by the signal processing circuit 109 for the S signal acquired in "Setting A", and the output from the signal processing circuit 109 is as below.

$$SA=S-N \quad \text{(Equation 25)}$$

In this way, by correcting the S signal using the linearity correction values α1, α2, and α3 and the offset correction values β1, β2, and β3 acquired by the correction operation, a signal exhibiting good linearity characteristics for the amount of incident light can be acquired.

Figure 19A:
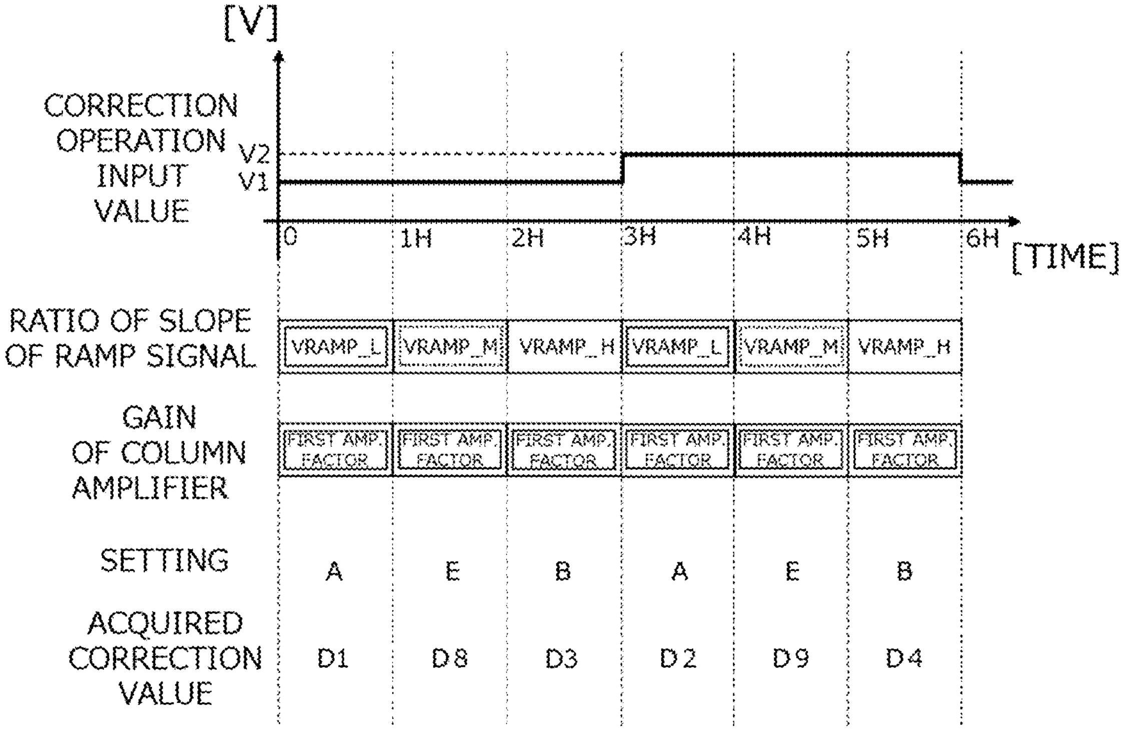
FIGS. 19A and 19B are diagrams illustrating a method of acquiring a correction value according to the fourth embodiment.
Figure 19B:
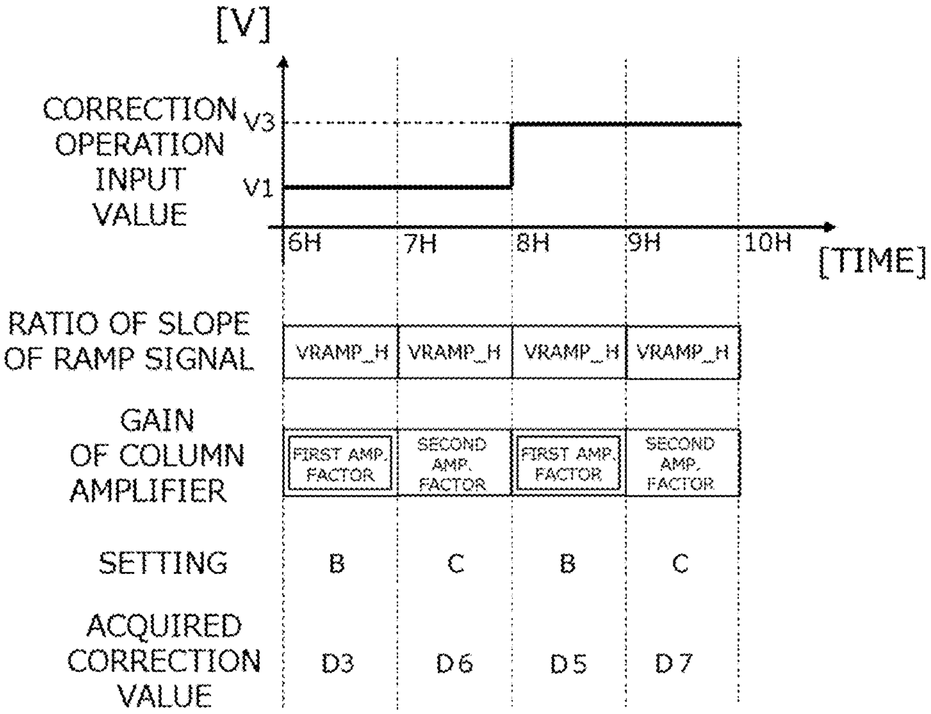

Next, the method of acquiring correction values during an imaging operation will be described. FIGS. 19A and 19B are diagrams illustrating a method of outputting correction values in the photoelectric conversion apparatus according to this embodiment. Here, a time required for reading pixels 101 corresponding to one row among pixels 101 arranged in a matrix pattern will be denoted by 1H. FIGS. 19A and 19B illustrate the setting state of the correction operation input value input to the column circuit 104, the voltage change rate of the ramp signal, and the amplification factor of the column amplifier in a time series in units of 1H times. As the correction values, the correction values D1, D2, D3, D4, D5, D6, D7, D8, and D9 are output for each row by sequentially switching the correction operation input value, the amplification factor of the column amplifier, and the voltage change rate of the ramp signal using a read time corresponding to 10 rows 1H to 10H. This operation may be performed, for example, using rows exhibiting non-sensitivity and formed from pixels not used for imaging such as optical black rows and the like. Hereinafter, a correction value acquiring operation until a time 6H illustrated in FIG. 19A will be described. In the correction value acquiring operation, in a period from time 0 to time 1H, the correction value D1 is acquired. In this period, the correction operation input value V1 is input, and the column circuit 104 performs AD conversion in the setting of "Setting A". The S signal of a row output in this period becomes the correction value D1.

In a period from time 1H to time 2H, the correction value D8 is acquired. In this period, the correction operation input value V1 is input, and the column circuit 104 performs AD conversion in the setting of "Setting E". Then, the S signal of the row output during this period becomes the correction value D8.

In a period from time 2H to time 3H, the correction value D3 is acquired. In this period, the correction operation input value V2 is input, and the column circuit 104 performs AD conversion in the setting of "Setting B". Then, the S signal of the row output in this period becomes the correction value D3.

In a period from time 3H to time 4H, the correction value D2 is acquired. In this period, the correction operation input value V2 is input, and the column circuit 104 performs AD conversion in the setting of "Setting A". Then, the S signal of the row output in this period becomes the correction value D2.

In a period from time 4H to time 5H, the correction value D9 is acquired. In this period, the correction operation input value V2 is input, and the column circuit 104 performs AD conversion in the setting of "Setting E". Then, the S signal of the row output in this period becomes the correction value D9.

In a period from time 5H to time 6H, the correction value D4 is acquired. In this period, the correction operation input value V2 is input, and the column circuit 104 performs AD conversion in the setting of "Setting B". Then, the S signal of the row output in this period becomes the correction value D4.

Hereinafter, the correction value acquiring operation from time 6H to time 10H illustrated in FIG. 19B will be described.

A period from time 6H to time 7H is in the same state as that of the period from time 2H to time 3H, and the correction value D3 is output. Measurement is performed with symmetry in the time series taken into account. In a period from time 7H to time 8H, the correction value D6 is acquired. In this period, the correction operation input value V1 is input, and the column circuit 104 performs AD conversion in the setting of "Setting C". Then, the S signal of the row output in this period becomes the correction value D6.

In a period from time 8H to time 9H, the correction value D5 is acquired. In this period, the correction operation input value V3 is input, and the column circuit 104 performs AD conversion in the setting of "Setting B". Then, the S signal of the row output in this period becomes the correction value D5.

In a period from time 9H to time 10H, the correction value D7 is acquired. In this period, the correction operation input value V3 is input, and the column circuit 104 performs AD conversion in the setting of "Setting C". Then, the S signal of the row output in this period becomes the correction value D7. The correction values D1, D2, D3, D4, D5, D6, D7, D8, and D9 that have been acquired over the 10H time as above are input to the signal processing circuit 109 and are used in the correction process described with reference to FIG. 7.

In this embodiment, an example in which the threshold voltage value for determining the voltage change rate of the ramp signal in the decision period is configured in multiple stages, and the AD conversion sensitivity that can be set is configured in multiple stages has been illustrated. The configuration is not limited thereto, and the amplification factor of the column amplifier may be configured in multiple stages. Although the threshold voltage for determining the voltage change rate of the ramp signal is also set to be in a stepped shape, it may be also set by resetting the ramp signal each time.

In each of the embodiments described above, the form in which the comparator 303, which is a comparison circuit, compares the threshold voltage value that determines the voltage change rate of the ramp signal with the pixel signal and compares the threshold voltage value that determines the setting state of the amplification factor of the column amplifier with the pixel signal has been illustrated. The configuration is not limited to this form, and a decision circuit disposed separated from the comparator 303 may be configured to perform such comparison. In this decision circuit, a comparison circuit that compares the pixel signal with the threshold voltage value and outputs a decision value corresponding to a first signal representing the result of the comparison and a decision value corresponding to a second signal may be disposed.

In each of the embodiments described above, although the form in which the signal voltage of the ramp signal is changed in a slope shape has been illustrated, the configuration is not limited to this form. For example, a form in which the signal voltage is changed in a stepped shape may be used, and such a form is also included in a ramp signal that changes at a predetermined voltage change rate. In addition, the voltage change rate of the ramp signal does not need to be constant all the time. For example, the signal voltage may change at a relatively small voltage change rate at the time of starting the change of the signal voltage of the ramp signal, and after a predetermined period elapses, the signal voltage of the ramp signal may change at a relatively large voltage change rate.

In addition, in each of the embodiments described above, although the column circuit 104 is disposed for one column of the pixels 101, the configuration is not limited to this correspondence relation. In other words, a plurality of column circuits 104 may be disposed for one column of the pixels 101, or a form in which one column circuit 104 is disposed for a plurality of columns of pixels 101 may be used.

The photoelectric conversion apparatus according to each of the embodiments described above can be applied to a multilayer sensor in which multiple substrates are stacked or a single-layer sensor in which each of the members illustrated in FIG. 1 is arranged on a single layer of a substrate. In the case of a multilayer sensor, how each of the members illustrated in FIG. 1 is arranged on a plurality of substrates can be designed as needed. For example, in a case in which two substrates are stacked, an array of multiple rows and multiple columns of pixels 101 can be arranged on the first substrate, and members other than this array among the members illustrated in FIG. 1 can be arranged on a second substrate. In a case in which three substrates are stacked, among the components of the pixel 101, a photodiode 201 and a transfer MOS transistor 202 can be arranged on a first substrate, and the other members of the pixel 101 can be arranged on a second substrate. Then, among the members illustrated in FIG. 1, a form in which members other than the array of pixels 101 arranged in multiple rows and multiple columns can be arranged on a third substrate may be used. This arrangement method is an example and can be changed as needed. For example, an array of pixels 101 arranged in multiple rows and multiple columns may be arranged on the first substrate, and members other than this array among the members illustrated in FIG. 1 may be arranged on the second substrate. Then, on the third substrate, a memory array (for example, a DRAM or the like) that maintains signals and an arithmetic unit that performs signal processing (may have a machine learning function) may be arranged. The multiplayer sensor may be a sensor in which further more substrates are stacked.

In the following, photoelectric conversion systems, moving bodies and equipment are described.

Fifth Embodiment

Figure 20:
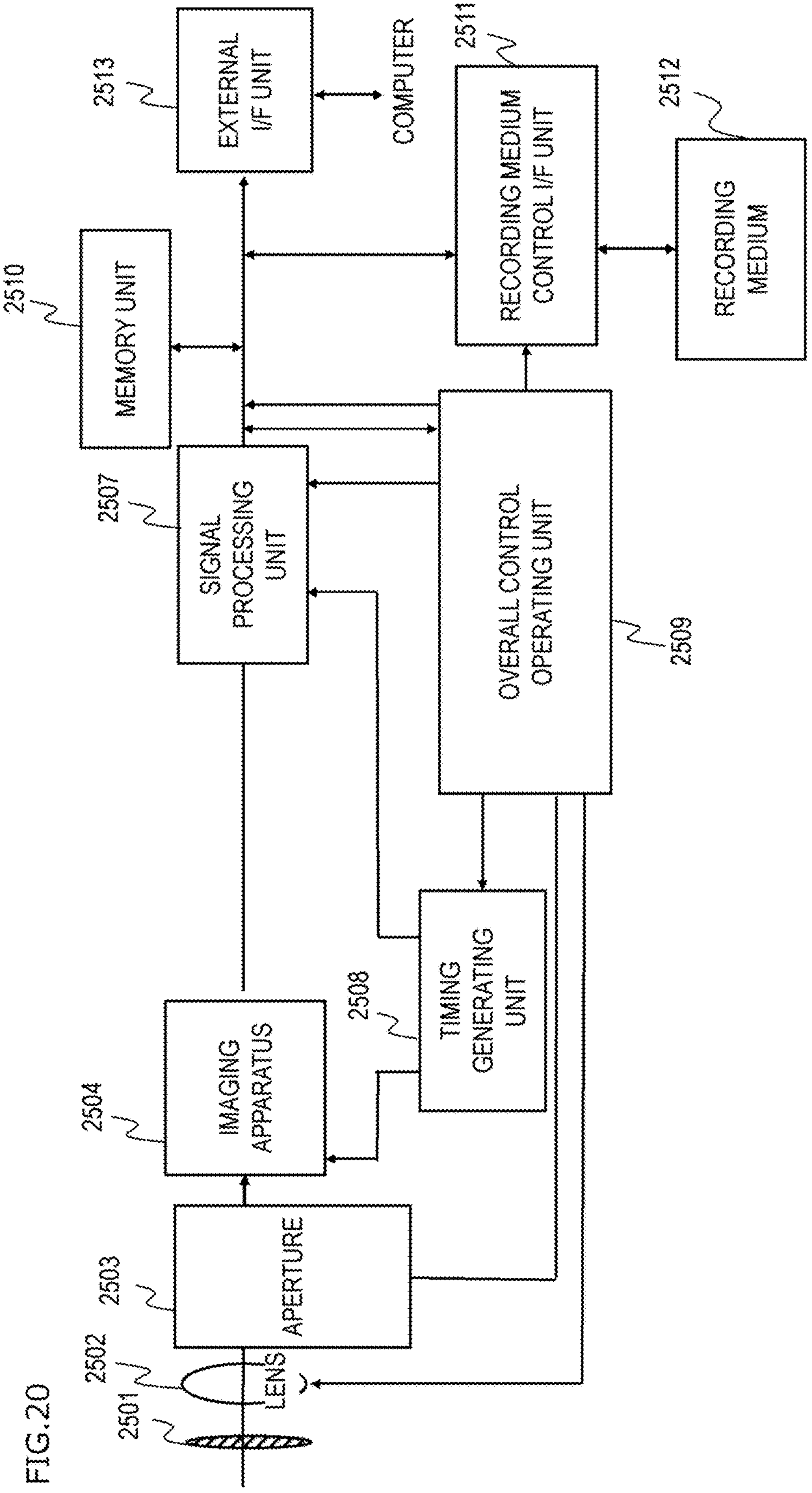
FIG. 20 is a diagram illustrating a photoelectric conversion system according to a fifth embodiment.

A photoelectric conversion system according to the present embodiment will be described with reference to FIG. 20. FIG. 20 is a block diagram showing a schematic configuration of the photoelectric conversion system according to the present embodiment.

The photoelectric conversion apparatuses described in the first to fourth embodiments can be applied to various photoelectric conversion systems. Each of the photoelectric conversion systems includes at least the photoelectric conversion apparatuses according to any of the embodiments described above and a signal processing portion that processes signals output from the photoelectric conversion apparatus. Examples of devices to which such a photoelectric conversion system can be applied include a digital still camera, a digital camcorder, a monitoring camera, a copier, a facsimile, a mobile phone, a vehicle-mounted camera, an observation satellite, a sensor, and a measuring instrument. In addition, camera modules provided with an optical system such as a lens and an imaging apparatus are also included in devices to which a photoelectric conversion system is applied. FIG. 20 illustrates a block diagram of a digital still camera as an example of such devices.

The photoelectric conversion system illustrated in FIG. 20 has an imaging apparatus 2504 to which the photoelectric conversion apparatus according to each embodiment as described above can be applied and a lens 2502 that causes an optical image of an object to be formed on the imaging apparatus 2504. In addition, the photoelectric conversion system has an aperture 2503 for making a light amount that passes through the lens 2502 variable and a barrier 2501 for protecting the lens 2502. The lens 2502 and the aperture 2503 are optical systems for collecting light to the imaging apparatus 2504. The imaging apparatus 2504 is the photoelectric conversion apparatus according to any of the embodiments described above and converts an optical image having been formed by the lens 2502 into an electric signal.

The photoelectric conversion system also has a signal processing portion 2507 which is an image generating portion for generating an image by processing an output signal that is output from the imaging apparatus 2504. The signal processing portion 2507 performs operations in which the output signal is subjected to various corrections and compression when necessary and image data is output. The signal processing portion 2507 may be formed on a semiconductor substrate provided with the imaging apparatus 2504 or formed on a semiconductor substrate that is separate from the imaging apparatus 2504. In addition, the imaging apparatus 2504 and the signal processing portion 2507 may be formed on a same semiconductor substrate.

The photoelectric conversion system further has a memory portion 2510 for temporarily storing image data and an external interface portion (an external I/F portion) 2513 for communicating with an external computer or the like. Furthermore, the photoelectric conversion system has a recording medium 2512 such as a semiconductor memory for recording or reading imaging data and a recording medium control interface portion (a recording medium control I/F portion) 2511 for performing recording or reading with respect to the recording medium 2512. The recording medium 2512 may be built into the photoelectric conversion system or may be attachable to and detachable from the photoelectric conversion system.

Furthermore, the photoelectric conversion system has an overall control operating portion 2509 that performs various arithmetic operations and controls the entire digital still camera and a timing generating portion 2508 that outputs various timing signals to the imaging apparatus 2504 and the signal processing portion 2507. In this case, the timing signals and the like may be input from outside and the photoelectric conversion system need at least have the imaging apparatus 2504 and the signal processing portion 2507 that processes an output signal that is output from the imaging apparatus 2504.

The imaging apparatus 2504 outputs an imaging signal to the signal processing portion 2507. The signal processing portion 2507 performs predetermined signal processing on the imaging signal output from the imaging apparatus 2504 and outputs image data. The signal processing portion 2507 generates an image using the imaging signal.

As described above, according to the present embodiment, a photoelectric conversion system to which the photoelectric conversion apparatus according to any one of the first to fourth embodiments described above is applied can be realized.

Sixth Embodiment

Figure 21A:
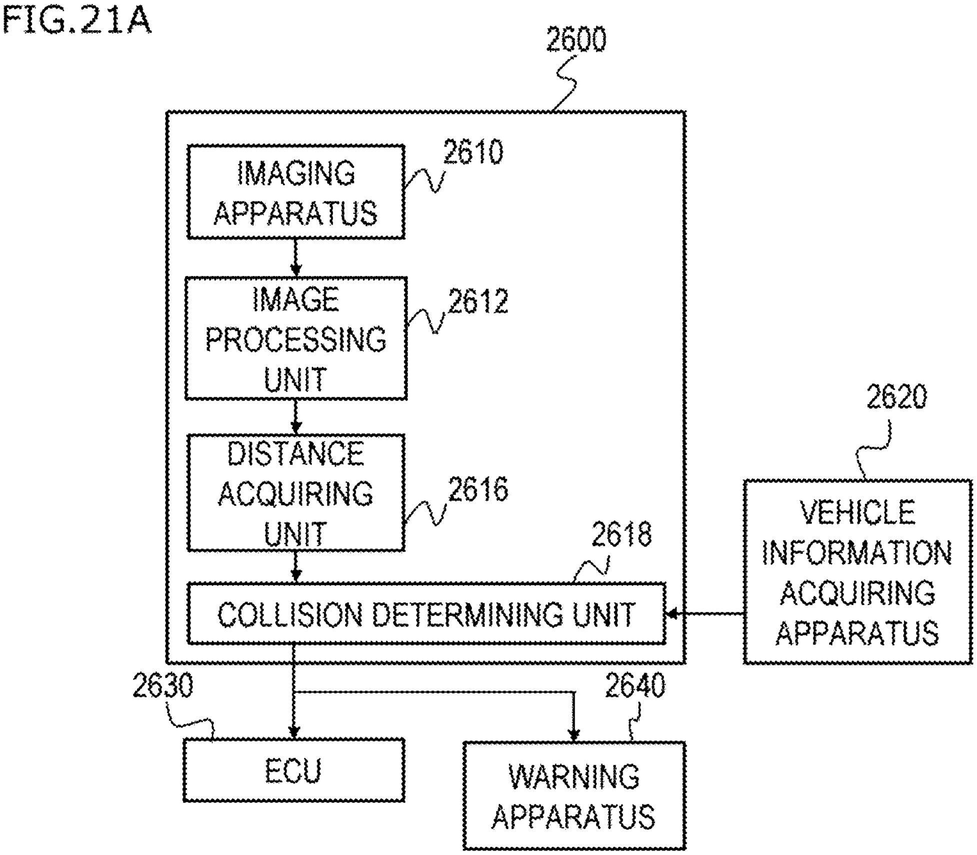
FIGS. 21A and 21B are diagrams illustrating a photoelectric conversion system according to a sixth embodiment and a moving body.
Figure 21B:
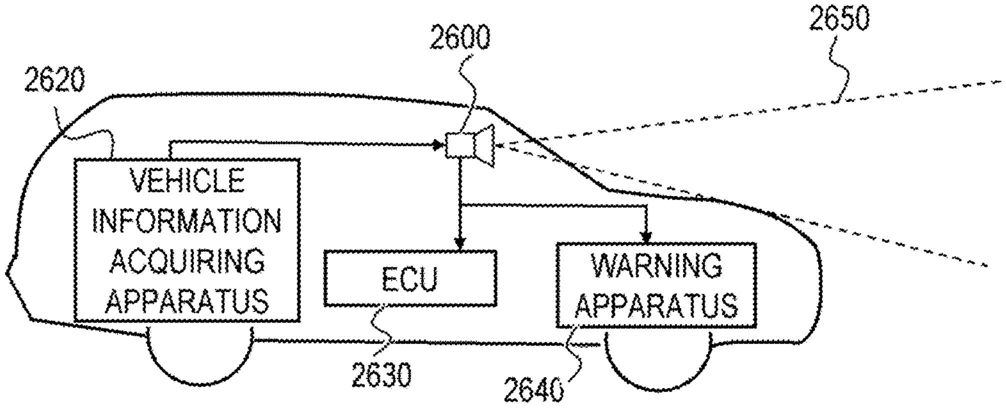

A photoelectric conversion system and a moving body according to the present embodiment will be described with reference to FIGS. 21A and 21B. FIG. 21A is a diagram showing a configuration of the photoelectric conversion system according to the present embodiment and FIG. 21B is a diagram showing a configuration of the moving body according to the present embodiment.

FIG. 21A shows an example of a photoelectric conversion system related to a vehicle-mounted camera. A photoelectric conversion system 2600 includes an imaging apparatus 2610 to which the photoelectric conversion apparatus described in any one of the first to fourth embodiments described above is applied. The photoelectric conversion system 2600 has an image processing unit 2612 that performs image processing on a plurality of pieces of image data acquired by the imaging apparatus 2610. In addition, the photoelectric conversion system 2600 has a distance acquiring unit 2616 that calculates a distance to an object and a collision determining unit 2618 that determines whether or not there is a possibility of a collision based on the calculated distance. In this case, the distance acquiring unit 2616 may acquire information on the distance to the object based on a ToF (Time of Flight) or may acquire distance information using parallax information or the like. Furthermore, the distance acquiring unit 2616 may acquire distance information by combining ranging according to ToF and ranging based on a phase difference between pixels. In other words, distance information is information related to a parallax, a defocus amount, a distance to the object, or the like. The collision determining unit 2618 may determine a possibility of a collision using any of these pieces of distance information. The distance information acquiring means may be realized by exclusively-designed hardware or may be realized by a software module. Alternatively, the distance information acquiring means may be realized by an FPGA (Field Programmable Gate Array), an ASIC (Application Specific Integrated Circuit), or the like, or a combination thereof.

The photoelectric conversion system 2600 is connected to a vehicle information acquiring apparatus 2620 and is capable of acquiring vehicle information such as a vehicle speed, a yaw rate, and a steering angle. In addition, an ECU 2630 which is a control apparatus that outputs a control signal causing a vehicle to generate a braking force based on a determination result of the collision determining unit 2618 is connected to the photoelectric conversion system 2600. Furthermore, the photoelectric conversion system 2600 is also connected to a warning apparatus 2640 that issues a warning to a driver based on a determination result of the collision determining unit 2618. For example, when it is found that the possibility of a collision is high as a determination result of the collision determining unit 2618, the ECU 2630 performs vehicle control involving applying the brakes, releasing the gas pedal, suppressing engine output, or the like to avoid a collision and/or reduce damage. The warning apparatus 2640 issues a warning to a user by sounding an alarm, displaying warning information on a screen of a car navigation system or the like, vibrating a seat belt or a steering wheel, or the like.

In the present embodiment, an image of a periphery of the vehicle such as the front or the rear of the vehicle is picked up by the photoelectric conversion system 2600. FIG. 21B shows the photoelectric conversion system when imaging of the front of the vehicle (an imaging range 2650) is performed. The vehicle information acquiring apparatus 2620 sends an instruction to the photoelectric conversion system 2600 or the imaging apparatus 2610. According to such a configuration, accuracy of ranging can be further improved.

While an example of controlling a vehicle so as to prevent a collision with another vehicle has been described above, the photoelectric conversion system can also be applied to controlling automated driving so that the vehicle follows another vehicle, controlling automated driving so that the vehicle stays within a lane, and the like. In addition, the photoelectric conversion system is not limited to a vehicle such as an automobile and can also be applied to a moving body (moving apparatus) such as a ship, an airplane, or an industrial robot. The moving body includes one of or both of a driving force generating unit that generates a driving force mainly used for movement of the moving body and a rotating member that is mainly used for movement of the moving body. The driving force generating unit can be an engine, a motor, or the like. The rotating member can be a tire, a wheel, a screw of a ship, a propeller of a flight vehicle, or the like. Moreover, besides moving bodies, the photoelectric conversion system can be applied to a wide variety of apparatuses that utilize object recognition such as an intelligent transportation system (ITS).

Seventh Embodiment

Figure 22:
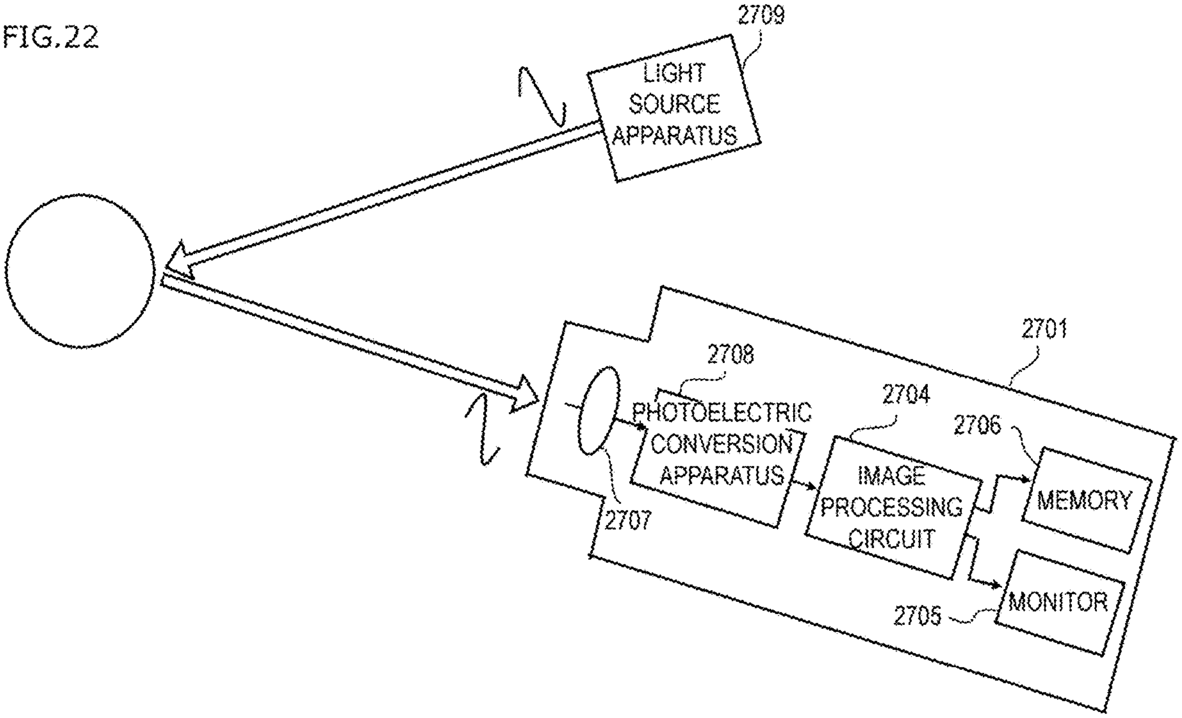
FIG. 22 is a diagram illustrating a distance image sensor according to a seventh embodiment.

A photoelectric conversion system according to the present embodiment will be described with reference to FIG. 22. FIG. 22 is a block diagram showing a configuration example of a distance image sensor that is the photoelectric conversion system according to the present embodiment.

As shown in FIG. 22, a distance image sensor 2701 is configured to include an optical system 2707, a photoelectric conversion apparatus 2708, an image processing circuit 2704, a monitor 2705, and a memory 2706. In addition, the distance image sensor 2701 is capable of acquiring a distance image in accordance with a distance to a subject by receiving light (modulated light or pulsed light) emitted toward the subject from a light source apparatus 2709 and reflected by a surface of the subject.

The optical system 2707 is configured with one or a plurality of lenses and guides image light (incident light) from the subject to the photoelectric conversion apparatus 2708 and forms an image on a light-receiving surface (a sensor unit) of the photoelectric conversion apparatus 2708.

The photoelectric conversion apparatus according to any one of the first to fourth embodiments can be applied to the photoelectric conversion apparatus 2708. A distance signal indicating the distance calculated from the light-receiving signal output from the photoelectric conversion apparatus 2708 is supplied to the image processing circuit 2704.

The image processing circuit 2704 performs image processing for constructing a distance image based on the distance signal supplied from the photoelectric conversion apparatus 2708. In addition, a distance image (image data) obtained by the image processing is supplied to and displayed by the monitor 2705 or supplied to and stored (recorded) in the memory 2706.

With the distance image sensor 2701 configured as described above, applying one of the photoelectric conversion apparatuses described above enables, for example, a more accurate distance image to be acquired due to an improvement in ranging accuracy.

Eighth Embodiment

Figure 23:
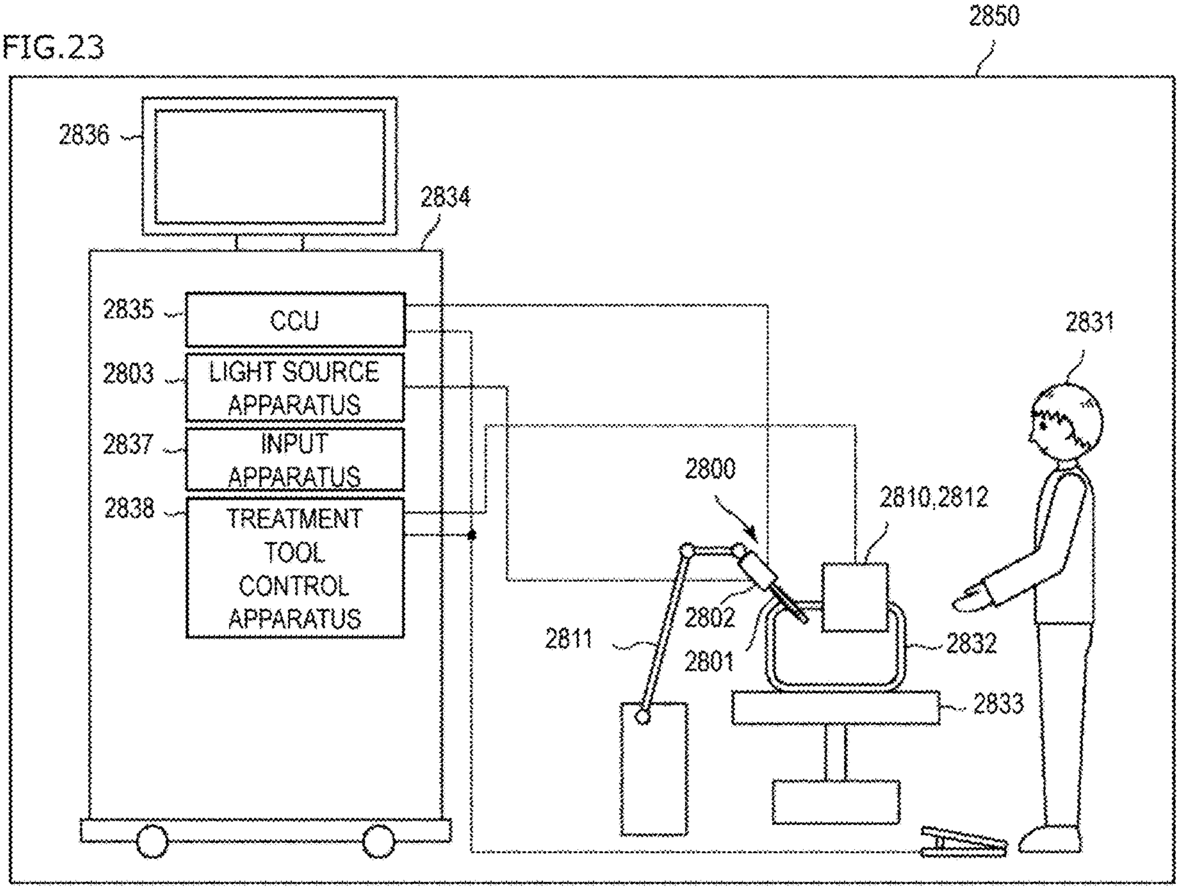
FIG. 23 is a diagram illustrating an endoscope surgical system according to an eighth embodiment.

A photoelectric conversion system according to the present embodiment will be described with reference to FIG. 23. FIG. 23 is a diagram showing an example of a schematic configuration of an endoscopic surgery system that is the photoelectric conversion system according to the present embodiment.

FIG. 23 illustrates a situation where a technician (a physician) 2831 is using an endoscopic surgery system 2850 to operate on a patient 2832 on a patient bed 2833. As illustrated, the endoscopic surgery system 2850 is constituted of an endoscope 2800, a surgical instrument 2810, and a cart 2834 mounted with various apparatuses for an endoscopic surgery.

The endoscope 2800 is constituted of a lens barrel 2801 of which a region with a predetermined length from a distal end is to be inserted into a body cavity of the patient 2832 and a camera head 2802 connected to a base end of the lens barrel 2801. While the illustrated example features the endoscope 2800 being configured as a so-called rigid scope having a rigid lens barrel 2801, alternatively, the endoscope 2800 may be configured as a so-called flexible scope having a flexible lens barrel.

An opening into which an objective lens is fitted is provided at the distal end of the lens barrel 2801. A light source apparatus 2803 is connected to the endoscope 2800, and light generated by the light source apparatus 2803 is guided to the distal end of the lens barrel 2801 by a light guide provided so as to extend inside the lens barrel and emitted toward an observation object inside a body cavity of the patient 2832 via the objective lens. It should be noted that the endoscope 2800 may be a forward-viewing endoscope, an oblique-viewing endoscope, or a side-viewing endoscope.

An optical system and a photoelectric conversion apparatus are provided inside the camera head 2802 and reflected light (observation light) from the observation object is collected to the photoelectric conversion apparatus by the optical system. The observation light is photoelectrically converted by the photoelectric conversion apparatus and an electric signal corresponding to the observation light or, in other words, an image signal corresponding to an observed image is generated. As the photoelectric conversion apparatus, the photoelectric conversion apparatus according to any one of the embodiments described above can be used. The image signal is transmitted to a Camera Control Unit (CCU) 2835 as RAW data.

The CCU 2835 is constituted of a CPU (Central Processing Unit), a GPU (Graphics Processing Unit), or the like and comprehensively controls operations of the endoscope 2800 and a display apparatus 2836. In addition, the CCU 2835 receives an image signal from the camera head 2802 and subjects the image signal to various kinds of image processing for displaying an image based on the image signal such as development processing (demosaicing).

Under control exerted by the CCU 2835, the display apparatus 2836 displays an image based on the image signal subjected to image processing by the CCU 2835. The light source apparatus 2803 is constituted of a light source such as an LED (Light-Emitting Diode) and supplies the endoscope 2800 with irradiation light used when photographing a surgical site or the like.

An input apparatus 2837 is an input interface with respect to the endoscopic surgery system 2850. A user can input various kinds of information and input instructions to the endoscopic surgery system 2850 via the input apparatus 2837.

A treatment tool control apparatus 2838 controls drive of an energy treatment tool 2812 for cauterizing or incising tissue, sealing a blood vessel, or the like. The light source apparatus 2803 that supplies the endoscope 2800 with irradiation light when photographing a surgical site can be constituted of a white light source constituted of an LED, a laser light source, or a combination thereof. When the white light source is constituted of a combination of RGB laser light sources, since output intensity and an output timing of each color (each wavelength) can be controlled with high accuracy, white balance of a captured image can be adjusted in the light source apparatus 2803. In addition, in this case, an image corresponding to each of RGB can be captured in a time-divided manner by having an observation object be irradiated with laser light from each of the RGB laser light sources in a time-divided manner and controlling drive of an imaging element of the camera head 2802 in synchronization with the irradiation timing. According to this method, a color image can be obtained without having to provide the imaging element with a color filter.

In addition, drive of the light source apparatus 2803 may be controlled such that intensity of output light changes at predetermined intervals. By controlling drive of imaging elements of the camera head 2802 in synchronization with a timing at which the intensity of light changes to acquire images in a time-divided manner and compositing the images, an image with a high dynamic range that is free of so-called blocked-up shadows and blown-out highlights can be generated.

Furthermore, the light source apparatus 2803 may be configured to be capable of supplying light in a predetermined wavelength band that accommodates special light observation. In special light observation, for example, wavelength dependence of absorption of light by body tissue is utilized. Specifically, predetermined tissue such as a blood vessel of a superficial portion of a mucous membrane is photographed with high contrast by irradiating light with a narrower band than irradiation light during normal observation (in other words, white light). Alternatively, in special light observation, fluorescent observation may be performed in which an image is obtained using fluorescent light generated by irradiating excitation light. In fluorescent observation, body tissue may be irradiated with excitation light and fluorescent light from the body tissue can be observed, a reagent such as indocyanine green (ICG) can be locally injected into body tissue and the body tissue can be irradiated with excitation light corresponding to a fluorescent wavelength of the reagent to obtain a fluorescent image, and the like. The light source apparatus 2803 may be configured to be capable of supplying narrow-band light and/or excitation light that accommodates such special light observation.

Ninth Embodiment

Figure 24A:
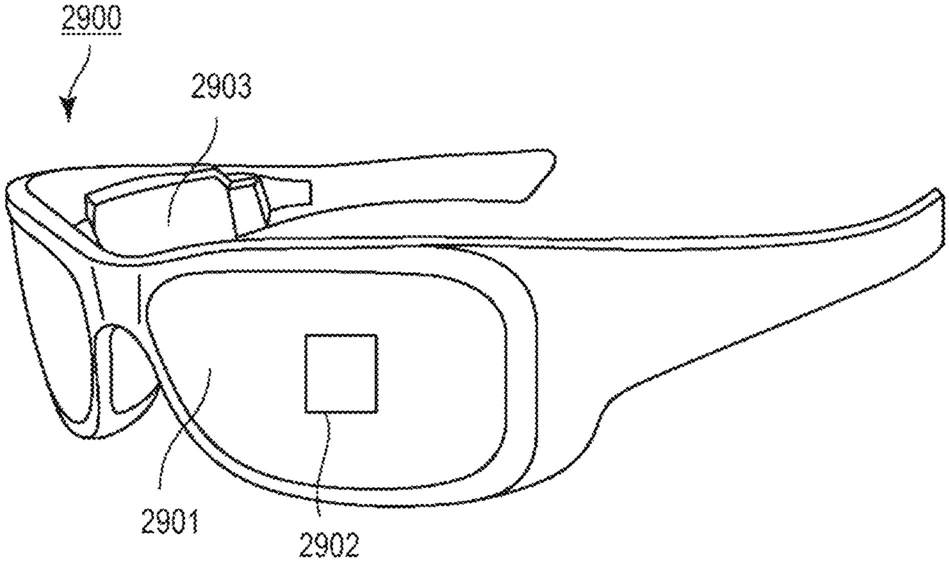
FIGS. 24A and 24B are diagrams illustrating smart glasses according to a ninth embodiment.

A photoelectric conversion system according to the present embodiment will be described with reference to FIGS. 24A and 24B. FIG. 24A illustrates eyeglasses 2900 (smart glasses) that is the photoelectric conversion system according to the present embodiment. The eyeglasses 2900 have a photoelectric conversion apparatus 2902. The photoelectric conversion apparatus 2902 is the photoelectric conversion apparatus according to any one of the first to fourth embodiments described above. In addition, a display apparatus including a light-emitting apparatus such as an OLED or an LED may be provided on a rear surface side of a lens 2901. There may be one or a plurality of photoelectric conversion apparatuses 2902. Alternatively, a plurality of types of photoelectric conversion apparatuses may be used in combination. An arrangement position of the photoelectric conversion apparatus 2902 is not limited to that shown in FIG. 24A.

The eyeglasses 2900 further include a control apparatus 2903. The control apparatus 2903 functions as a power source that supplies power to the photoelectric conversion apparatus 2902 and the display apparatus described above. In addition, the control apparatus 2903 controls operations of the photoelectric conversion apparatus 2902 and the display apparatus. An optical system for collecting light to the photoelectric conversion apparatus 2902 is formed in the lens 2901.

Figure 24B:
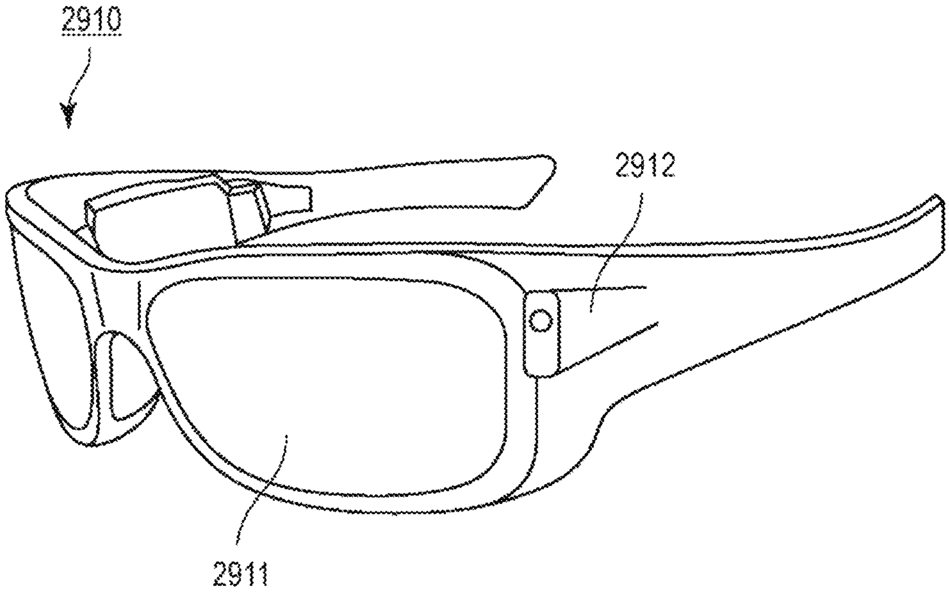

FIG. 24B illustrates eyeglasses 2910 (smart glasses) according to one application example. The eyeglasses 2910 include a control apparatus 2912 and the control apparatus 2912 is mounted with a photoelectric conversion apparatus that corresponds to the photoelectric conversion apparatus 2902 and a display apparatus. An optical system for projecting light emitted from the photoelectric conversion apparatus inside the control apparatus 2912 and the display apparatus is formed in the lens 2911 and an image is projected onto the lens 2911. The control apparatus 2912 functions as a power source that supplies power to the photoelectric conversion apparatus and the display apparatus and, at the same time, controls operations of the photoelectric conversion apparatus and the display apparatus. The control apparatus may have a line-of-sight detecting unit that detects a line-of-sight of a wearer. Infrared light may be used to detect a line-of-sight. An infrared light-emitting unit emits infrared light to the eyes of a user who is looking at a display image. A picked-up image of the eyes can be obtained by having an imaging unit including a light-receiving element detect reflected light from the eyes of emitted infrared light. Providing reducing means that reduces light from the infrared light-emitting unit to the display unit in a plan view enables a decline in image quality to be mitigated.

A line-of-sight of the user with respect to a display image can be detected from a picked-up image of eyes obtained by imaging with infrared light. Any known method can be applied to line-of-sight detection using a picked-up image of the eyes. For example, a line-of-sight detection method based on a Purkinje image due to reflection of irradiation light by the cornea can be used.

More specifically, line-of-sight detection processing based on a pupil-corneal reflection method is performed. Using the pupil-corneal reflection method, a line-of-sight of a user is detected by calculating a line-of-sight vector that represents an orientation (a rotation angle) of the eyes based on an image of a pupil included in a picked-up image of the eyes and a Purkinje image.

The display apparatus according to the present embodiment may have a photoelectric conversion apparatus including a light-receiving element and a display image of the display apparatus may be controlled based on line-of-sight information of the user from the photoelectric conversion apparatus.

Specifically, the display apparatus determines, based on the line-of-sight information, a first field-of-view region which the user focuses on and a second field-of-view region other than the first field-of-view region. The first field-of-view region and the second field-of-view region may be determined by the control apparatus of the display apparatus or regions determined by an outside control apparatus may be received as the first field-of-view region and the second field-of-view region. In a display region of the display apparatus, a display resolution of the first field-of-view region may be controlled to be higher than a display resolution of the second field-of-view region. In other words, the resolution of the second field-of-view region may be set lower than that of the first field-of-view region.

In addition, the display region may have a first display region and a second display region that differs from the first display region, and a region with high priority may be determined from the first display region and the second display region based on line-of-sight information. The first display region and the second display region may be determined by the control apparatus of the display apparatus or regions determined by an outside control apparatus may be received as the first display region and the second display region. A resolution of a region with high priority may be controlled to be higher than a resolution of a region other than the region with high priority. In other words, a resolution of a region of which a priority is relatively low can be lowered.

It should be noted that an AI (Artificial Intelligence) may be used to determine the first field-of-view region and a region with high priority. The AI may be a model configured to use an image of the eyes and a direction actually viewed by the eyes in the image as teacher data to estimate, from the image of the eyes, an angle of a line-of-sight and a distance to an object ahead of the line-of-sight. An AI program may be included in the display apparatus, the photoelectric conversion apparatus, or an external apparatus. When the external apparatus includes an AI program, an inference result by an AI is sent to the display apparatus via communication.

Display control based on visual recognition and detection can be preferably applied to smart glasses further including a photoelectric conversion apparatus that captures images of the outside. The smart glasses are capable of displaying captured external information in real-time.

Tenth Embodiment

The photoelectric conversion apparatuses and the photoelectric conversion systems described above can be applied to, for example, electronic devices such as so-called smartphones and tablets.

Figure 25A:
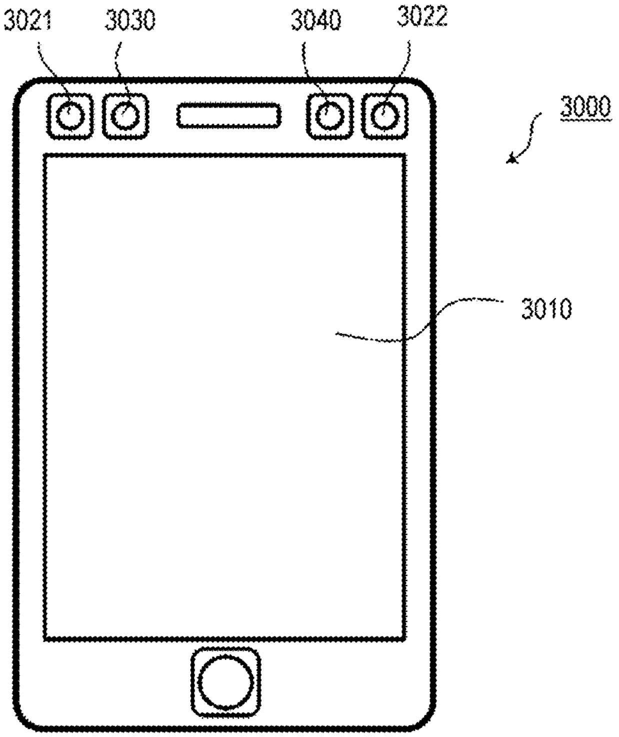
FIGS. 25A and 25B are diagrams illustrating an electronic device according to a tenth embodiment.
Figure 25B:
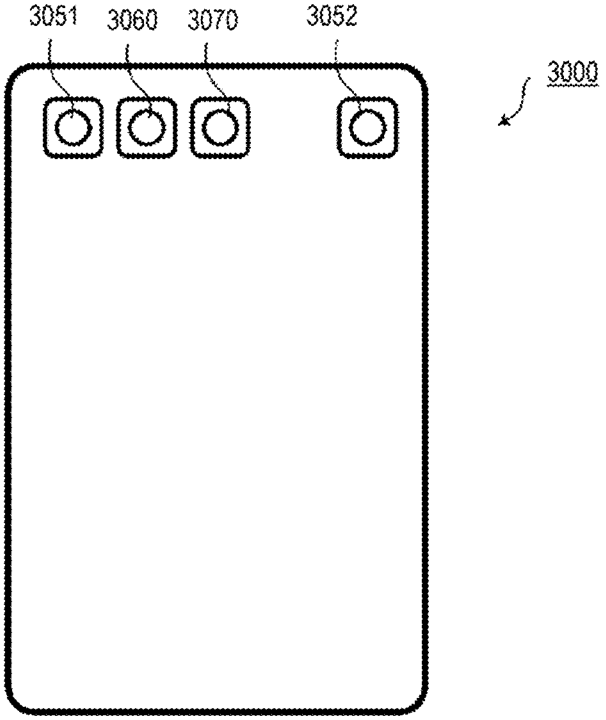

FIGS. 25A and 25B are diagrams showing an example of an electronic device 3000 to which a photoelectric conversion apparatus is mounted. FIG. 25A shows a front surface side of the electronic device 3000 and FIG. 25B shows a rear surface side of the electronic device 3000.

As shown in FIG. 25A, a display 3010 that displays an image is arranged at a center of the front surface of the electronic device 3000. In addition, front cameras 3021 and 3022 that use the photoelectric conversion apparatus, an IR light source 3030 that emits infrared light, and a visible light source 3040 that emits visible light are arranged along an upper side of the front surface of the electronic device 3000.

Furthermore, as shown in FIG. 25B, rear cameras 3051 and 3052 that use the photoelectric conversion apparatus, an IR light source 3060 that emits infrared light, and a visible light source 3070 that emits visible light are arranged along an upper side of the rear surface of the electronic device 3000.

In the electronic device 3000 configured as described above, by applying the photoelectric conversion apparatus described above, for example, an image with higher quality can be captured and a distance to an object can be measured with high accuracy. Note that the photoelectric conversion apparatus can be applied to other electronic devices such as an infrared sensor, a ranging sensor using an active infrared light source, a security camera, and a personal authentication camera or a biometric camera. As a result, accuracy and performance of such electronic devices can be improved.

Eleventh Embodiment

Figure 26:
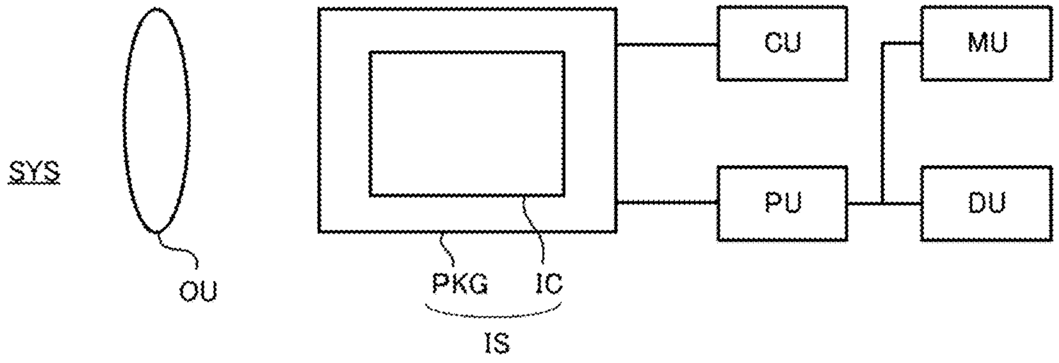
FIG. 26 is a diagram illustrating equipment according to an eleventh embodiment.

A photoelectric conversion system according to an eleventh embodiment will be described with reference to FIG. 26. FIG. 26 is a block diagram showing a schematic configuration of an imaging system SYS that is the photoelectric conversion system according to the eleventh embodiment. The imaging system SYS includes at least the photoelectric conversion apparatus according to any one of the first to fourth embodiments as described above and a signal processing unit that processes signals output from the photoelectric conversion apparatus.

The imaging system SYS is an information terminal that includes a camera and a photography function. The imaging system SYS is constructed using an imaging apparatus IS. The imaging apparatus IS can further include a package PKG that houses an imaging device IC. The package PKG can include a substrate on which the imaging device IC is fixed and a lid body that opposes the imaging device IC. The package PKG can include a connecting member (a member that connects a terminal provided on the substrate and a terminal provided on the imaging device IC) to each other. The imaging apparatus IS can mount a plurality of the imaging devices IC to a common package PKG by arranging the imaging devices IC side by side. Alternatively, the imaging apparatus IS can mount the imaging device IC and another semiconductor device IC to a common package PKG by stacking the imaging device IC and the semiconductor device IC on top of each other.

The imaging system SYS can include an optical system OU (optical apparatus) that forms an image on the imaging apparatus IS. In addition, the imaging system SYS can include at least any of a control apparatus CU, a processing apparatus PU, a display apparatus DU, and a storage apparatus MU. The control apparatus CU controls the imaging apparatus IS and the processing apparatus PU processes a signal obtained from the imaging apparatus IS. Furthermore, the display apparatus DU displays an image obtained from the imaging apparatus IS and the storage apparatus MU stores the image obtained from the imaging apparatus IS.

OTHER EMBODIMENTS

While various apparatuses have been explained in the embodiments described above, a mechanical apparatus may be further provided. A mechanical apparatus in a camera can drive parts of the optical system for the purposes of zooming, focusing, and shutter operations. Alternatively, the mechanical apparatus in the camera can move the photoelectric conversion apparatus for vibration insulation.

In addition, the apparatus may be transportation equipment such as a vehicle, a ship, or a flight vehicle. A mechanical apparatus in the transportation equipment may be used as a moving apparatus. The apparatus as transportation equipment is suitable as an apparatus that transports the photoelectric conversion apparatus or an apparatus that assists and/or automates driving (operation) using the photography function. A processing apparatus for assisting and/or automating driving (operation) can perform processing for operating the mechanical apparatus as a moving apparatus based on information obtained by the photoelectric conversion apparatus.

The embodiments described above can be modified as necessary to the extent that the embodiments do not depart from the technical concept. The disclosure herein includes not only what is described herein, but also all matters that can be understood from the present specification and the drawings attached to the present specification.

According to the present invention, a photoelectric conversion apparatus achieving both a wide dynamic range and a high-speed AD conversion operation can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-084926, filed on May 24, 2024, which is hereby incorporated by reference herein in its entirety.

What is claimed is:

1. A photoelectric conversion apparatus comprising:

a pixel configured to output a pixel signal; and an AD conversion unit configured to perform analog-to-digital conversion for acquiring a digital value corresponding to the pixel signal by using a ramp signal of which a signal voltage changes at a predetermined voltage change rate with respect to time, wherein the AD conversion unit includes an amplification circuit controlling an amplification factor of the pixel signal, an amplification factor switching circuit switching the amplification factor, a ramp signal switching circuit switching the voltage change rate of the ramp signal, a comparison circuit outputting a comparison result signal generated using an amplified pixel signal output from the amplification circuit and the ramp signal, and a memory storing a plurality of decision values corresponding to the comparison result signal, wherein a first signal is generated by comparing the amplified pixel signal with any one of first threshold voltage values selected from among M−1, where M>1, threshold voltages, and the ramp signal switching circuit is capable of switching the voltage change rate of the ramp signal in M ways on the basis of a first decision value corresponding to the first signal, wherein a second signal is generated by comparing the amplified pixel signal with any one of second threshold voltage values selected from among N−1, where N>1, threshold voltages generated using the ramp signal, and the amplification factor switching circuit is capable of switching the amplification factor of the amplification circuit in N ways on the basis of a second decision value corresponding to the second signal, and wherein the AD conversion unit performs analog-to-digital conversion by using the voltage change rate of the ramp signal and the amplification factor of the amplification circuit that are selected using the first decision value and the second decision value among three or more combinations, which are less than M×N combinations among the M×N combinations according to combinations of switching of the voltage change rate of the ramp signal and switching of the amplification factor of the amplification circuit.

2. The photoelectric conversion apparatus according to claim 1, wherein the first signal and the second signal are generated in order of the first signal and the second signal, and a maximum threshold voltage value included in the first threshold voltage values is smaller than a minimum threshold voltage value included in the second threshold voltage values.

3. The photoelectric conversion apparatus according to claim 1, wherein the first signal and the second signal are generated in order of the second signal and the first signal, and the first decision value is a value that is set in combination with the second decision value.

4. The photoelectric conversion apparatus according to claim 1, wherein the first signal and the second signal are generated in order of the second signal and the first signal, and a maximum threshold voltage value included in the second threshold voltage values is smaller than a minimum threshold voltage value included in the first threshold voltage values.

5. The photoelectric conversion apparatus according to claim 1, wherein the memory stores information of two bits or more.

6. The photoelectric conversion apparatus according to claim 1, wherein the pixels are arranged over a plurality of rows and a plurality of columns, wherein the photoelectric conversion apparatus further comprises a plurality of AD conversion units, each of which is the AD conversion unit, arranged in a corresponding column among the plurality of columns, wherein the pixel signal is output to a corresponding AD conversion unit, among the plurality of AD conversion units, from the plurality of rows of pixels in units of rows, and wherein in a period after the pixel signals output from the pixels of a predetermined row are input to the plurality of AD conversion units until the pixel signals output from the pixels of a different row are input to the plurality of AD conversion units next, each of the plurality of AD conversion units performs analog-to-digital conversion for the pixel signals output from the pixels of the predetermined row by using the voltage change rate of the ramp signal and the amplification factor of the amplification circuit that are selected using the first decision value and the second decision value among three or more combinations, which are less than M×N combinations.

7. A photoelectric conversion system, comprising:
the photoelectric conversion apparatus according to claim 1; and
a signal processing portion which generates an image by using a signal output by the photoelectric conversion apparatus.

8. A moving body comprising:
the photoelectric conversion apparatus according to claim 1; and
a control portion which controls movement of the moving body by using a signal output by the photoelectric conversion apparatus.

9. Equipment comprising:
the photoelectric conversion apparatus according to claim 1; and
at least any of:
an optical apparatus corresponding to the photoelectric conversion apparatus;
a control apparatus that controls the photoelectric conversion apparatus;
a processing apparatus that processes a signal output from the photoelectric conversion apparatus;
a display apparatus that displays information obtained by the photoelectric conversion apparatus;
a storage apparatus that stores information obtained by the photoelectric conversion apparatus; and
a mechanical apparatus that operates on a basis of information obtained by the photoelectric conversion apparatus.

* * * * *